US012513716B2

(12) United States Patent
Liu et al.

(10) Patent No.: US 12,513,716 B2
(45) Date of Patent: Dec. 30, 2025

(54) RESOURCE DETERMINING METHOD, APPARATUS, AND SYSTEM

(71) Applicant: Huawei Technologies Co., Ltd., Shenzhen (CN)

(72) Inventors: Yun Liu, Shenzhen (CN); Lixia Xue, Beijing (CN); Xiang Mi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 154 days.

(21) Appl. No.: 18/027,008

(22) PCT Filed: Aug. 24, 2021

(86) PCT No.: PCT/CN2021/114281
§ 371 (c)(1),
(2) Date: Mar. 17, 2023

(87) PCT Pub. No.: WO2022/057578
PCT Pub. Date: Mar. 24, 2022

(65) Prior Publication Data
US 2024/0314816 A1 Sep. 19, 2024

(30) Foreign Application Priority Data

Sep. 18, 2020 (CN) .......................... 202010987361.5
Oct. 16, 2020 (CN) .......................... 202011115120.8

(51) Int. Cl.
*H04W 72/40* (2023.01)
(52) U.S. Cl.
CPC ................................. *H04W 72/40* (2023.01)

(58) Field of Classification Search
CPC ..... H04W 72/40; H04W 76/15; H04W 72/02; H04W 72/25; H04W 4/40;
(Continued)

(56) References Cited
U.S. PATENT DOCUMENTS

2021/0120614 A1\* 4/2021 Lu ........................... H04W 4/40
2021/0204283 A1\* 7/2021 Zhao ...................... H04L 1/1812
(Continued)

FOREIGN PATENT DOCUMENTS

CN         111385765 A      7/2020
WO         2019031808 A1    2/2019

OTHER PUBLICATIONS

WO_2020006736_A1 (Year: 2020).\*
(Continued)

*Primary Examiner* — Rushil P. Sampat
(74) *Attorney, Agent, or Firm* — Conley Rose, P.C.

(57) ABSTRACT

A resource determining method includes that a first terminal obtains transmission information from a second terminal, wherein the transmission information is used to indicate a first sidelink resource. The first terminal determines a second sidelink resource according to the transmission information, wherein a time range of the second sidelink resource does not overlap that of the first sidelink resource. The first terminal sends a first data to the second terminal on a sidelink resource of the second sidelink resource, wherein the first sidelink resource includes a sidelink resource on which a second data is received by the second terminal.

20 Claims, 13 Drawing Sheets

(58) Field of Classification Search
CPC ......... H04W 72/0406; H04W 72/0446; H04W 72/0453; H04W 72/1263; H04W 72/20; H04W 76/14; H04W 92/18; H04W 84/005
See application file for complete search history.

(56) References Cited

U.S. PATENT DOCUMENTS

| | | | | |
|---|---|---|---|---|
| 2021/0329606 A1* | 10/2021 | Zhao | ..................... | H04L 5/0094 |
| 2023/0040934 A1* | 2/2023 | Qu | ........................ | H04W 72/25 |
| 2023/0280453 A1* | 9/2023 | Zhao | ..................... | H04W 72/25 342/458 |

OTHER PUBLICATIONS

WO_2022027477_A1 (Year: 2022).*
3GPP TSG RAN WG1 Meeting #102-e R1-2005537, "Resource Allocation Enhancements for Mode 2", Fraunhofer HHI, Fraunhofer IIS, Aug. 7, 2020, XP052346909, 8 pages.
3GPP TSG RAN WG1 Meeting #102-e R1-2005749, "Discussion on feasibility and benefits for mode 2 enhancement", LG Electronics, Aug. 8, 2020, XP052347122, 9 pages.
3rd Generation Partnership Project; Technical Specification Group Radio Access Network; NR; Radio Resource Control (RRC) protocol specification (Release 16), 3GPP TS 38.331 V16.1.0, Jul. 2020, total: 906 pages.
3rd Generation Partnership Project; Technical Specification Group Radio Access Network; NR; Medium Access Control (MAC) protocol specification (Release 16), 3GPP TS 38.321 V16.1.0, Jul. 2020, total: 151 pages.
3rd Generation Partnership Project; Technical Specification Group Radio Access Network; NR; NR and NG-RAN Overall Description; Stage 2 (Release 15), 3GPP TS 38.300 V15.10.0, Jul. 2020, total: 100 pages.
3rd Generation Partnership Project; Technical Specification Group Radio Access Network; NR; Physical layer procedures for data (Release 16), 3GPP TS 38.214 V16.2.0, Jun. 2020, total: 163 pages.
3rd Generation Partnership Project; Technical Specification Group Radio Access Network; NR; Physical layer procedures for control (Release 16), 3GPP TS 38.213 V16.2.0, Jun. 2020, total: 176 pages.
3rd Generation Partnership Project; Technical Specification Group Radio Access Network; NR; Physical channels and modulation (Release 16), 3GPP TS 38.211 V16.2.0, Jun. 2020, total: 131 pages.
3rd Generation Partnership Project; Technical Specification Group Radio Access Network; NR; Multiplexing and channel coding (Release 16), 3GPP TS 38.212 V16.2.0, Jun. 2020, total: 151 pages.

* cited by examiner

RESOURCE DETERMINING METHOD, APPARATUS, AND SYSTEM

This is a U.S. National Stage of International Patent Application No. PCT/CN2021/114281; filed on Aug. 24, 2021, which claims priority to Chinese Patent application Ser. No. 20/201,0987361.5; filed on Sep. 18, 2020 and Chinese Patent Application No. 202011115120.8 filed on Oct. 16, 2020. All of the aforementioned applications are hereby incorporated by reference in their entireties.

TECHNICAL FIELD

Embodiments of this application relate to the field of communications technologies, and in particular, to a resource determining method, an apparatus, and a system.

BACKGROUND

With evolution of communications technologies, the internet of everything is also accelerating. During Release 14 (Release, Rel-14) and Release 15 of the third generation partnership project (3rd Generation Partnership Project, 3GPP), vehicle-to-vehicle (vehicle-to-vehicle, V2V) and vehicle-to-everything (vehicle-to-everything, V2X) services are introduced in long term evolution (Long Term Evolution, LTE), so as to extend a 3GPP platform to an automotive industry. Rel-14 V2X proposes a sensing mechanism. A terminal senses spectrum usage, and uses the spectrum usage as a basis for selecting a resource when the terminal subsequently transmits data on a sidelink resource.

During Release 16, a related design of new radio (new radio, NR) V2X is studied. Further optimization is discussed in new radio (new radio, NR) sidelink (sidelink, SL) enhancement (enhancement) of Release 17. Specifically, in terms of resource allocation enhancement, based on a power consumption reduction solution proposed by Rel-14 and Rel-15, further optimization or a new solution is proposed to implement power reduction. In addition to power consumption reduction, reliability improvement and latency reduction are the other two main objectives of the solution, which are also based on resource allocation enhancement. The sensing mechanism in Rel-14 is used by the terminal to send data. However, a position of the terminal serving as a sender terminal is different from a position of a receiver terminal. A sidelink resource selected by the sender terminal may have a relatively weak signal or no signal for the sender terminal, but may have a relatively strong signal for the receiver terminal. Therefore, if the sender terminal sends data to the receiver terminal on the sidelink resource, data receiving quality of the receiver terminal may be relatively poor. Based on this, the receiver terminal may recommend, to the sender terminal, information about a group of sidelink resources sensed by the receiver terminal. When transmitting a service, the sender terminal considers a group of sidelink resources transmitted by the receiver terminal. An advantage of this is that the receiver terminal fully considers a nearby interference status, and notifies the sender terminal of a group of sidelink resources, so that the sender terminal can select, from the group of sidelink resources, a sidelink resource used for transmission to the receiver terminal.

Although a purpose of recommending a group of sidelink resources by the receiver terminal to the sender terminal is to improve service receiving quality of the receiver terminal, because the receiver terminal considers transmission of the receiver terminal when determining the group of sidelink resources, the recommended sidelink resources may be invalid resources for the second terminal.

SUMMARY

Embodiments of this application provide a resource determining method, an apparatus, and a system, to avoid a conflict between transmission of a second terminal and a sidelink resource that is selected by a first terminal and that is used to send a service to the second terminal or that is selected for the second terminal and that is used to send a service.

To achieve the foregoing objective, embodiments of this application provide the following technical solutions.

According to a first aspect, an embodiment of this application provides a resource determining method. The method is applied to a first terminal, and the method includes: The first terminal obtains transmission information that is used to determine a transmission status of a second terminal. The first terminal determines, based on the transmission status, one or more sidelink resources that can be used by the second terminal to send data. The first terminal sends first information to the second terminal. The first information is used to indicate information about the one or more sidelink resources. Alternatively, an embodiment of this application provides a resource determining method. The method includes: A first terminal obtains transmission information that is used to determine a transmission status of a second terminal. The first terminal determines, based on the transmission status, one or more sidelink resources that can be used to carry a service sent to the second terminal. The first terminal sends the service to the second terminal on a first sidelink resource in the one or more sidelink resources.

According to the resource determining method provided in this embodiment of this application, the one or more sidelink resources that can be used to send data and that are determined by the first terminal for the second terminal without learning of the transmission status of the second terminal may include a sidelink resource that conflicts with transmission of the second terminal, and the conflicted sidelink resource is an invalid resource for the second terminal, or the first sidelink resource that is used to carry the service and that is selected by the first terminal without learning of the transmission status of the second terminal may conflict with a resource corresponding to transmission of the second terminal, and the second terminal cannot correctly receive the service on the first sidelink resource in this conflict case. However, in this embodiment of this application, the first terminal obtains the transmission status of the second terminal, and then the first terminal determines the one or more sidelink resources with reference to the transmission status of the second terminal, so that the one or more sidelink resources determined by the first terminal for the second terminal do not include the resource corresponding to transmission of the second terminal, or the first sidelink resource that is selected by the first terminal to carry the service does not include the resource corresponding to transmission of the second terminal. This prevents the one or more sidelink resources determined by the first terminal for the second terminal or the first sidelink resource that carries the service from conflicting with the resource corresponding to transmission of the second terminal.

In a possible implementation, when the transmission status includes one or more of the following, the sidelink resource may be used by the second terminal to send the data: information used to indicate a first time period, information used to indicate a second sidelink resource, information used to indicate a second time period, and information used to indicate a third sidelink resource.

The first time period is a time period in which the second terminal reserves receiving, or the first time period is a time period of a sidelink resource on which the second terminal reserves to receive a service, or the first time period is a time period in which the second terminal reserves to send a service, or the first time period is a time period in which a sidelink resource on which the second terminal reserves to send a service is located, or the first time period is a time period in which the second terminal tends to receive a service, or the first time period is a time period of a sidelink resource on which the second terminal tends to receive a service, or the first time period is a time period in which the second terminal does not tend to send a service, or the first time period is a time period of a sidelink resource on which the second terminal does not tend to send a service.

In this embodiment of this application, a scenario to which a time period in which the second terminal does not tend to receive a service or a sidelink resource on which the second terminal does not tend to receive a service is applicable may be, for example, that the second terminal uses a discontinuous reception mechanism. In this case, the second terminal has the following states: a sleep state and an active state. In the sleep state, the second terminal may receive a service. Therefore, a time period in which the second terminal is in the sleep state may be considered as a time period in which the second terminal does not tend to receive a service or a time period of a sidelink resource on which the second terminal does not tend to receive a service. For example, if a sidelink resource is located in the corresponding time period in which the second terminal is in the sleep state, the sidelink resource may be considered as a sidelink resource on which the second terminal does not tend to receive a service.

However, when the second terminal is in the active state, the second terminal may receive a service. Therefore, a time period in which the second terminal is in the active state may be considered as a time period in which the second terminal tends to receive a service. Likewise, if a sidelink resource is located in the corresponding time period in which the second terminal is in the active state, the sidelink resource may be considered as a sidelink resource on which the second terminal tends to receive a service.

The second sidelink resource is a resource on which the second terminal reserves to send a service, or the second sidelink resource is a resource on which the second terminal reserves to receive a service, or the second sidelink resource is a resource on which the second terminal tends to receive a service, or the second sidelink resource is a sidelink resource on which the second terminal does not tend to send a service, or the second sidelink resource is a sidelink resource in a time period in which the second terminal reserves to/tends to transmit a service, or the second sidelink resource is a resource in a time period in which the second terminal tends to receive a service, or the second sidelink resource is a sidelink resource in a time period in which the second terminal does not tend to send a service.

The second time period is a time period in which the second terminal tends to send a service, or the second time period is a time period in which the second terminal does not tend to receive a service.

The third sidelink resource is a sidelink resource on which the second terminal tends to send a service, or the third sidelink resource is a sidelink resource on which the second terminal does not tend to receive a service, or the third sidelink resource is a sidelink resource in a time period in which the second terminal tends to send a service, or the third sidelink resource is a sidelink resource in a time period in which the second terminal does not tend to receive a service.

The foregoing lists example content of the transmission status, so that the first time period and the second sidelink resource are avoided as much as possible when the first terminal selects a sidelink resource. In this way, when the first time period is a time period in which the second terminal reserves receiving or a time period in which the second terminal tends to receive a service, a conflict between receiving and sending of the second terminal can be avoided. When the first time period is a time period in which the second terminal does not tend to send a service, a sidelink resource that overlaps the first time period is avoided when the first terminal selects a sidelink resource, so that a sidelink resource recommended for the second terminal can be ensured to be effectively used as much as possible. When the first time period is a time period in which the second terminal reserves to send a service, a sidelink resource that overlaps the first time period is avoided when the first terminal selects a sidelink resource, so that a case in which the second terminal simultaneously sends different services in a same time period can be avoided as much as possible. In addition, when selecting a sidelink resource, the first terminal selects, as much as possible, a resource that is located in the second time period or that belongs to the third sidelink resource, so as to ensure reliable transmission of the second terminal.

It should be noted that, when the first time period is a time period in which the second terminal reserves to send a service, if the second terminal can simultaneously send a plurality of services, the one or more sidelink resources recommended by the first terminal to the second terminal may include a sidelink resource whose time range overlaps the first time period.

When the first time period is a time period in which the second terminal reserves to send a service, if the second terminal cannot simultaneously send a plurality of services, the one or more sidelink resources recommended by the first terminal to the second terminal do not include a sidelink resource whose time range overlaps the first time period. In other words, the one or more sidelink resources do not include a sidelink resource whose time range has an intersection with the first time period.

In a possible implementation, the method provided in this embodiment of this application may further include: The first terminal determines that the second terminal can simultaneously send a plurality of services or cannot simultaneously send a plurality of services.

In a possible implementation, that the first terminal determines that the second terminal can simultaneously send a plurality of services or cannot simultaneously send a plurality of services includes: The first terminal obtains capability information of the second terminal. The capability information is used to indicate that the second terminal can simultaneously send a plurality of services or cannot simultaneously send a plurality of services. The first terminal determines, based on the capability information, that the second terminal can simultaneously send a plurality of services or cannot simultaneously send a plurality of services.

In a possible implementation, that the first terminal obtains capability information of the second terminal includes: The first terminal receives the capability information from the second terminal. The capability information may be sent by the second terminal in a broadcast manner, or the capability information may be specially sent by the second terminal to the first terminal. This is not limited in this embodiment of this application.

For example, when the second terminal requests the first terminal to recommend a sidelink resource to the second terminal, the second terminal may send the capability information of the second terminal to the first terminal. The capability information and a trigger message may be carried in a same message, for example, both are carried in a message 1, or the capability information is in the trigger message, or the capability information and the trigger message are carried in different messages. This is not limited in this embodiment of this application.

For example, if the first terminal requests the second terminal to feed back the capability information of the second terminal to the first terminal, the second terminal may feed back the foregoing capability information to the first terminal. For example, when the first ternunal determines to recommend a sidelink resource to the second terminal, the first terminal may request the second terminal to feed back the capability information of the second terminal to the first terminal.

In a possible implementation, at least one of the one or more sidelink resources meets one or more of the following conditions: when the transmission status includes the information used to indicate the first time period, a time range of the at least one sidelink resource does not overlap the first time period; when the transmission status includes the information used to indicate the second sidelink resource, the sidelink resource does not overlap the second sidelink resource; when the transmission status includes the information used to indicate the second time period, the time range of the at least one sidelink resource overlaps the second time period; and when the transmission status includes the information used to indicate the third sidelink resource, the at least one sidelink resource belongs to the third sidelink resource. In this way, the sidelink resource recommended by the first terminal to the second terminal avoids the first time period or the second sidelink resource, so that a conflict between receiving and sending of the second terminal is avoided. Alternatively, the sidelink resource recommended by the first terminal to the second terminal is located in the second time period in which the second terminal tends to send a service, or belongs to the third sidelink resource, or the like.

In a possible implementation, when the first time period is a time period in which the second terminal reserves to send a service, or the first time period is a time period in which a sidelink resource on which the second terminal reserves to send a service is located, if the second terminal cannot simultaneously send a plurality of services, the time range of the at least one sidelink resource does not overlap the first time period. Because the second terminal cannot simultaneously send a plurality of services, the at least one sidelink resource whose time range does not overlap the first time period is provided for the second terminal, so that the second terminal can send different services in different time periods.

In a possible implementation, when the first time period is a time period in which the second terminal reserves to send a service, or the first time period is a time period in which a sidelink resource on which the second terminal reserves to send a service is located, if the second terminal can simultaneously send a plurality of services, the time range of the at least one sidelink resource may overlap the first time period. In this way, the second terminal can send a plurality of services at a same moment.

In a possible implementation, when the transmission status includes one or more of the following, the first sidelink resource may be used to carry the service sent to the second terminal: information used to indicate a fourth sidelink resource, information used to indicate a third time period, information used to indicate a fourth time period, and information used to indicate a fifth sidelink resource.

The fourth sidelink resource is a resource on which the second terminal reserves to receive a service, or the fourth sidelink resource is a resource on which the second terminal reserves to send a service, or the fourth sidelink resource is a resource on which the second terminal tends to send a service, or the fourth sidelink resource is a resource on which the second terminal does not tend to receive a service, or the fourth sidelink resource is a resource on which the second terminal reserves to receive a service.

The third time period is a time period in which the second terminal reserves to send a service, or the third time period is a time period in which a sidelink resource on which the second terminal reserves to send a service is located, or the third time period is a time period in which the second terminal tends to send a service, or the third time period is a time period in which a sidelink resource on which the second terminal tends to send a service is located, or the third time period is a time period in which the second terminal does not tend to receive a service, or the third time period is a time period of a sidelink resource on which the second terminal does not tend to receive a service.

The fourth time period is a time period in which the second terminal tends to receive a service, or a time period in which the second terminal does not tend to send a service, or a time period in which the second terminal reserves to receive a service, or a time period in which a sidelink resource on which the second terminal tends to receive a service is located, or a time period in which a sidelink resource on which the second terminal does not tend to send a service is located, or a time period in which a sidelink resource on which the second terminal reserves to receive a service is located.

The fifth sidelink resource is a sidelink resource on which the second terminal tends to receive a service or a sidelink resource on which the second terminal does not tend to send a service.

In this way, a time period in which or a time resource on which the second terminal cannot receive a service is avoided when the first terminal selects the first sidelink resource, or the first terminal determines a time period in which or a time resource on which the second terminal tends to receive a service.

In a possible implementation, the first sidelink resource meets one or more of the following conditions: when the transmission status includes the information used to indicate the fourth sidelink resource, the first sidelink resource does not overlap the fourth sidelink resource; when the transmission status includes the information used to indicate the third time period, a time range indicated by the first sidelink resource is beyond the third time period; when the transmission status includes the information used to indicate the fourth time period, the time range in which the first sidelink resource is located overlaps the fourth time period; and when the transmission status includes the information used to indicate the fifth sidelink resource, the first sidelink resource belongs to the fifth sidelink resource.

In a possible implementation, that the first terminal obtains transmission information includes: The first terminal receives the transmission information from the second terminal.

In a possible implementation, the transmission information and the trigger message are located in a same message, or the transmission information and the trigger message are carried in different messages. The trigger message is used to trigger the first terminal to recommend a sidelink resource to the second terminal. This is not limited in this embodiment of this application.

In a possible implementation, the obtaining transmission information includes: The first terminal receives second information sent by another terminal, where the second information includes at least an identifier of the second terminal. The first terminal determines the transmission information based on the second information.

In a possible implementation, that the first terminal determines one or more sidelink resources based on the transmission status includes: The first terminal determines one or more candidate sidelink resources from sensed sidelink resources based on a sensing window. The first terminal determines the one or more sidelink resources from the one or more candidate sidelink resources based on the transmission status.

Optionally, the one or more candidate sidelink resources may include a resource that conflicts with a resource corresponding to other transmission of the second terminal and a resource that does not conflict with a resource corresponding to other transmission of the second terminal.

In a possible implementation, that the first terminal determines one or more sidelink resources based on the transmission status includes: The first terminal determines one or more candidate sidelink resources from sensed sidelink resources based on a sensing window and the transmission status. The first terminal determines the one or more sidelink resources from the one or more candidate sidelink resources. Optionally, in this case, the one or more candidate sidelink resources may not include a resource that conflicts with a resource corresponding to other transmission of the second terminal.

In a possible implementation, at least one of the one or more sidelink resources does not overlap a resource corresponding to other transmission of the second terminal. The resource corresponding to other transmission of the second terminal may include a sidelink resource and a time resource. That a sidelink resource does not overlap a resource corresponding to other transmission of the second terminal may be that the sidelink resource does not overlap a sidelink resource used for other transmission of the second terminal, or a time period of the sidelink resource does not overlap a time period corresponding to other transmission of the second terminal.

In a possible implementation, the method provided in this embodiment of this application further includes: The first terminal receives the data from the second terminal on a sixth sidelink resource in the one or more sidelink resources.

According to a second aspect, an embodiment of this application provides a resource determining method. The method includes: A second terminal receives first information from a first terminal, where the first information is used to indicate information about one or more sidelink resources, and the one or more sidelink resources are determined based on a transmission status of the second terminal. The second terminal determines the one or more sidelink resources based on the first information.

In a possible implementation, the sidelink resource does not overlap a resource corresponding to other transmission of the second terminal.

In a possible implementation, the method provided in this embodiment of this application further includes: The second terminal sends data on a sixth sidelink resource in the one or more sidelink resources.

In a possible implementation, the transmission status includes one or more of the following: information used to indicate a first time period, information used to indicate a second sidelink resource, information used to indicate a second time period, and information used to indicate a third sidelink resource. The first time period is a time period in which the second terminal reserves receiving, or a time period in which the second terminal reserves to send a service, or a time period in which the second terminal tends to receive a service, or a time period in which the second terminal does not tend to send a service. The second sidelink resource is a resource on which the second terminal reserves to transmit a service, or the second sidelink resource is a resource on which the second terminal tends to receive a service, or the second sidelink resource is a sidelink resource on which the second terminal does not tend to send a service. The second time period is a time period in which the second terminal tends to send a service or a time period in which the second terminal does not tend to receive a service. The third sidelink resource is a sidelink resource on which the second terminal tends to send a service, or the third sidelink resource is a sidelink resource on which the second terminal does not tend to receive a service. In this way, the first time period and the second sidelink resource are avoided as much as possible when the first terminal selects a sidelink resource, or the first terminal selects, as much as possible when selecting a sidelink resource, a resource that is located in the second time period or that belongs to the third sidelink resource. This ensures reliable transmission of the second terminal.

In a possible implementation, the sidelink resource meets one or more of the following conditions: when the transmission status includes the information used to indicate the first time period, a time range indicated by the sidelink resource does not overlap the first time period; when the transmission status includes the information used to indicate the second sidelink resource, the sidelink resource does not overlap the second sidelink resource; when the transmission status includes the information used to indicate the second time period, the time range in which the first sidelink resource is located overlaps the second time period; and when the transmission status includes the information used to indicate the third sidelink resource, the sidelink resource belongs to the third sidelink resource. In this way, the sidelink resource recommended by the first terminal to the second terminal avoids the first time period or the second sidelink resource, or the sidelink resource recommended by the first terminal to the second terminal is located in the second time period in which the second terminal tends to send a service, or belongs to the third sidelink resource, or the like.

In a possible implementation, when the second terminal cannot simultaneously send a plurality of services, the time range indicated by the sidelink resource does not overlap the first time period. Because the second terminal cannot simultaneously send a plurality of services, the time range indicated by the sidelink resource does not overlap the first time period, so that the second terminal can send different services in different time periods.

In a possible implementation, when the second terminal can simultaneously send a plurality of services, the time range indicated by the sidelink resource may overlap the first time period. In this way, the second terminal can send a plurality of services at a same moment.

In a possible implementation, the method provided in this embodiment of this application may further include: The second terminal sends the transmission status of the second terminal to the first terminal.

According to a third aspect, an embodiment of this application provides a resource determining method. The method includes: A second terminal receives first information from a first terminal, where the first information is used to indicate information about one or more sidelink resources, and the one or more sidelink resources are used to determine a sidelink resource used by the second terminal to send a first service. The second terminal sends the first service on a first sidelink resource in the one or more sidelink resources, where the first sidelink resource does not overlap a resource corresponding to other transmission of the second terminal.

This embodiment of this application provides the resource determining method. In the method, after receiving the first information, the second terminal may select, from the one or more sidelink resources indicated by the first information, the first sidelink resource that does not overlap the resource corresponding to other transmission of the second terminal, to send the first service. This can avoid a conflict between the selected first sidelink resource and another existing transmission of the second terminal.

In a possible implementation, the method provided in this embodiment of this application further includes: The second terminal determines the first sidelink resource from the one or more sidelink resources based on a transmission status of the second terminal, where the transmission status is used to determine a sidelink resource that does not overlap the resource corresponding to other transmission of the second terminal, or used to determine a time resource or a sidelink resource on which the second terminal tends to send a service.

In a possible implementation, the transmission status includes one or more of the following: information used to indicate a first time period, information used to indicate a second sidelink resource, information used to indicate a second time period, and information used to indicate a third sidelink resource. The first time period is a time period in which the second terminal reserves to send a service, or the first time period is a time period in which the second terminal reserves to receive a service, or the first time period is a time period in which the second terminal tends to receive a service, or the first time period is a time period in which the second terminal does not tend to send a service. The second sidelink resource is a sidelink resource on which the second terminal reserves to receive a service, or a sidelink resource on which the second terminal reserves to send a service, or a sidelink resource on which the second terminal tends to receive a service, or a sidelink resource on which the second terminal does not tend to send a service. The second time period is a time period in which the second terminal tends to send a service or a time period in which the second terminal does not tend to receive a service. The third sidelink resource is a sidelink resource on which the second terminal tends to send a service, or a sidelink resource on which the second terminal does not tend to receive a service.

In a possible implementation, a time range indicated by the first sidelink resource does not overlap the first time period, or the first sidelink resource does not overlap the second sidelink resource, or a time range in which the first sidelink resource is located overlaps the second time period, or the first sidelink resource belongs to the third sidelink resource.

In a possible implementation, when the transmission status includes the information used to indicate the first time period, that the second terminal determines the first sidelink resource from the one or more sidelink resources based on a transmission status of the second terminal includes: The second terminal determines that a sidelink resource that does not overlap the first time period in the one or more sidelink resources is the first sidelink resource.

When the first time period is a time period in which the second terminal reserves to send a service, and the second terminal cannot simultaneously send a plurality of services, or when the first time period is a time period in which the second terminal reserves to receive a service, or the first time period is a time period in which the second terminal tends to receive a service, a sidelink resource whose time range does not overlap the first time period in the one or more sidelink resources is a sidelink resource whose time range does not overlap the first time period at all. This can avoid simultaneous sending, and can also avoid a conflict between receiving and sending of the second terminal.

A sidelink resource whose time range does not overlap the first time period in the one or more sidelink resources is a sidelink resource whose time range does not overlap the first time period at all.

When the first time period is a time period in which the second terminal reserves to send a service, if the second terminal can simultaneously send a plurality of services, the time range indicated by the first sidelink resource may overlap the first time period. In this case, the first sidelink resource whose time range may overlap the first time period is selected to send the first service, and when the second terminal still sends a reserved service in the first time period, transmit power can be increased.

When the first time period is a time period in which the second terminal does not tend to send a service, a sidelink resource located in the first time period is selected as the first sidelink resource, so that the selected resource conforms to a transmission tendency of the second terminal.

In a possible implementation, when the transmission status includes the information used to indicate the second sidelink resource, that the second terminal determines the first sidelink resource from the one or more sidelink resources based on a transmission status of the second terminal includes: The second terminal determines that a sidelink resource that does not overlap the second sidelink resource in the one or more sidelink resources is the first sidelink resource. For example, if the one or more sidelink resources include the second sidelink resource, the second terminal determines that a sidelink resource other than the second sidelink resource in the one or more sidelink resources is the first sidelink resource. This can avoid overlapping between the selected first sidelink resource and the second sidelink resource, and avoid a transmission conflict.

In a possible implementation, when the second sidelink resource is a sidelink resource on which the second terminal reserves to receive a service or a sidelink resource on which the second terminal tends to receive a service, the sidelink resource that does not overlap the second sidelink resource is a sidelink resource that does not overlap the second sidelink resource at all. This can avoid a conflict between receiving and sending of the second terminal.

In a possible implementation, when the second sidelink resource is a sidelink resource on which the second terminal reserves to send a service, if the second terminal can simultaneously send a plurality of services, a sidelink resource that does not overlap the second sidelink resource is selected as the first sidelink resource, so that the first terminal can simultaneously send different services on different sidelink resources. This increases transmit power of the second terminal.

In a possible implementation, when the second sidelink resource is a sidelink resource on which the second terminal reserves to send a service, if the second terminal cannot simultaneously send a plurality of services, a sidelink resource that does not overlap the second sidelink resource is selected as the first sidelink resource, so as to avoid a case in which the second terminal does not learn, due to resource overlapping, whether to send the first service on the first sidelink resource or send the reserved service on the second sidelink resource.

In a possible implementation, when the second sidelink resource is a sidelink resource on which the second terminal reserves to send a service, if the second terminal cannot simultaneously send a plurality of services, and the first sidelink resource overlaps the second sidelink resource, the second terminal may determine, based on priorities of the first service and the service sent by the second terminal, whether to send the first service on the first sidelink resource or send the reserved service on the second sidelink resource. For example, the second terminal may preferentially send a service with a high priority.

In a possible implementation, when the second sidelink resource is a sidelink resource on which the second terminal does not tend to send a service, the sidelink resource that does not overlap the second sidelink resource is a sidelink resource that does not overlap the second sidelink resource at all, that is, there is no intersection between the first sidelink resource and the second sidelink resource.

In a possible implementation, when the transmission status includes the information used to indicate the second time period, that the second terminal determines the first sidelink resource from the one or more sidelink resources based on a transmission status of the second terminal includes: The second terminal determines that a sidelink resource whose time range overlaps the second time period in the one or more sidelink resources is the first sidelink resource. Alternatively, the second terminal determines that a sidelink resource whose time range is located in the second time period in the one or more sidelink resources is the first sidelink resource. The sidelink resource that overlaps the second time period is selected as the first sidelink resource. In this way, when the second time period is a time period in which the second terminal tends to send a service, if the time range indicated by the first sidelink resource is located in the time period in which the second terminal tends to send a service, a transmission requirement of the second terminal can be met. When the second time period is a time period in which the second terminal does not tend to receive a service, if the time range indicated by the first sidelink resource is located in the time period in which the second terminal tends to send a service, a conflict between receiving and sending of the second terminal can be avoided.

In a possible implementation, when the transmission status includes the information used to indicate the third sidelink resource, that the second terminal determines the first sidelink resource from the one or more sidelink resources based on a transmission status of the second terminal includes: The second terminal determines that a sidelink resource that overlaps the third sidelink resource in the one or more sidelink resources is the first sidelink resource. For example, if the one or more sidelink resources include the sidelink resource that overlaps the third sidelink resource, the second terminal determines that the sidelink resource that overlaps the third sidelink resource is the first sidelink resource. When the first terminal senses a sidelink resource in a resource pool, the second terminal may also sense a sidelink resource in the resource pool. Therefore, the one or more sidelink resources recommended by the first terminal to the second terminal may include the sidelink resource that overlaps the third sidelink resource. However, the third sidelink resource is a resource on which the second terminal tends to send a service. Therefore, determining that the sidelink resource that overlaps the third sidelink resource is the first sidelink resource can improve communication quality of sending the service by the second terminal. In addition, the third sidelink resource is a sidelink resource on which the second terminal does not tend to receive a service. Therefore, determining that the sidelink resource that overlaps the third sidelink resource is the first sidelink resource can avoid a conflict between receiving and sending of the second terminal.

In a possible implementation, that the second terminal determines the first sidelink resource from the one or more sidelink resources based on a transmission status of the second terminal includes: The second terminal determines a fourth sidelink resource used to carry the first service from the one or more sidelink resources. When a time range in which the fourth sidelink resource is located is within the first time period, the second terminal determines the first sidelink resource based on a priority of the first service and a first priority of a second service, where the second service is a service that the second terminal reserves to receive.

In a possible implementation, that the second terminal determines the first sidelink resource based on a priority of the first service and a first priority of a second service includes: when the priority of the first service is higher than or equal to the first priority, determining that the fourth sidelink resource is the first sidelink resource.

In a possible implementation, the method provided in this embodiment of this application further includes: when the time range in which the fourth sidelink resource is located overlaps a fourth time period, sending the first service on the fourth sidelink resource. This can ensure that a service with a high priority is preferentially sent. It should be noted that, after the second terminal completes sending of the first service, if there is still a remaining time period in the fourth time period, the second terminal may receive the second service. This avoids a conflict between receiving and sending.

In a possible implementation, that the second terminal determines the first sidelink resource based on a priority of the first service and a first priority of a second service includes: if the priority of the first service is lower than or equal to the first priority, determining that the fourth sidelink resource is not the first sidelink resource. This can ensure that the second service is preferentially received in the fourth time period. If the second terminal receives the second service in the fourth time period, the second terminal does not select a sidelink resource whose time range overlaps the fourth time period to send the first service. This can further avoid a conflict between receiving and sending.

In a possible implementation, that the second terminal determines the first sidelink resource from the one or more sidelink resources based on a transmission status of the second terminal includes: The second terminal determines a resource pool, where the resource pool includes a sidelink resource other than a fourth sidelink resource in the one or more sidelink resources, and a time range in which the fourth sidelink resource is located overlaps a fourth time period. If a priority of the first service is lower than or equal to a first priority of a second service, the second terminal determines the first sidelink resource from the resource pool, where the second service is a service that the second terminal reserves to receive. In this way, a sidelink resource whose time range does not overlap the fourth time period may be selected to send the first service. This ensures that the first service is sent, and also ensures that the second terminal correctly receives the second service.

In a possible implementation, the method provided in this embodiment of this application further includes: when the time range in which the fourth sidelink resource is located is in the fourth time period, receiving the second service in the fourth time period.

In a possible implementation, the method provided in this embodiment of this application further includes; The second terminal may select a sidelink resource whose time range does not overlap the fourth time period at all to send the first service.

In a possible implementation, the second service is a service with a highest priority in services that the second terminal reserves to receive.

In a possible implementation, the method provided in this embodiment of this application further includes: The second terminal determines to use a first manner or a second manner to determine the first sidelink resource from the one or more sidelink resources.

In a possible implementation, the method provided in this embodiment of this application further includes: The second terminal determines, based on a quantity of the one or more sidelink resources and/or configuration information, to use a first manner or a second manner to determine the first sidelink resource from the one or more sidelink resources. The first manner is determining the second sidelink resource based on the transmission status of the second terminal; and the second manner is determining the second sidelink resource based on a service priority.

In a possible implementation, the method provided in this embodiment of this application further includes: The second terminal receives indication information from the first terminal. The second terminal determines, based on the indication information, to use a first manner or a second manner to determine the first sidelink resource from the one or more sidelink resources. The first manner is determining the second sidelink resource based on the transmission status of the second terminal; and the second manner is determining the second sidelink resource based on a service priority.

According to a fourth aspect, an embodiment of this application provides a computer-readable storage medium. The computer-readable storage medium stores a computer program or instructions. When the computer program is or the instructions are run on a computer, the computer is enabled to perform the resource determining method according to any one of the first aspect and the possible implementations of the first aspect. The computer may be a first terminal.

According to a fifth aspect, an embodiment of this application provides a computer-readable storage medium. The computer-readable storage medium stores a computer program or instructions. When the computer program is or the instructions are run on a computer, the computer is enabled to perform the resource determining method according to any one of the second aspect and the possible implementations of the second aspect. The computer may be a second terminal.

According to a sixth aspect, an embodiment of this application provides a computer-readable storage medium. The computer-readable storage medium stores a computer program or instructions. When the computer program is or the instructions are run on a computer, the computer is enabled to perform the resource determining method according to any one of the third aspect and the possible implementations of the third aspect. The computer may be a second terminal.

According to a seventh aspect, an embodiment of this application provides a computer program product including instructions. When the instructions are run on a computer, the computer is enabled to perform the resource determining method according to any one of the first aspect and the possible implementations of the first aspect.

According to an eighth aspect, an embodiment of this application provides a computer program product including instructions. When the instructions are run on a computer, the computer is enabled to perform the resource determining method according to any one of the second aspect or the possible implementations of the second aspect.

According to a ninth aspect, an embodiment of this application provides a computer program product including instructions. When the instructions are run on a computer, the computer is enabled to perform the resource determining method according to any one of the third aspect or the possible implementations of the third aspect.

According to a tenth aspect, an embodiment of this application provides a communications apparatus, configured to implement the method according to any one of the first aspect and the possible designs of the first aspect. The communications apparatus may be the foregoing first terminal, or an apparatus including the foregoing first terminal, or a component (for example, a chip) applied to the foregoing first terminal. The communications apparatus includes a corresponding module or unit for implementing the foregoing method. The module or unit may be implemented by hardware or software, or by hardware executing corresponding software. The hardware or the software includes one or more modules or units corresponding to the foregoing functions.

According to an eleventh aspect, an embodiment of this application provides a communications apparatus, configured to implement the method according to any one of the second aspect and the possible designs of the second aspect. The communications apparatus may be the foregoing second terminal, or an apparatus including the foregoing second terminal, or a component (for example, a chip) applied to the foregoing second terminal. The communications apparatus includes a corresponding module or unit for implementing the foregoing method. The module or unit may be implemented by hardware or software, or by hardware executing corresponding software. The hardware or the software includes one or more modules or units corresponding to the foregoing functions.

According to a twelfth aspect, an embodiment of this application provides a communications apparatus, configured to implement the method according to any one of the third aspect and the possible designs of the third aspect. The communications apparatus may be the foregoing second terminal, or an apparatus including the foregoing second terminal, or a component (for example, a chip) applied to the foregoing second terminal. The communications apparatus includes a corresponding module or unit for implementing the foregoing method. The module or unit may be implemented by hardware or software, or by hardware executing corresponding software. The hardware or the software includes one or more modules or units corresponding to the foregoing functions.

According to a thirteenth aspect, an embodiment of this application provides a communications apparatus. The communications apparatus includes a transceiver and at least one processor. The at least one processor communicates with the transceiver, and when the communications apparatus runs, the at least one processor executes computer-executable instructions or programs stored in a memory, so that the communications apparatus performs the method according to any one of the first aspect and the possible designs of the first aspect. For example, the communications apparatus may be a first terminal, or a chip applied to the first terminal.

According to a fourteenth aspect, an embodiment of this application provides a communications apparatus. The communications apparatus includes a transceiver and at least one processor. The at least one processor is coupled to the transceiver, and when the communications apparatus runs, the at least one processor executes computer-executable instructions or programs stored in a memory, so that the communications apparatus performs the method according to any one of the second aspect or the possible designs of the second aspect. For example, the communications apparatus may be a second terminal, or a chip applied to the second terminal.

According to a fifteenth aspect, an embodiment of this application provides a communications apparatus. The communications apparatus includes a transceiver and at least one processor. The at least one processor is coupled to the transceiver, and when the communications apparatus runs, the at least one processor executes computer-executable instructions or programs stored in a memory, so that the communications apparatus performs the method according to any one of the third aspect or the possible designs of the third aspect. For example, the communications apparatus may be a second terminal, or a chip applied to the second terminal.

In a possible implementation, the communications apparatuses described in the thirteenth aspect and the fifteenth aspect each may further include a memory. The memory is configured to store computer-executable instructions or programs.

The memory described in any one of the thirteenth aspect and the fifteenth aspect may alternatively be replaced with a storage medium. This is not limited in this embodiment of this application.

In a possible implementation, the memory described in any one of the thirteenth aspect and the fifteenth aspect may be a memory inside the communications apparatus. Certainly, the memory may alternatively be located outside the communications apparatus, but the at least one processor can still execute the computer-executable instructions or programs stored in the memory.

According to a sixteenth aspect, an embodiment of this application provides a communications apparatus. The communications apparatus includes one or more modules, configured to implement the method according to any one of the first aspect, the second aspect, and the third aspect. The one or more modules may correspond to the steps in the method according to any one of the first aspect, the second aspect, and the third aspect.

According to a seventeenth aspect, an embodiment of this application provides a chip. The chip includes a processor, and the processor is configured to read and execute a computer program stored in a memory, to perform the method according to any one of the first aspect and the possible implementations of the first aspect.

According to an eighteenth aspect, an embodiment of this application provides a chip. The chip includes a processor, and the processor is configured to read and execute a computer program stored in a memory, to perform the method according to any one of the second aspect and the possible implementations of the second aspect.

According to a nineteenth aspect, an embodiment of this application provides a chip. The chip includes a processor, and the processor is configured to read and execute a computer program stored in a memory, to perform the method according to any one of the third aspect and the possible implementations of the third aspect.

Optionally, the chip may be a single chip or a chip module including a plurality of chips.

Optionally, the chip system further includes a memory. The memory and the processor are connected through a circuit or a wire.

Optionally, the chip system further includes a communications interface. The communications interface is configured to communicate with a module other than the chip.

According to a twentieth aspect, an embodiment of this application provides a communications system. The communications system includes a first terminal and a second terminal. The first terminal is configured to perform the method according to any one of the first aspect and the possible implementations of the first aspect, and the second terminal is configured to perform the method according to any one of the second aspect and the possible implementations of the second aspect.

According to a twenty-first aspect, an embodiment of this application provides a communications system. The communications system includes a first terminal and a second terminal. The first terminal is configured to perform a step of sending first information to the second terminal. The second terminal is configured to perform the method according to any one of the third aspect and the possible implementations of the third aspect.

Any apparatus, computer-readable storage medium, computer program product, chip, or communications system provided above is configured to perform the corresponding method provided above. Therefore, for beneficial effects that can be achieved, refer to the beneficial effects of the corresponding solution in the corresponding method provided above. Details are not described herein again.

DESCRIPTION OF EMBODIMENTS

Figure 1:
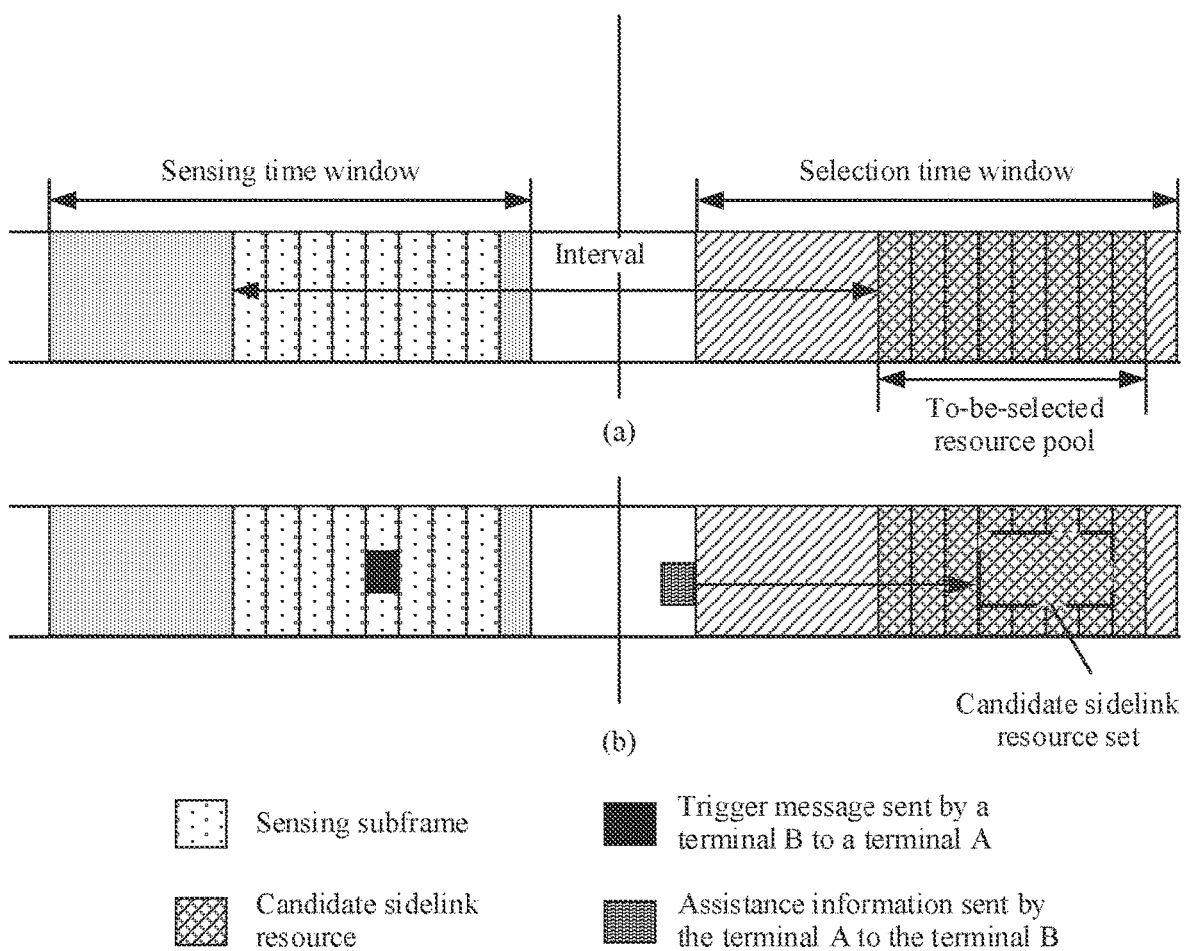
FIG. 1 is a schematic diagram of resource sensing and resource selection according to an embodiment of this application.

To clearly describe technical solutions in embodiments of this application, terms such as "first" and "second" are used in embodiments of this application to distinguish between same items or similar items that provide basically same functions or purposes. For example, a first terminal and a second terminal are merely intended to distinguish between different terminals, and are not intended to limit a sequence thereof. A person skilled in the art may understand that the terms such as "first" and "second" do not limit a quantity or an execution sequence, and the terms such as "first" and "second" do not indicate a definite difference.

It should be noted that, in this application, a word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a relative concept in a specific manner.

In this application, "at least one" means one or more, and "a plurality of" means two or more. In addition, "and/or" describes an association relationship between associated objects, and represents that three relationships may exist. For example, A and/or B may represent the following cases: Only A exists, both A and B exist, and only B exists, where A and B may be singular or plural. A character "/" generally indicates an "or" relationship between the associated objects. Moreover, "at least one of the following items (pieces)" or a similar expression thereof means any combination of these items, including a singular item (piece) or any combination of a plurality of items (pieces). For example, at least one of a, b, or c may indicate: a, b, c, a and b, a and c, b and c, or a, b, and c, where a, b, and c may be singular or plural.

The technical solutions in this application may be applied to various communications systems, for example, a long term evolution (long time evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communications system, a public land mobile network (public land mobile network, PLMN) system, a device-to-device (device-to-device, D2D) network system, a machine-to-machine (machine-to-machine, M2M) network system, and a future 5G communications system.

A network architecture and a service scenario described in embodiments of this application are intended to describe the technical solutions in embodiments of this application more clearly, and do not constitute a limitation on the technical solutions provided in embodiments of this application. A person of ordinary skill in the art may learn that, with evolution of the network architecture and emergence of new service scenarios, the technical solutions provided in embodiments of this application are also applicable to similar technical problems.

Before embodiments of this application are described, terms in embodiments of this application are first described.

(1) Sidelink (Sidelink, SL): The sidelink is defined for direct communication between terminals, that is, a link on which direct communication is performed between the terminals without forwarding by a base station.

(2) Sidelink resource: The sidelink resource is a resource used by a terminal 1 to transmit sidelink information to a terminal 2 on a sidelink.

(3) Sidelink information: The sidelink information is data transmitted by any two terminals on a sidelink, and may also be referred to as a V2X service. In embodiments of this application, data that can be transmitted by any two terminals on a sidelink includes control signaling and a data packet.

LTE Rel-14 V2X proposes a sensing mechanism. At a moment n at which a transmission requirement is determined, as shown in FIG. 1, a terminal A determines a sensing window (sensing window) and a selection window (selection window) based on the moment n. The sensing window is located before the moment n. An interval between a time unit (for example, a slot) in the sensing window and a corresponding time unit (for example, a slot) in the selection window is a period value. In other words, corresponding slots in the sensing window can be determined based on a slot in the selection window and a possible period value, so as to determine whether a slot in a periodic service reservation selection window exists in these slots.

The terminal A detects each sidelink resource in the sensing window. There may be no signal transmission on some sidelink resources, and there may be signal transmission on some sidelink resources. For sidelink resources on which signals are transmitted, after obtaining signal strength of these signals and obtaining a period of a service corresponding to the signals, the terminal A may estimate interference strength caused when the service falls on a corresponding sidelink resource in the selection window. If the interference strength is greater than a specific threshold, the sidelink resource cannot be used for subsequent sidelink resource transmission of the terminal A. After the foregoing screening, the terminal A obtains a candidate resource pool shown in (a) in FIG. 1, and selects (for example, randomly selects) a sidelink resource used for subsequent transmission from the candidate resource pool.

Different from Rel-14 V2X, Rel-17 V2X uses a terminal B and a terminal A to exchange information. For example, the terminal B sends a trigger message to the terminal A, to trigger the terminal A to sense a sidelink resource, and then the terminal A senses a spectrum occupation status, and obtains a sensing result. The sensing result includes information about a group of sidelink resources. Then, the terminal A sends assistance information to the terminal B, to transmit the information about the group of obtained sidelink resources to the terminal B, so that the terminal B selects a sidelink resource used for data transmission from the group of sidelink resources. Therefore, the sensing result of the terminal A in Rel-17 V2X is not used by the terminal A for transmission in Rel-14 V2X, but is used by the terminal B for transmission.

As shown in FIG. 1, a sensing purpose of Rel-17 V2X is different from a sensing purpose of Rel-14 V2X. A sensing purpose of the terminal A in Rel-14 V2X is to obtain an idle sidelink resource or a sidelink resource whose interference is less than a threshold. However, in Rel-17 V2X, the sensing result of the terminal A is used by the terminal B for transmission. Therefore, the terminal A more needs to sense a sidelink resource with high channel quality that is used by the terminal B for transmission and recommend the sidelink resource.

Currently, there may be two types: triggering assistance information feedback or configuring periodic assistance information. Triggering assistance information feedback means that the terminal B sends trigger information (trigger information) to the terminal A, the terminal A sends assistance information (assistance information) to the terminal B based on the trigger information, and then the terminal B determines, based on the assistance information fed back by the terminal A, a sidelink resource used for data transmission, and performs data transmission. Configuring periodic assistance information feedback means that the terminal B configures a periodic sidelink resource for the terminal A. The sidelink resource is used by the terminal A to feed back assistance information, the periodic resource may be used for one transmission every 100 ms or several seconds, and a frequency domain resource for transmission is relatively fixed.

It should be noted that the assistance information in this embodiment of this application is merely used for description, and an actual name may be merely information. The information carries time-frequency position description information of some sidelink resources.

In the conventional technology, the terminal B sends a trigger message or configuration information to the terminal A, the terminal A sends assistance information, where the assistance information is used to indicate information about a group of sidelink resources to the terminal B. and the terminal B determines, based on the information about the group of sidelink resources, a sidelink resource used for transmitting a service. However, the conventional technology has the following disadvantages:

When selecting the group of sidelink resources, the terminal A does not consider existing transmission of the terminal B. For example, it is assumed that the terminal B reserves to receive data in a slot A. However, the group of sidelink resources recommended by the terminal A to the terminal B is located in the slot A or overlaps with the slot A Because the group of sidelink resources is used to carry data sent by the terminal B, a conflict between receiving and sending of the terminal B occurs in the slot A, which is referred to as a sending and receiving conflict for short.

Alternatively, the group of sidelink resources recommended by the terminal A to the terminal B by using the assistance information may be in a same slot as a sidelink resource on which the terminal B reserves sending. In this way, when the terminal B cannot simultaneously transmit at least two pieces of data, a conflict between two pieces of sending is caused.

In addition, when sending the assistance information to the terminal B, the terminal A needs to select a sidelink resource B used to carry the assistance information. However, a time domain position of the sidelink resource B may overlap a time domain position of a sidelink resource A on which the terminal B reserves sending. Because the sidelink resource B is used to carry assistance information that needs to be received by the terminal B, and the sidelink resource A is used to carry data that needs to be sent by the terminal B, if the time domain positions of the two resources overlap, the terminal B can select only receiving or sending. In addition, the sidelink resource B is determined by the terminal A, but the terminal B is not necessarily in a receiving state within a time range of the sidelink resource B. If the terminal B is in a sending state within the time range of the sidelink resource B, the terminal B cannot receive the assistance information sent by the terminal A on the sidelink resource B.

Likewise, the following case may exist actually: For example, if the terminal A does not listen to information sent by another terminal to the terminal B on a sidelink resource X, or the terminal A does not learn that the sidelink resource X is occupied by another terminal or has carried information sent to the terminal B, the sidelink resource B used by the terminal A to send the assistance information and the sidelink resource X used by the terminal B to receive another message may be a same resource, that is, overlap. If the two resources overlap, receiving may also fail.

Based on this, an embodiment of this application provides a resource determining method. In the method, when a first terminal (for example, a receiver terminal) determines one or more sidelink resources recommended to a second terminal (for example, a sender terminal), a transmission status of the second terminal is considered. Therefore, information about the one or more sidelink resources recommended by the first terminal to the second terminal may not include information about a sidelink resource that conflicts with transmission of the second terminal, or a first sidelink resource selected by the first terminal from the one or more sidelink resources to send a service to the second terminal does not conflict with transmission of the second terminal. This can avoid a conflict with existing transmission of the second terminal.

The following describes technical solutions in this application with reference to the accompanying drawings.

To improve security and intelligence of a transportation system, an idea of an intelligent transportation system gradually emerges. In a recent phase, development of an intelligent transportation system mainly focuses on the field of intelligent road transportation systems, that is, vehicle-to-everything (vehicle-to-everything, V2X). V2X communication includes vehicle-to-vehicle (vehicle-to-vehicle, V2V) communication, vehicle-to-infrastructure (vehicle-to-infrastructure. V2I) communication, and vehicle-to-pedestrian (vehicle-to-pedestrian, V2P) communication. V2X applications improve driving safety, reduce congestion and vehicle energy consumption, and improve traffic efficiency, for example, communication with an infrastructure such as a traffic light, a campus, and a railway crossing. A vehicle-to-everything system is a sidelink transmission technology based on long term evolution (long term evaluation. LTE) V2V or new radio V2V. Different from a conventional LTE system or NR that uses a manner in which communication data is received or sent by a network device, the vehicle-to-everything system uses a manner that terminals directly communicate with each other.

Figure 2:
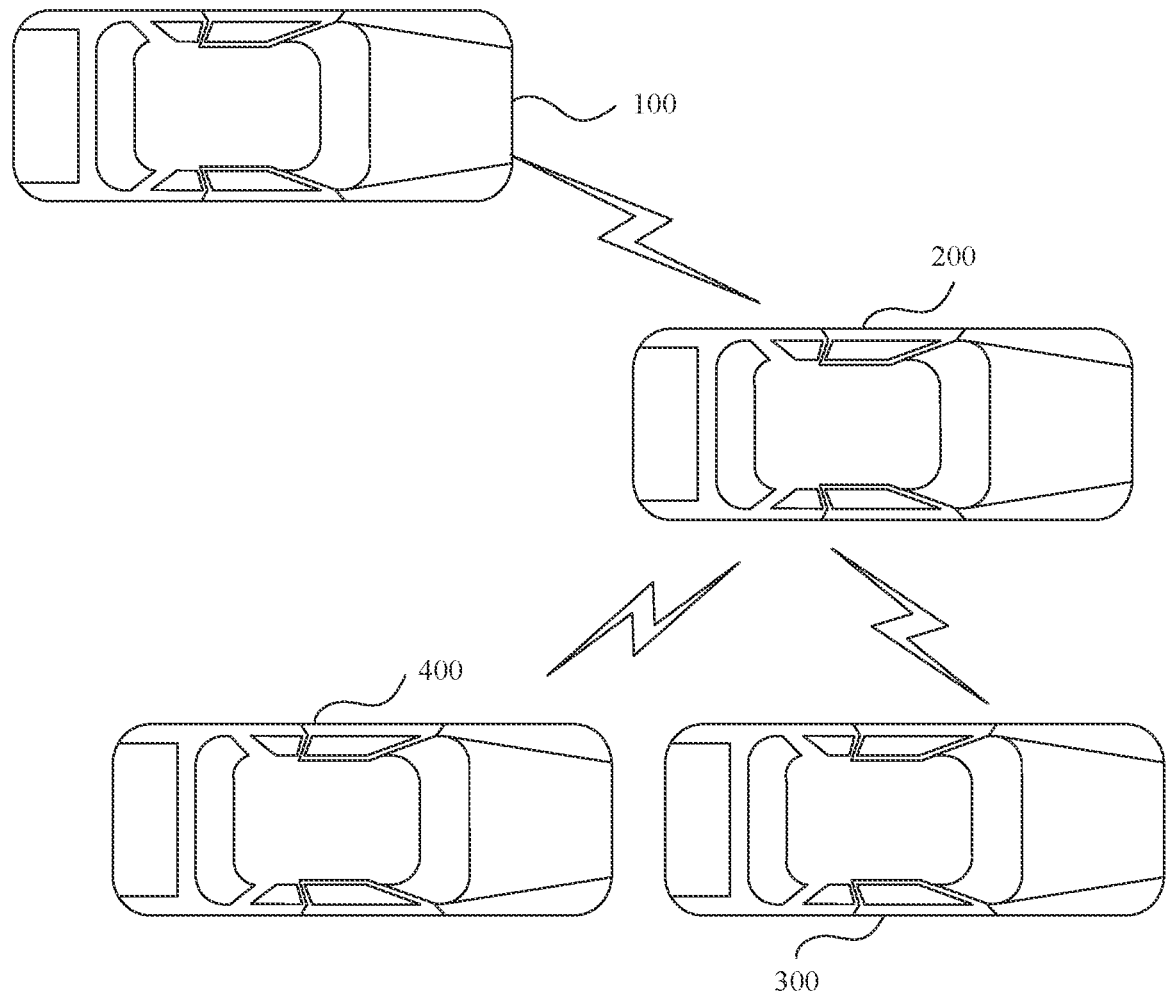
FIG. 2 is a schematic diagram of an architecture of a communications system according to an embodiment of this application.

FIG. 2 shows a communications system to which a resource determining method according to an embodiment of this application is applicable. The system includes a terminal 100 and one or more terminals (for example, a terminal 200, a terminal 300, and a terminal 400).

There is a first interface used for direct communication between the terminal 100 and any one of the one or more terminals. For example, the first interface may be referred to as a PC5 interface. A transmission link that is on the PC5 interface and that is used for communication between the terminal 100 and any one of the one or more terminals may be referred to as a sidelink. In other words, to transmit sidelink information between terminals, a sidelink needs to be established on the PC5 interface. For a manner of establishing a sidelink between the terminals, refer to descriptions in the conventional technology. Details are not described in this embodiment of this application.

For example, the PC5 interface may use a dedicated frequency band (for example, 5.9 GHz).

Communication between the terminal 100 and the terminal 200 is used as an example. A resource used for transmitting a service (for example, sending the service or receiving the service) on a sidelink between the terminal 100 and the terminal 200 may be referred to as a sidelink resource. In this embodiment of this application, a specific name of a resource used for transmitting the service (for example, sending the service or receiving the service) on the sidelink between the terminal 100 and the terminal 200 is not limited, and may be set as required.

In this embodiment of this application, a scenario in which terminals communicate on a sidelink may be referred to as a sidelink communication scenario.

In a sidelink communication scenario, sidelink information may be transmitted between two terminals (for example, a sender terminal and a receiver terminal). The sender terminal does not need to first send the sidelink information to a base station, and then the base station does not need to forward the sidelink information to the receiver terminal through a core network. This can greatly reduce a data latency.

It should be noted that the receiver terminal and the sender terminal are relative concepts. For example, when a terminal A sends information to a terminal B, the terminal B is a receiver terminal, and the terminal A is a sender terminal. When the terminal B sends information to the terminal A, the terminal B is a sender terminal, and the terminal A is a receiver terminal.

For example, the terminal 100 is a sender terminal, the terminal 200 is a receiver terminal, and the sender terminal sends sidelink information to the receiver terminal by using a sidelink resource. In this case, the sender terminal may currently obtain the sidelink resource in the following mode. For a mode in which the receiver terminal obtains the sidelink resource, refer to the mode in which the sender terminal obtains the sidelink resource. Details are not described subsequently.

Mode 1 (mode 1): Resource allocation mode scheduled by a network.

Mode 1: The sender terminal performs data transmission with a network device in a radio resource control (radio resource control, RRC) connected mode. In this case, the network device communicating with the sender terminal may schedule, for the sender terminal, a sidelink resource used to transmit sidelink service data. For example, the sender terminal sends a scheduling request (scheduling request, SR) and a sidelink buffer status report (buffer status report, BSR) to the network device. The sidelink BSR is used to determine a sidelink communication data amount of the sender terminal. The network device may determine the sidelink communication data amount of the sender terminal based on the sidelink BSR, and schedule, for the sender terminal, the sidelink resource required for transmitting the sidelink service data. The network device schedules, by using a configured sidelink radio network temporary identifier (SL-radio network temporary identifier, SL-RNTI), the sidelink resource used for sidelink communication.

Mode 2 (mode 2): Resource selection mode autonomously selected by a terminal.

Mode 2: The sender terminal selects a sidelink resource from a resource pool (which usually includes one or more sidelink resources). For example, when the sender terminal is within network coverage, the resource pool is a resource that is broadcast by a network device in system information. When the sender terminal is outside the network coverage, the resource pool may be considered as a resource that is preconfigured by the sender terminal. The resource pool may be a specific resource pool for the sender terminal, that is, only the sender terminal may select a sidelink resource from the resource pool. Alternatively, the resource pool may be a resource pool shared by a plurality of terminals including the sender terminal, that is, a terminal other than the sender terminal may also select a resource from the resource pool. For the latter, when the sender terminal autonomously selects a sidelink resource from the resource pool, the sender terminal may perform sensing on the resource pool to select a sidelink resource.

Sidelink transmission is based on a resource pool. The resource pool is a logical concept. One resource pool includes a plurality of physical resources, and any physical resource thereof is used to transmit data. A terminal may transmit data by using a resource in the resource pool.

Specifically, to ensure quality of the sidelink resource used for the sidelink service data sent by the sender terminal, and avoid a resource collision caused because the plurality of terminals randomly select a sidelink resource from the resource pool when the sender terminal autonomously selects a sidelink resource, that is, avoid communication quality deterioration caused because the resource selected by the sender terminal is occupied by the plurality of other terminals, the sender terminal may predict usage of a sidelink resource in a future time period 1 by using a sensing technology, and use the usage of the sidelink resource in the time period 1 as a listening result. The usage of the sidelink resource may indicate whether another terminal occupies the sidelink resource in the future time period 1. Therefore, based on the listening result, the sender terminal may reserve a corresponding sidelink resource in the listening result, to ensure communication quality of the sender terminal. In addition, the sidelink resource reserved by the sender terminal by using the sensing technology is time-effective. For example, in 5G NR, a time effect of a sensing result of a periodic service and a time effect of a sensing result of an aperiodic service are different, and both are within a specific millisecond time.

In V2X communication based on LTE or NR, the terminal may obtain a sensing result by using or based on a listening (or may also be referred to as sensing (sensing)) process defined in the LTE Release (Release) 14 standard protocol.

For example, a sensing result of a sidelink resource may be used to indicate any one or more of the following: an identifier or a position of a specific sidelink resource in the resource pool, signal strength on the sidelink resource, signal power on the sidelink resource, and a channel busy ratio (channel busy ratio, CBR) of the sidelink resource.

The terminal in embodiments of this application is a device having a wireless communication function, and may be deployed on land, including indoor, outdoor, handheld, or vehicle-mounted. Alternatively, the terminal may be deployed on water (for example, on a ship), or may be deployed in the air (for example, on an airplane, a balloon, or a satellite). The terminal, also referred to as user equipment (user equipment, UE), a mobile station (mobile station, MS), a mobile terminal (mobile terminal, MT), a terminal device, and the like, is a device that provides voice and/or data connectivity for a user. For example, the terminal includes a handheld device or a vehicle-mounted device having a wireless connection function. Currently, the terminal may be a mobile phone (mobile phone), a tablet computer, a notebook computer, a palmtop computer, a mobile internet device (mobile internet device, MID), a wearable device (for example, a smartwatch, a smart band, or a pedometer), a vehicle-mounted device (for example, an automobile, a bicycle, an electric vehicle, an aircraft, a ship, a train, or a high-speed train), a virtual reality (virtual reality, VR) device, an augmented reality (augmented reality, AR) device, a wireless terminal in industrial control (industrial control), a smart home device (for example, a refrigerator, a television, an air conditioner, or an electricity meter), an intelligent robot, a workshop device, a wireless terminal in self-driving (self-driving), a wireless terminal in remote medical surgery (remote medical surgery), a wireless terminal in smart grid (smart grid), a wireless terminal in transportation safety (transportation safety), a wireless terminal in smart city (smart city), a wireless terminal in smart home (smart home), a flight device (for example, an intelligent robot, a hot balloon, an uncrewed aerial vehicle, or an aircraft), or the like. In a possible application scenario of this application, the terminal is a terminal that often operates on land, for example, a vehicle-mounted device. In this application, for ease of description, a chip deployed in the foregoing device, for example, a system-on-a-chip (System-On-a-Chip, SOC), a baseband chip, or another chip having a communication function, may also be referred to as a terminal.

The terminal may be a vehicle having a corresponding communication function, a vehicle-mounted communications apparatus, or another embedded communications apparatus, or may be a handheld communications device of a user, including a mobile phone, a tablet computer, or the like.

For example, in embodiments of this application, the terminal may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs. The terminal may be a vehicle-mounted communications module or another embedded communications module, or may be a handheld communications device of a user, including a mobile phone, a tablet computer, and the like. In FIG. 2, VUE (vehicular user equipment) is used as an example of the terminal in embodiments of this application.

When the solutions described in embodiments of this application are applied to a V2X scenario, the solutions may be applied to the following fields: unmanned driving (unmanned driving), automated driving (automated driving/ADS), driver assistance (driver assistance/ADAS), intelligent driving (intelligent driving), connected driving (connected driving), intelligent network driving (Intelligent network driving), and car sharing (car sharing). Certainly, the solutions described in embodiments of this application may also be applied to interaction between a band and a mobile phone, and interaction between VR glasses and a mobile phone.

Figure 3:
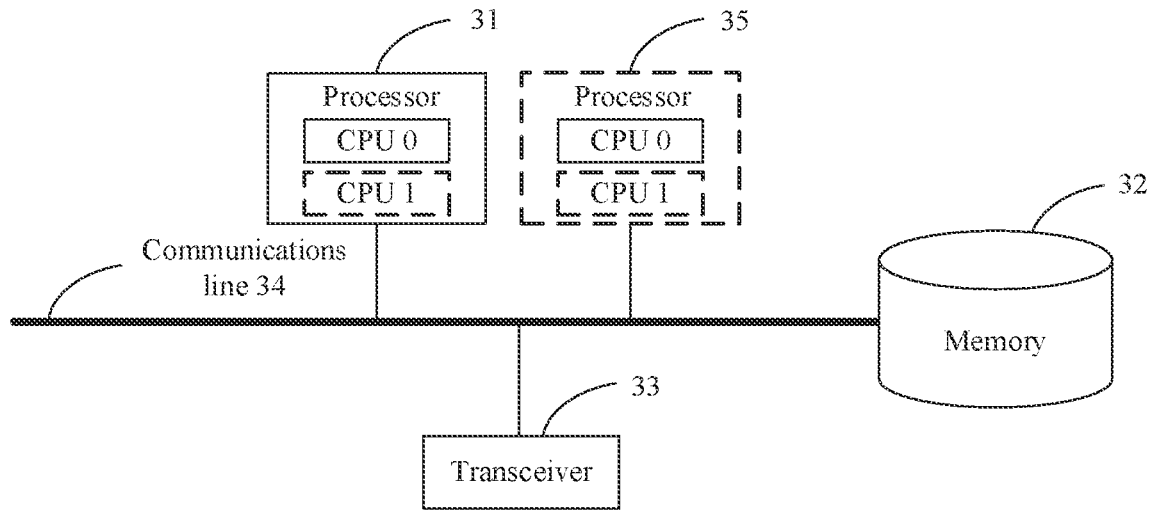
FIG. 3 is a schematic diagram of a structure of a communications device according to an embodiment of this application.

FIG. 3 is a schematic diagram of a hardware structure of a communications device according to an embodiment of this application. For hardware structures of a first terminal and a second terminal in embodiments of this application, refer to the structure shown in FIG. 3. The communications device includes a processor 31, a communications line 34, and at least one transceiver (description is provided merely by using an example in which the communications device includes a transceiver 33 in FIG. 3).

The processor 31 may be a general-purpose central processing unit (central processing unit, CPU), a microprocessor, an application-specific integrated circuit (application-specific integrated circuit, ASIC), or one or more integrated circuits configured to control program execution of the solutions of this application.

The communications line 34 may include a path for transferring information between the components described above.

The transceiver 33 is any apparatus such as a transceiver, and is configured to communicate with another device or a communications network such as the Ethernet, a radio access network (radio access network, RAN), or a wireless local area network (wireless local area network, WLAN).

Optionally, the communications device may further include a memory 32.

The memory 32 may be a read-only memory (read-only memory, ROM) or another type of static storage device that can store static information and instructions, or a random access memory (random access memory, RAM) or another type of dynamic storage device that can store information and instructions; or may be an electrically erasable programmable read-only memory (electrically erasable programmable read-only memory, EEPROM), a compact disc read-only memory (compact disc read-only memory, CD-ROM) or another compact disc storage, an optical disc storage (including a compressed optical disc, a laser disc, an optical disc, a digital versatile disc, a Blu-ray disc, and the like), a magnetic disk storage medium or another magnetic storage device, or any other medium that can be used to carry or store reserved program code in a form of an instruction or a data structure and that can be accessed by a computer. However, this is not limited thereto. The memory may exist independently, and is connected to the processor through the communications line 34. The memory 32 may alternatively be integrated with the processor 31.

The memory 32 is configured to store computer-executable instructions for executing the solutions in this application, and execution is controlled by the processor 31. The processor 31 is configured to execute the computer-executable instructions stored in the memory 32, to implement a resource determining method provided in the following embodiments of this application.

Optionally, the computer-executable instructions in this embodiment of this application may also be referred to as application code. This is not specifically limited in this embodiment of this application.

During specific implementation, in an embodiment, the processor 31 may include one or more CPUs, for example, a CPU 0 and a CPU 1 in FIG. 3.

During specific implementation, in an embodiment, the communications device may include a plurality of processors, for example, the processor 31 and a processor 35 in FIG. 3. Each of the processors may be a single-core (single-CPU) processor, or may be a multi-core (multi-CPU) processor. The processor herein may be one or more devices, circuits, and/or processing cores configured to process data (for example, computer program instructions).

A resource determining method provided in embodiments of this application is described in detail below with reference to FIG. 4 and FIG. 9.

It should be noted that names of messages between network elements, names of parameters in the messages, or the like in the following embodiments of this application are merely examples, and there may be other names during specific implementation. This is not specifically limited in embodiments of this application.

It should be noted that mutual reference may be made between embodiments of this application. For example, for same or similar steps, mutual reference may be made between a method embodiment, a communications system embodiment, and an apparatus embodiment. This is not limited.

In embodiments of this application, a specific structure of an execution body of the resource determining method is not particularly limited in embodiments of this application, provided that communication can be performed according to the resource determining method in embodiments of this application by running a program that records code of the resource determining method in embodiments of this application. For example, the resource determining method provided in embodiments of this application may be performed by a function module that is in a first terminal and that can invoke and execute the program, or may be performed by a communications apparatus applied to the first terminal, for example, a chip, a chip system, or an integrated circuit. The chip, the chip system, or the integrated circuit may be disposed inside the first terminal, or may be independent of the first terminal. This is not limited in embodiments of this application. The resource determining method provided in embodiments of this application may be performed by a function module that is in a second terminal and that can invoke and execute the program, or may be performed by a communications apparatus applied to the second terminal, for example, a chip, a chip system, or an integrated circuit. The chip, the chip system, or the integrated circuit may be disposed inside the second terminal, or may be independent of the second terminal. This is not limited in embodiments of this application. The following embodiments are described by using an example in which the resource determining method is performed by the first terminal or the second terminal.

Figure 4:
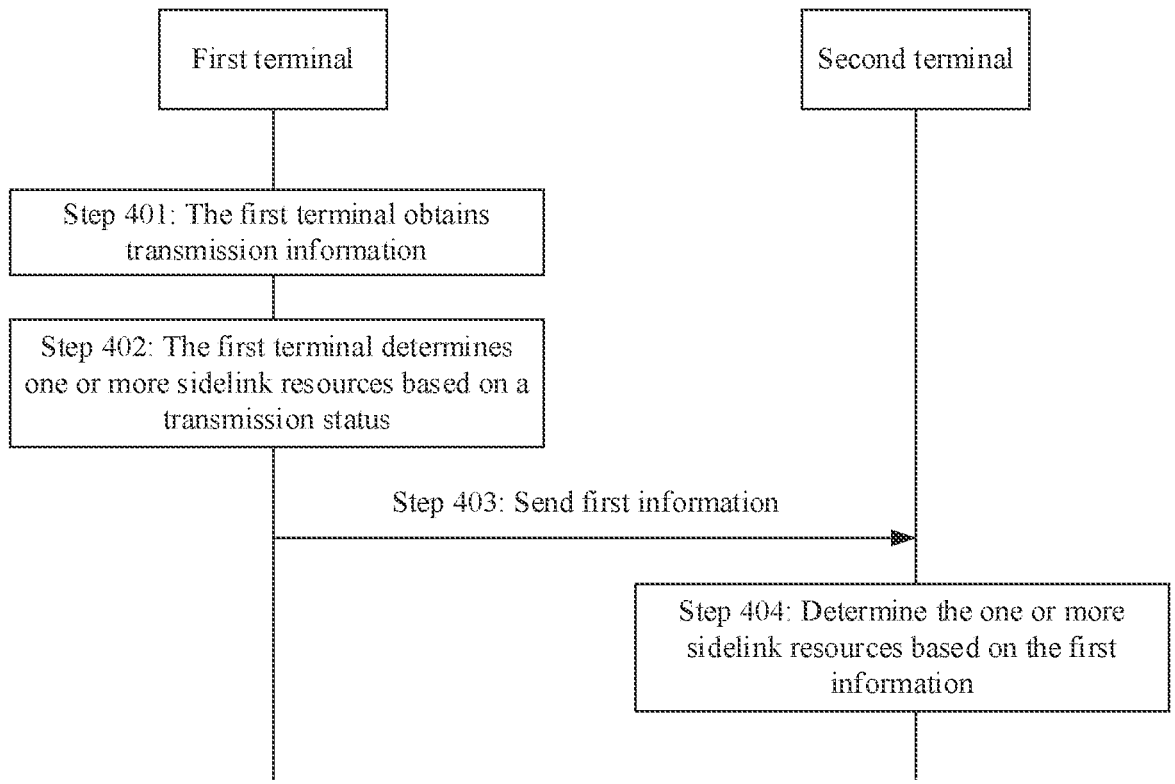
FIG. 4 is a schematic flowchart of a resource determining method according to an embodiment of this application.

FIG. 4 shows an interaction embodiment of a resource determining method according to an embodiment of this application. The method includes the following steps.

Step 401: A first terminal obtains transmission information, where the transmission information is used to determine a transmission status of a second terminal.

In an example, the transmission status of the second terminal is used by the first terminal to determine a sidelink resource whose time range does not overlap a sidelink resource used by the second terminal to transmit another service (for example, receive another service or send another service). Alternatively, the transmission status of the second terminal is used by the first terminal to determine a sidelink resource whose time range does not overlap a time period in which the second terminal transmits another service.

In another example, the transmission status of the second terminal is used by the first terminal to determine a sidelink resource on which the second terminal tends to send a service, or a time period in which the second terminal tends to send a service, or a time period in which the second terminal tends to receive a service, or a sidelink resource on which the second terminal tends to receive a service.

In this embodiment of this application, the time period in which the second terminal tends to send the service may include the following meanings: 1. A time period in which the second terminal reserves to send the service. 2. A time period in which a sidelink resource on which the second terminal tends to send the service is located. For example, if the second terminal tends to send the service on a sidelink resource 1, and the sidelink resource 1 is located in a slot 2, the slot 2 is a time period in which the second terminal tends to send the service. For example, if the second terminal tends to send the service in a slot 1, the slot 1 is a time period in which the second terminal tends to send the service.

In this embodiment of this application, the time period in which the second terminal tends to receive the service may include the following meanings: 1. A time period in which the second terminal reserves to receive the service. 2. A time period in which a sidelink resource on which the second terminal tends to receive the service is located. For example, if the second terminal tends to receive the service on a sidelink resource 1, and the sidelink resource 1 is located in a slot 2, the slot 2 is a time period in which the second terminal tends to receive the service. If a sidelink resource 3 is also located in the slot 2, to avoid a conflict between receiving and sending of the second terminal, the first terminal does not consider the sidelink resource 3 when recommending a sidelink resource to the second terminal.

For example, if the second terminal tends to receive the service in a slot 1, the slot 1 is a time period in which the second terminal tends to receive the service.

In this embodiment of this application, if time domain positions of two sidelink resources are the same, the two sidelink resources may have different frequency domain positions. For example, both the sidelink resource 1 and the sidelink resource 3 are located in the slot 1, but the two have different frequency domain positions.

Certainly, in this embodiment of this application, a sidelink resource in a time period in which the second terminal tends to send a service may be considered as a sidelink resource on which the second terminal tends to send a service. In this embodiment of this application, a sidelink resource in a time period in which the second terminal tends to receive a service may be considered as a sidelink resource on which the second terminal tends to receive a service.

In still another example, the transmission status of the second terminal is used by the first terminal to determine a sidelink resource on which the second terminal does not tend to send a service, or a time period in which the second terminal does not tend to send a service, or a sidelink resource on which the second terminal does not tend to receive a service, or a time period in which the second terminal does not tend to receive a service.

In this embodiment of this application, a sidelink resource in a time period in which the second terminal does not tend to send a service may be considered as a sidelink resource on which the second terminal does not tend to send a service. In this embodiment of this application, a sidelink resource in a time period in which the second terminal does not tend to receive a service may be considered as a sidelink resource on which the second terminal does not tend to receive a service.

In this embodiment of this application, the sidelink resource on which the second terminal "tends to" send the service may be understood as a sidelink resource on which the second terminal reserves to send a service, or a sidelink resource on which the second terminal prepares to send a service, or a sidelink resource on which the second terminal advises sending a service. When the second terminal sends the service on the sidelink resource on which the second terminal "tends to" send the service, a conflict between receiving and sending does not occur or is seldom generated.

In this embodiment of this application, the time period in which the second terminal "tends to" send the service may be understood as a time period in which the second terminal reserves to send a service, or a time period in which the second terminal prepares to send a service, or a time period in which the second terminal advises sending a service. When the second terminal sends the service in the time period in which the second terminal "tends to" send the service, a conflict with receiving of another service by the second terminal does not occur, or there may be a relatively small quantity of conflicts, or no conflict occurs during sending.

In this embodiment of this application, the sidelink resource on which the second terminal "does not tend to" send the service may be understood as a sidelink resource on which the second terminal does not reserve to send a service, or a sidelink resource on which the second terminal does not prepare to send a service, or a sidelink resource on which the second terminal does not advise sending a service. When the second terminal sends the service on the sidelink resource on which the second terminal "does not tend to" send the service, a conflict with receiving of another service by the second terminal may occur, or there may be a relatively large quantity of conflicts, or a conflict occurs during sending.

In this embodiment of this application, the time period in which the second terminal "does not tend to" send the service may be understood as a time period in which the second terminal does not reserve to send a service, or a time period in which the second terminal does not prepare to send a service, or a time period in which the second terminal does not advise sending a service. When the second terminal sends the service in the time period in which the second terminal "does not tend to" send the service, a conflict with receiving of another service by the second terminal may occur, or there may be a relatively large quantity of conflicts, or a conflict occurs during sending.

For example, the transmission status of the second terminal includes one or more of the following: information used to indicate a first time period, information about a second sidelink resource, information used to indicate a second time period, and information about a third sidelink resource.

The information used to indicate the first time period may be the first time period, or a start moment and an end moment of the first time period, or a start moment and a length of the first time period, or a time period in which a sidelink resource on which the second terminal reserves to receive a service or tends to receive a service is located. This is not limited in this embodiment of this application. Herein, "service" in "the second terminal reserves to receive a service or tends to receive a service" is a general concept, that is, the second terminal may receive any service in the first time period.

The first time period/the second time period in this embodiment of this application may be a continuous time period, or may be a discontinuous time period. For example, the first time period may be a slot.

For example, if the sidelink resource 1 on which the second terminal reserves to receive a service or tends to receive a service is located in the slot 1, the first time period may be the slot 1. When a sidelink resource located in the slot 1 includes the sidelink resource 1 and a sidelink resource 2, the first terminal may not consider the sidelink resource 1 and the sidelink resource 2 when determining to recommend one or more sidelink resources to the second terminal.

For example, the first time period is a time period in which the second terminal reserves to receive a service, or the first time period is a time period in which the second terminal reserves to send a service, or the first time period is a time period in which the second terminal tends to receive a service, or the first time period is a time period in which the second terminal does not tend to send a service, or the first time period is a time period in which a sidelink resource on which the second terminal reserves to receive a service in located, or the first time period is a time period in which a sidelink resource on which the second terminal reserves to send a service is located.

In a possible implementation of this application, when the second terminal cannot simultaneously send a plurality of services, when recommending a sidelink resource to the second terminal, the first terminal may not consider a sidelink resource whose time range overlaps a time period in which a sidelink resource on which the second terminal reserves to send a service is located.

In a possible implementation of this application, when the second terminal can simultaneously send a plurality of services, when recommending a sidelink resource to the second terminal, the first terminal may consider a sidelink resource whose time range overlaps a time period in which a sidelink resource on which the second terminal reserves to send a service is located, but does not consider a sidelink resource on which the second terminal reserves to send a service.

In this embodiment of this application, "reserve to" means pre-agreement.

The information about the second sidelink resource is used to identify the second sidelink resource. For example, the information about the second sidelink resource may be a time-frequency position or an index of the second sidelink resource. For example, the first terminal and the second terminal sense a sidelink resource in a same resource pool, each sidelink resource included in the resource pool has a corresponding index, and both the first terminal and the second terminal learn of the index corresponding to each sidelink resource. In this case, when the second terminal sends the index of the second sidelink resource to the first terminal, the first terminal can determine the sidelink resource indicated by the second terminal.

For example, the second sidelink resource is a sidelink resource on which the second terminal reserves to transmit a service, or the second sidelink resource is a sidelink resource on which the second terminal tends to receive a service, or the second sidelink resource is a sidelink resource on which the second terminal does not tend to send a service.

For example, the second time period is a time period in which the second terminal tends to send a service or a time period in which the second terminal does not tend to receive a service.

For example, the third sidelink resource is a sidelink resource on which the second terminal tends to send a service, or the third sidelink resource is a sidelink resource on which the second terminal does not tend to receive a service, or the third sidelink resource is a sidelink resource in a time period in which the second terminal tends to send a service, or the third sidelink resource is a sidelink resource in a time period in which the second terminal does not tend to receive a service.

For example, in this embodiment of this application, the second terminal may receive service data in a time period, but cannot receive service data in a time period. For example, the second terminal uses a discontinuous reception mechanism. In this way, the second terminal includes an active state and a sleep state. In the active state, the second terminal can receive a service, and can also send a service. In the sleep state, the second terminal can send a service, but cannot receive a service. Therefore, a time period corresponding to the sleep state of the second terminal may be considered as a time period in which the second terminal does not tend to receive a service. Therefore, a time period corresponding to the active state of the second terminal may be considered as a time period in which the second terminal tends to receive a service. A sidelink resource in the time period corresponding to the active state of the second terminal may be considered as a sidelink resource on which the second terminal tends to receive a service. A sidelink resource in the time period corresponding to the sleep state of the second terminal may be considered as a sidelink resource on which the second terminal does not tend to receive a service.

The first terminal in this embodiment of this application may be a terminal that recommends a sidelink resource to the second terminal. The first terminal may be a terminal that specifically recommends a sidelink resource to the second terminal or a terminal other than the second terminal. Alternatively, the first terminal in this embodiment of this application may be a terminal that needs to receive a service from the second terminal. In this case, to improve receiving quality of receiving the service by the first terminal, the first terminal may sense one or more sidelink resources from a resource pool by using a sensing technology, and then recommend information about the one or more sidelink resources to the second terminal. Because the one or more sidelink resources are determined by the first terminal, the first terminal may select, from the sensed sidelink resources, a sidelink resource that helps improve receiving quality, and recommend the sidelink resource to the second terminal. This helps improve receiving quality of the first terminal.

For example, the first terminal may be the terminal 100 shown in FIG. 2, and the second terminal may be the terminal 200 shown in FIG. 2.

In a possible implementation of this application, step 401 in this embodiment of this application may be implemented in the following manner: The first terminal receives a first message sent by a third terminal, where the first message is used to determine the transmission status of the second terminal. For example, the first message includes information about a sidelink resource X on which or information about a time period X in which the third terminal reserves to or tends to send a service to the second terminal. In this case, for the second terminal, the time period X is a time period in which the service can be received, and the sidelink resource X is a sidelink resource on which the service can be received. It should be noted that the first information sent by the third terminal may be specially sent to the first terminal, or may be specially sent by the third terminal to the second terminal. However, the first message may be listened to by the second terminal. Alternatively, the first message is a broadcast message sent by the third terminal. Alternatively, the third terminal sends the first message to a group, and the first terminal and the second terminal belong to the group, so that the first terminal can receive the first message sent by the third terminal.

In a possible implementation of this application, step 401 in this embodiment of this application may be implemented in the following manner: The first terminal receives transmission information from the second terminal.

The transmission information may be actively sent by the second terminal to the first terminal. For example, when triggering the first terminal to recommend a sidelink resource to the second terminal, the second terminal sends the transmission status of the second terminal to the first terminal.

In addition, the transmission information may be sent by the second terminal based on trigger of the first terminal. For example, when the first terminal determines to recommend a sidelink resource to the second terminal, the first terminal may send a request message to the second terminal, where the request message is used to request the transmission status of the second terminal. Then, the second terminal sends the transmission information of the second terminal to the first terminal based on the request message. Correspondingly, the first terminal receives the transmission information from the second terminal.

In a possible embodiment of this application, before step 401, the method may further include: The first terminal determines to recommend a sidelink resource to the second terminal.

In an example, in this embodiment of this application, that the first terminal determines to recommend a sidelink resource to the second terminal may include: The first terminal receives a trigger message from the second terminal, where the trigger message is used to indicate the first terminal to recommend the sidelink resource to the second terminal. The first terminal determines to recommend the sidelink resource to the second terminal based on the trigger message.

In another example, in this embodiment of this application, that the first terminal determines to recommend a sidelink resource to the second terminal may include: When the first terminal determines that a service from the second terminal needs to be received, the first terminal may determine to recommend the sidelink resource to the second terminal.

For example, if the first terminal determines, based on preconfiguration information or an indication from the second terminal, that the service from the second terminal needs to be received in a time period 1, the first terminal may determine to recommend the sidelink resource to the second terminal.

Step 402: The first terminal determines one or more sidelink resources based on the transmission status. The sidelink resource may be used by the second terminal to send data.

At least one of the one or more sidelink resources does not overlap a resource corresponding to service transmission of the second terminal. The resource corresponding to service transmission of the second terminal may be a time period in which the second terminal tends to receive/send the service or a used sidelink resource. Alternatively, the resource corresponding to service transmission of the second terminal may be a time period or a sidelink resource used for reserving to receive/send the service.

The one or more sidelink resources in the embodiment described in FIG. 4 of this application are sidelink resources that are selected by the first terminal and that are used by the second terminal to send data. In other words, the first terminal recommends that the second terminal may use the one or more sidelink resources to send data.

In an example, all of the one or more sidelink resources do not overlap the resource corresponding to service transmission of the second terminal.

In another example, some of the one or more sidelink resources do not overlap the resource corresponding to service transmission of the second terminal, but the other of the one or more sidelink resources overlap the resource corresponding to service transmission of the second terminal.

With reference to the foregoing descriptions of the transmission status, a condition that is met by at least one of the one or more sidelink resources is described below with reference to different transmission statuses. For example, the at least one sidelink resource meets any one or more of the following conditions 1-1 to 1-4:

Condition 1-1: When the transmission status includes the information used to indicate the first time period, a time range of the at least one sidelink resource does not overlap the first time period.

That a time range of the sidelink resource does not overlap the first time period may mean that there is no intersection between the time range of the sidelink resource and the first time period, that is, a time domain position of the sidelink resource does not overlap the first time period.

A purpose of determining the one or more sidelink resources by the first terminal is to recommend information about the one or more sidelink resources to the second terminal, so that the second terminal selects one resource from the one or more sidelink resources to send a service. Therefore, when the first time period is a time period in which the second terminal reserves to receive a service, or the first time period is a time period in which the second terminal tends to receive a service, if the time range of the sidelink resource overlaps the time period in which the second terminal reserves to receive a service, a conflict between receiving and sending occurs on the second terminal. Based on this, the one or more sidelink resources determined by the first terminal should include at least a sidelink resource whose time range does not overlap the first time period, so as to avoid a conflict between receiving and sending of the second terminal. For example, if the first time period is the slot 1, the time range of the sidelink resource may be a slot other than the slot 1. In other words, the sidelink resource is located in a slot other than the slot 1.

In this embodiment of this application. "service" in "the second terminal reserves to send a service or the second terminal tends to send a service" may be a specified service (the service is different from a service carried on the at least one sidelink resource). In this case, reserving to send a service or tending to send a service indicates that the second terminal can send a specified service in the time period or on the resource, but cannot send a non-specified service in the time period or on the resource.

When the first time period is a time period in which the second terminal reserves to send a service, if the service that the second terminal reserves to send is different from the service added by the second terminal to the at least one sidelink resource, a sidelink resource that does not overlap the time period in which the second terminal reserves to send the service is selected, so as to avoid simultaneous sending of a plurality of different services.

It should be noted that the second terminal may further indicate, to the first terminal, an identifier of the service reserved to be sent. If the service that the second terminal reserves to send and the service added by the second terminal to the at least one sidelink resource are a same service, the time range of the at least one sidelink resource may overlap the first time period.

In an embodiment of this application, when the second terminal cannot simultaneously send a plurality of services, the time range of the at least one sidelink resource does not overlap the first time period.

In an embodiment of this application, when the second terminal can simultaneously send a plurality of services, the time range of the at least one sidelink resource may overlap the first time period. In this way, the second terminal can send a plurality of services in an overlapping time period, so that transmit power of the second terminal is increased.

When the first time period is a time period in which the second terminal does not tend to send a service, a sidelink resource that does not overlap the time period in which the second terminal does not tend to send the service is selected, so that a sidelink resource recommended to the second terminal can meet a transmission requirement of the second terminal.

In this embodiment of this application, "service" in a time period in which/sidelink resource on which the second terminal does not tend to send a service may be a specified service (the service is the same as a service carried on the at least one sidelink resource). In this case, the time period in which/sidelink resource on which the second terminal does not tend to send the service indicates that the second terminal cannot send a specified service in the time period or on the resource, but can send a non-specified service in the time period or on the resource.

In this embodiment of this application, "service" in a time period in which/sidelink resource on which the second terminal does not tend to send a service may be a general service. In this case, the time period in which/sidelink resource on which the second terminal does not tend to send the service indicates that the second terminal cannot send any task in the time period or on the resource.

Condition 1-2: When the transmission status includes the information about the second sidelink resource, the at least one sidelink resource does not overlap the second sidelink resource.

When the second sidelink resource is a sidelink resource on which the second terminal reserves to transmit a service, it indicates that the second terminal reserves to send or receive the service on the second sidelink resource.

When the second sidelink resource is a resource on which the second terminal reserves to send a service, or the second sidelink resource is a sidelink resource in a time period in which the second terminal reserves to send a service, if the at least one sidelink resource overlaps the second sidelink resource, the second terminal may select to send a service only to a terminal a or a terminal b on the overlapped sidelink resource. Consequently, a plurality of conflicts exist during sending. Therefore, a sidelink resource that does not overlap the sidelink resource on which the second terminal reserves to send the service is selected, so as to avoid the conflict.

In addition, when the second sidelink resource is a sidelink resource on which the second terminal tends to receive a service, or a sidelink resource in a time period in which the second terminal tends to receive a service, or a sidelink resource on which the second terminal reserves to receive a service, or a sidelink resource in a time period in which the second terminal reserves to receive a service, if the at least one sidelink resource overlaps the second sidelink resource, the second terminal cannot send a service and receive a service on the overlapped sidelink resource. Therefore, a sidelink resource that does not overlap the sidelink resource on which the second terminal reserves to receive the service is selected, so as to avoid a conflict between receiving and sending.

Moreover, when the second sidelink resource is a sidelink resource on which the second terminal does not tend to send a service, or a sidelink resource in a time period in which the second terminal does not tend to send a service, a sidelink resource that does not overlap the second sidelink resource is selected as the at least one sidelink resource, so that a sidelink resource recommended to the second terminal meets a transmission requirement of the second terminal. For example, if the second terminal does not tend to send a service on the sidelink resource 1, the one or more sidelink resources do not include the sidelink resource 1. For example, if the second terminal does not tend to send a service in the time period 1, the one or more sidelink resources do not include all sidelink resources in the time period 1.

Condition 1-3: When the transmission status includes the information used to indicate the second time period, a time range of the at least one sidelink resource overlaps the second time period.

In this embodiment of this application, that a time range of the at least one sidelink resource overlaps the second time period may mean that the time range of the at least one sidelink resource is within the second time period, or there is an intersection between the time range of the at least one sidelink resource and the second time period, or the time range of the at least one sidelink resource includes the second time period, or the time range of the at least one sidelink resource is the same as the second time period.

In view of a function of the second time period described above, the one or more sidelink resources include at least one sidelink resource whose time range overlaps the second time period, so that the second terminal can select, from the sidelink resources recommended by the first terminal, a sidelink resource to send a service, or a conflict between receiving and sending of the second terminal can be avoided.

Condition 1-4: When the transmission status includes the information about the third sidelink resource, the at least one sidelink resource overlaps the third sidelink resource.

In this embodiment of this application, that the at least one sidelink resource overlaps the third sidelink resource may mean that the at least one sidelink resource includes the third sidelink resource, or the at least one sidelink resource includes some sidelink resources of the third sidelink resource. For example, if the third sidelink resource includes a sidelink resource a and a sidelink resource b, the at least one sidelink resource includes one or more of the sidelink resource a and the sidelink resource b.

The third sidelink resource is a sidelink resource on which the second terminal tends to send a service, or the third sidelink resource is a sidelink resource on which the second terminal does not tend to receive a service, or the third sidelink resource is a sidelink resource in a time period in which the second terminal tends to send a service, or the third sidelink resource is a sidelink resource in a time period in which the second terminal does not tend to receive a service. Therefore, the one or more sidelink resources include at least one sidelink resource whose time range overlaps the third sidelink resource, so that the second terminal can select, from the sidelink resources recommended by the first terminal, a sidelink resource to send a service, or a conflict between receiving and sending of the second terminal can be avoided.

In a specific implementation, step 402 may be implemented in the following manner: The first terminal may sense sidelink resources in the resource pool by using the sensing technology, and then the first terminal determines one or more sidelink resources from the sensed sidelink resources based on the transmission status.

In an embodiment of this application, the first terminal may actively sense a sidelink resource, or may sense a sidelink resource when triggered by the second terminal. For example, if the first terminal receives a trigger message from the second terminal, the first terminal determines to sense the sidelink resource.

In this embodiment of this application, "data" in "the sidelink resource may be used by the second terminal to send data" is general data, that is, the second terminal may not only send data A but also send data B on the sidelink resource.

In addition, in this embodiment of this application, "data" in "the sidelink resource may be used by the second terminal to send data" is specified data, that is, the sidelink resource is used to separately transmit specified data.

Step 403: The first terminal sends first information to the second terminal, and correspondingly the second terminal receives the first information from the first terminal.

The first information is used to indicate information about the one or more sidelink resources. The information about the sidelink resource is used to determine the sidelink resource.

For example, the first information may include identifiers (numbers and indexes) of the one or more sidelink resources, time-frequency positions (time domain positions and frequency domain positions) of the one or more sidelink resources, or other parameters used to identify the one or more sidelink resources. This is not limited in this embodiment of this application.

In this embodiment of this application, the one or more sidelink resources may be all or some of the sidelink resources sensed by the first terminal. For example, after sensing the sidelink resources, the first terminal may perform screening on the sensed sidelink resources based on the transmission status and a specific rule, and then obtain the one or more sidelink resources.

For example, when the first terminal does not learn of the transmission status, the first terminal performs screening on the sensed sidelink resources, to obtain a sidelink resource 1 to a sidelink resource 4. A channel busy ratio (channel busy ratio, CBR) of the sidelink resource 3 is the lowest. When the transmission status is not considered, the first terminal may recommend the sidelink resource 3 to the second terminal. However, for example, the transmission status includes the first time period that needs to be avoided by the first terminal. If the sidelink resource 3 is located in the first time period, the one or more sidelink resources finally recommended by the first terminal to the second terminal do not include the sidelink resource 3.

It should be noted that the first information may also be referred to as assistance information. To be specific, the first terminal may recommend the one or more sidelink resources to the second terminal by using the first information, so that the second terminal determines, based on the one or more sidelink resources, a sixth sidelink resource for sending data.

In an embodiment of this application, step 403 in this embodiment of this application may be implemented in the following manner: The first terminal sends, by using a sidelink resource A, the first information to the second terminal on a sidelink established between the first terminal and the second terminal.

In this embodiment of this application, before the first terminal sends the first information to the second terminal, the method may further include: The first terminal determines the sidelink resource A.

The sidelink resource A may be determined by the first terminal from the sensed sidelink resources based on a preset rule. For example, the sidelink resource A is randomly determined by the first terminal from the sensed sidelink resources. For example, the sidelink resource A is determined by the first terminal from the sensed sidelink resources based on the transmission status of the second terminal. In this case, the sidelink resource A determined by the first terminal may be a sidelink resource on which the second terminal tends to receive a service, or may not be a sidelink resource on which the second terminal cannot receive or does not tend to receive a service. This can ensure that the second terminal successfully receives the first information. For a manner of selecting the sidelink resource A, refer to the following embodiment described in FIG. 6. This is not limited in this embodiment of this application.

Step 404: The second terminal determines the one or more sidelink resources based on the first information.

According to the resource determining method provided in this embodiment of this application, the one or more sidelink resources that can be used to send data and that are determined by the first terminal for the second terminal without learning of the transmission status of the second terminal may include a sidelink resource that conflicts with transmission of the second terminal, and the conflicted sidelink resource is an invalid resource for the second terminal. However, in this embodiment of this application, the first terminal obtains the transmission status of the second terminal, and then the first terminal determines the one or more sidelink resources with reference to the transmission status of the second terminal, so that the one or more sidelink resources determined by the first terminal for the second terminal do not include a resource corresponding to transmission of the second terminal. This prevents the one or more sidelink resources determined by the first terminal for the second terminal from conflicting with the resource corresponding to transmission of the second terminal.

It should be noted that the one or more sidelink resources determined by the second terminal based on the first information in step 404 are sidelink resources that are selected (or recommended) by the first terminal for the second terminal and that are used by the second terminal to send data.

In a possible implementation of this embodiment of this application, the method provided in this embodiment of this application may further include: The second terminal determines a sixth sidelink resource based on the one or more sidelink resources. The sixth sidelink resource is used by the second terminal to send a service. The service may be sent by the second terminal to the first terminal on the sixth sidelink resource, or the service may be sent by the second terminal to a terminal other than the first terminal on the sixth sidelink resource. In other words, in this embodiment of this application, the one or more sidelink resources recommended by the first terminal to the second terminal may carry a service sent to the first terminal, and may also carry a service sent to another terminal.

In a possible implementation of this application, that the second terminal determines a sixth sidelink resource based on the one or more sidelink resources includes: The second terminal determines the sixth sidelink resource from the one or more sidelink resources. The sixth sidelink resource does not overlap the resource corresponding to service transmission of the second terminal. For example, if all of the one or more sidelink resources do not overlap the resource corresponding to service transmission of the second terminal, the second terminal may randomly select one sidelink resource from the one or more sidelink resources as the sixth sidelink resource. Alternatively, the second terminal may select a sidelink resource with a high priority as the sixth sidelink resource based on a priority of each sidelink resource.

In a possible implementation of this application, that the second terminal determines a sixth sidelink resource based on the one or more sidelink resources includes: The second terminal determines the sixth sidelink resource from the one or more sidelink resources and a candidate sidelink resource set. In this case, the sixth sidelink resource may belong to the one or more sidelink resources, or the sixth sidelink resource may belong to the candidate sidelink resource set. The candidate sidelink resource set may be a set of sidelink resources sensed by the second terminal, or a set of sidelink resources recommended by a terminal other than the first terminal to the second terminal. This is not limited in this embodiment of this application.

When the second terminal determines the sixth sidelink resource, the method provided in this embodiment of this application may further include; The second terminal sends the service on the sixth sidelink resource. For example, the second terminal sends the service to the first terminal on the sixth sidelink resource, and correspondingly the first terminal receives the service from the second terminal on the sixth sidelink resource. In this embodiment of this application, this manner may also be referred to as that the second terminal sends the service in a unicast manner. For example, the second terminal sends the service on the sixth sidelink resource in a broadcast form or a multicast form. When the service is sent in a broadcast form, all terminals (for example, including the first terminal) that can receive the broadcast from the second terminal can receive the service. When the second terminal sends the service in a multicast manner, for example, sends the service to a group 1 (for example, including the first terminal) in a multicast manner, all terminals in the group 1 may receive the service sent by the second terminal.

It should be noted that, if the one or more sidelink resources include a sidelink resource that conflicts with the resource corresponding to service transmission of the second terminal, the second terminal may compare priorities of two services that need to be carried and that conflict. For example, the second terminal needs to send a service A on the sixth sidelink resource, and the sixth sidelink resource conflicts with a time period in which the second terminal reserves to/tends to send the service. If a priority of the service that the second terminal reserves to send is lower than a priority of the service A, the second terminal may still select to send the service A on the sixth sidelink resource, and abandon sending, in the time period in which the sixth sidelink resource is located, the service that the second terminal reserves to/tends to send. For example, the second terminal needs to send a service A on the sixth sidelink resource, and the sixth sidelink resource conflicts with a time period in which the second terminal reserves to/tends to receive the service. If a priority of the service that the second terminal reserves to/tends to receive is lower than a priority of the service A, the second terminal may still select to send the service A on the sixth sidelink resource, and abandon sending, in the time period in which the sixth sidelink resource is located, the service that the second terminal reserves to/tends to receive.

In an embodiment of this application, step 402 may be implemented in the following manner: The first terminal determines, based on the transmission status, one or more candidate sidelink resources from sidelink resources sensed by the first terminal. Then, the first terminal determines the one or more sidelink resources from the one or more candidate sidelink resources. The one or more candidate sidelink resources include at least a sidelink resource that does not overlap a resource corresponding to service transmission of the second terminal. The one or more sidelink resources may be all or some of the one or more candidate sidelink resources. This is not limited in this embodiment of this application.

For example, if the transmission status includes a time period A in which the second terminal reserves to receive a service, the first terminal may select, from the sensed sidelink resources based on the time period A, a candidate sidelink resource 1 to a candidate sidelink resource 10 that are located outside the time period A Then, the first terminal may determine one or more sidelink resources from the candidate sidelink resource 1 to the candidate sidelink resource 10.

In an embodiment of this application, step 402 may be implemented in the following manner: The first terminal determines one or more candidate sidelink resources from sidelink resources sensed by the first terminal. Then, the first terminal determines the one or more sidelink resources from the one or more candidate sidelink resources based on the transmission status. The one or more candidate sidelink resources may include a sidelink resource that overlaps a resource corresponding to service transmission of the second terminal. The one or more sidelink resources may include at least a sidelink resource that does not overlap the resource corresponding to service transmission of the second terminal. This is not limited in this embodiment of this application.

For example, if the transmission status includes a time period A in which the second terminal reserves to receive a service, the first terminal selects a candidate sidelink resource 11 to a candidate sidelink resource 21 from the sensed sidelink resources. Because the first terminal selects the candidate sidelink resource 11 to the candidate sidelink resource 21 without referring to the transmission status of the second terminal, the candidate sidelink resource 11 to the candidate sidelink resource 21 may include a sidelink resource (for example, the candidate sidelink resource 11 to the candidate sidelink resource 16) whose time range is within the time period A, or may include a sidelink resource (for example, the candidate sidelink resource 17 to the candidate sidelink resource 21) whose time range is outside the time period A. To avoid a conflict between receiving and sending of the second terminal, the first terminal may select the candidate sidelink resource 17 to the candidate sidelink resource 21 as one or more sidelink resources. Certainly, the one or more sidelink resources may alternatively include all or some of the candidate sidelink resource 11 to the candidate sidelink resource 16.

Figure 5:
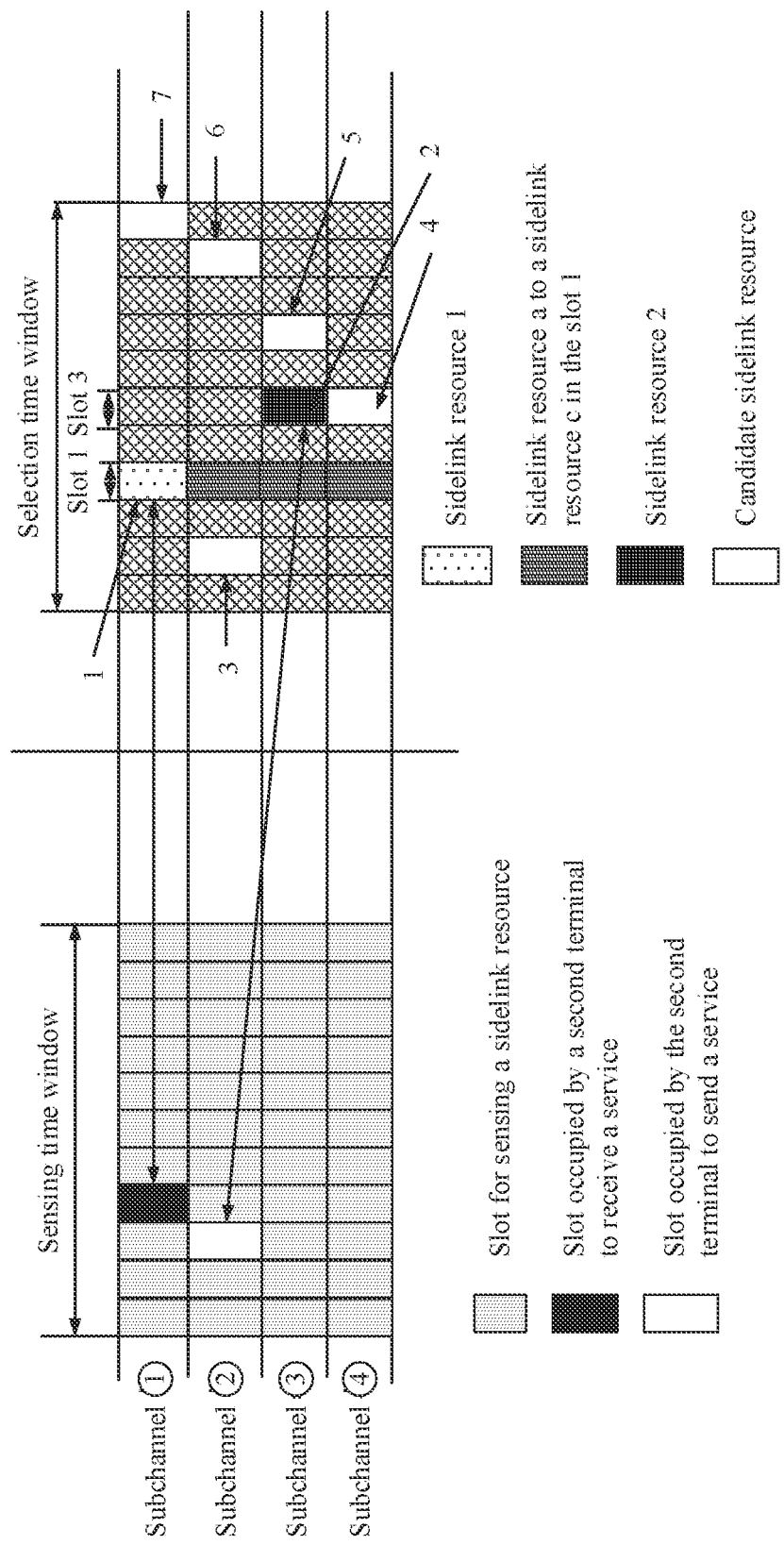
FIG. 5 is a schematic diagram in which a first terminal selects a sidelink resource used by a second terminal to send data according to an embodiment of this application.

For example, as shown in FIG. 5, the first terminal receives reserved transmission to the second terminal on a subchannel (subchannel) ①. For example, the terminal a reserves to send the service to the second terminal on the sidelink resource 1. In this case, for the second terminal, the sidelink resource 1 is a sidelink resource used by the second terminal to receive the service. Therefore, the first terminal may not consider the sidelink resource 1 when selecting a sidelink resource in a selection time window.

Optionally, as shown in FIG. 5, because a slot in which the sidelink resource 1 is located is the slot 1, to further avoid a conflict between receiving and sending of the second terminal, the first terminal may not consider a sidelink resource other than the sidelink resource 1 in the slot 1. As shown in FIG. 5, the sidelink resource 1 and a sidelink resource a to a sidelink resource c are all located in the slot 1. Therefore, the first terminal does not consider the sidelink resource 1 and the sidelink resource a to the sidelink resource c when selecting the sidelink resource in the selection time window.

For another example, the first terminal receives reserved transmission of the second terminal on a subchannel ②. For example, if the second terminal reserves to send the service to the first terminal or another terminal on the sidelink resource 2, the first terminal may not consider the sidelink resource 2 when selecting the sidelink resource in the selection time window.

Finally, as shown in FIG. 5, for example, the one or more sidelink resources do not overlap transmission of the second terminal. When the second terminal can simultaneously send a plurality of services, the first terminal may determine that the one or more sidelink resources include the candidate sidelink resource 3 to the candidate sidelink resource 7.

When the second terminal cannot simultaneously send a plurality of services, because the sidelink resource 2 is a resource on which the second terminal reserves to send a service, the sidelink resource 2 is located in a slot 3, and a time range in which the sidelink resource 4 is located is also located in the slot 3, the first terminal may determine that the one or more sidelink resources include the candidate sidelink resource 3 and the candidate sidelink resource 5 to the candidate sidelink resource 7.

Figure 6:
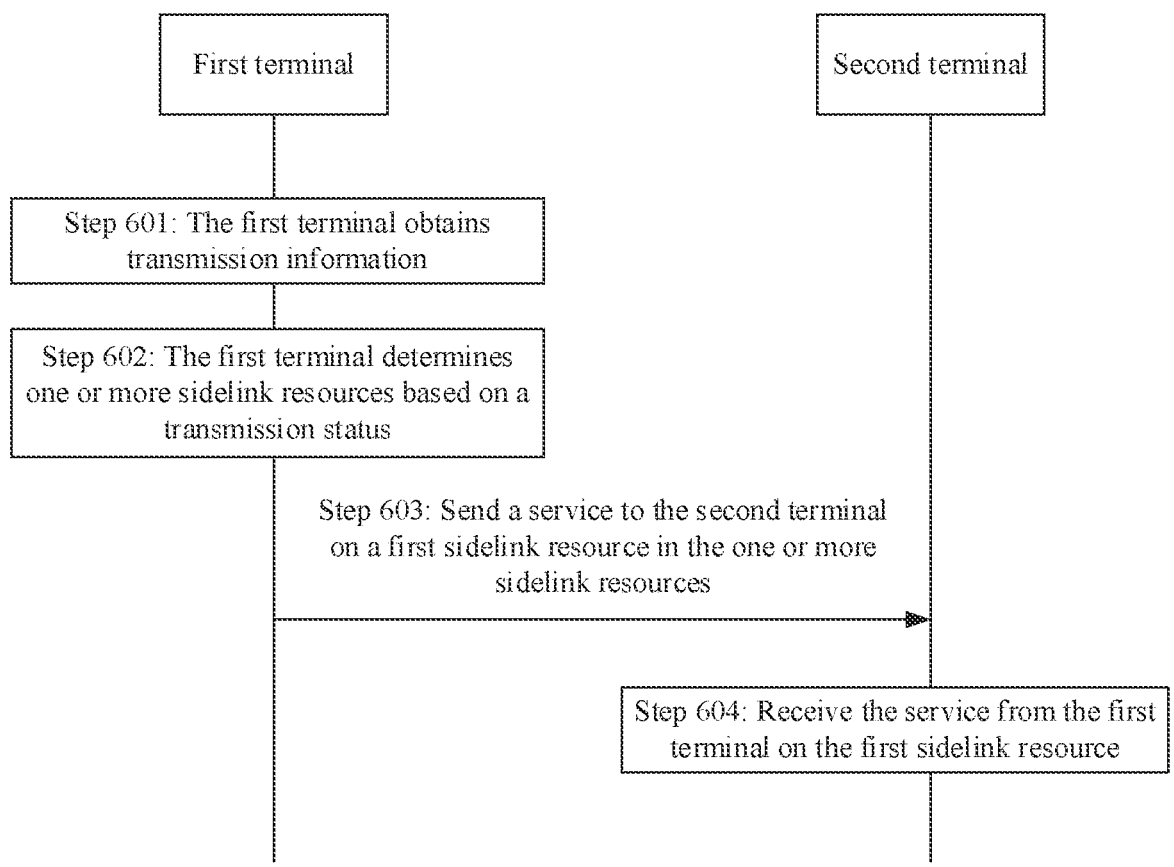
FIG. 6 is a schematic flowchart of another resource determining method according to an embodiment of this application.

FIG. 6 shows an interaction embodiment of a resource determining method according to an embodiment of this application. The method includes the following steps.

Step 601: A first terminal obtains transmission information, where the transmission information is used to determine a transmission status of a second terminal.

For example, the transmission status includes one or more of the following: information about a fourth sidelink resource, information used to indicate a third time period, information used to indicate a fourth time period, and information about a fifth sidelink resource.

The fourth sidelink resource is a resource on which the second terminal reserves to receive a service, or the fourth sidelink resource is a resource on which the second terminal reserves to send a service, or the fourth sidelink resource is a resource on which the second terminal tends to send a service, or the fourth sidelink resource is a resource on which the second terminal does not tend to receive a service, or the fourth sidelink resource is a resource on which the second terminal reserves to receive a service, or the fourth sidelink resource is a resource in a time period in which the second terminal reserves to receive a service, or the fourth sidelink resource is a resource in a time period in which the second terminal reserves to send a service, or the fourth sidelink resource is a resource in a time period in which the second terminal tends to send a service, or the fourth sidelink resource is a resource in a time period in which the second terminal does not tend to receive a service.

The third time period is a time period in which the second terminal reserves to send a service, or the third time period is a time period in which the second terminal tends to send a service, or the third time period is a time period in which the second terminal does not tend to receive a service, or the third time period is a time period in which a sidelink resource on which the second terminal reserves to send a service is located, or the third time period is a time period in which a sidelink resource on which the second terminal may receive a service is located.

Figure 8:
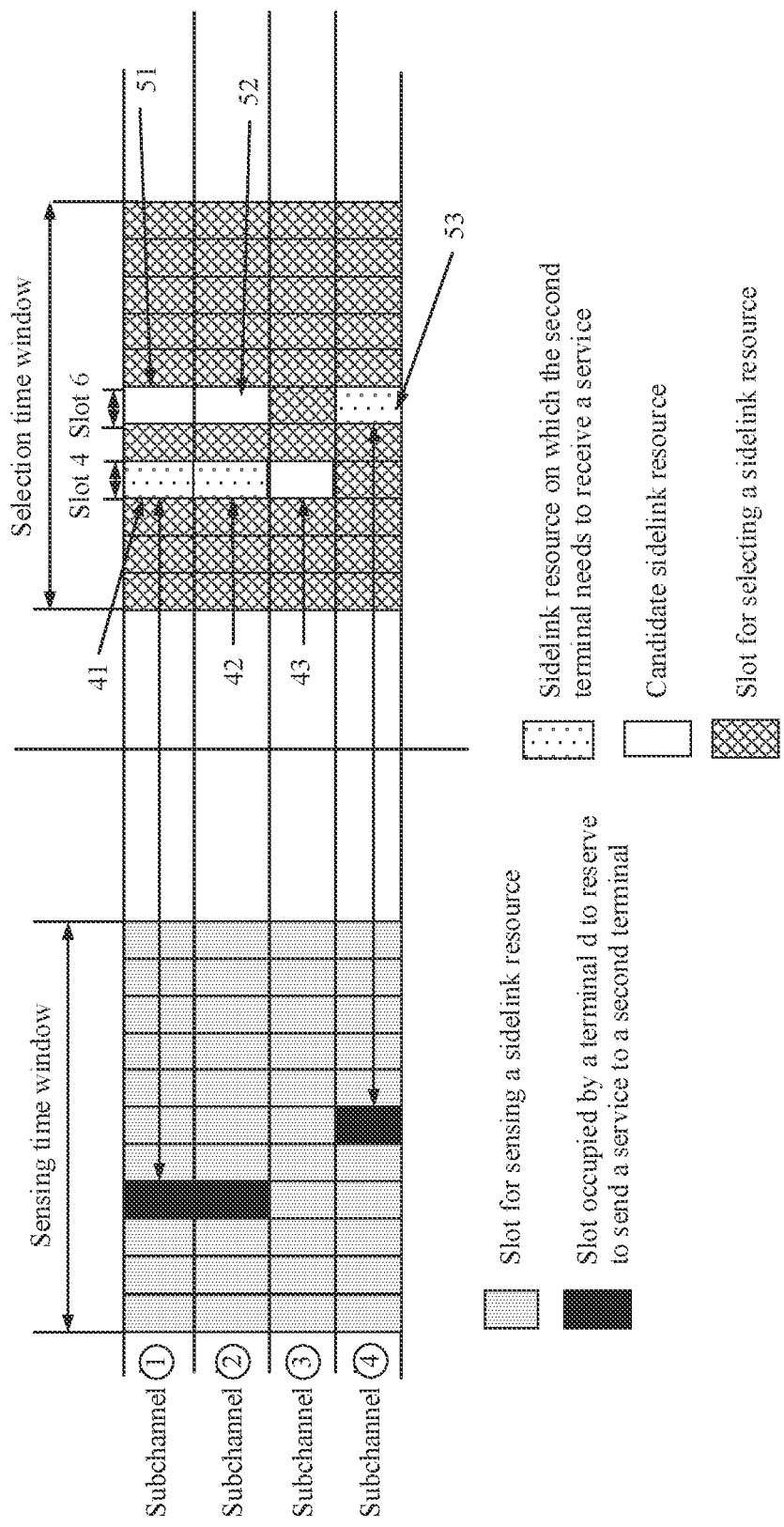
FIG. 8 is another schematic diagram in which a first terminal selects a sidelink resource to send a service to a second terminal according to an embodiment of this application.

The fourth time period is a time period in which the second terminal tends to receive a service, or the fourth time period is a time period in which the second terminal does not tend to send a service, or the fourth time period is a time period in which the second terminal reserves to receive a service, or the fourth time period is a time period in which a sidelink resource on which the second terminal reserves to receive a service is located. For example, a slot 4 and a slot 6 shown in FIG. 8 are time periods in which the second terminal reserves to receive a service.

The fifth sidelink resource is a resource on which the second terminal tends to receive a service, or the fifth sidelink resource is a resource on which the second terminal does not tend to send a service, or the fifth sidelink resource is a resource in a time period in which the second terminal tends to receive a service, or the fifth sidelink resource is a resource in a time period in which the second terminal does not tend to send a service.

For a manner in which the first terminal obtains the transmission information in step 601, refer to the descriptions in step 401. Details are not described herein again.

Step 602: The first terminal determines one or more sidelink resources based on the transmission status, where the sidelink resource may be used to carry a service sent to the second terminal.

In an embodiment of this application, all of the one or more sidelink resources do not conflict with the transmission status of the second terminal. In this case, because the first terminal selects a sidelink resource with reference to the transmission status of the second terminal, the first terminal may exclude a conflicted sidelink resource when selecting the sidelink resource.

In another embodiment of this application, the one or more sidelink resources include a sidelink resource that does not conflict with the transmission status of the second terminal, and also include a sidelink resource that conflicts with the transmission status of the second terminal.

In an embodiment of this application, step 602 may be implemented in the following manner: The second terminal determines a to-be-selected resource pool, where the to-be-selected resource pool includes at least a sidelink resource that can be used to carry the service sent to the second terminal. The second terminal determines the one or more sidelink resources from the to-be-selected resource pool based on the transmission status of the second terminal.

The one or more sidelink resources in the embodiment described in FIG. 6 in this application are sidelink resources that are determined by the first terminal and that are used by the first terminal to send data.

Step 603: The first terminal sends the service to the second terminal on a first sidelink resource in the one or more sidelink resources, and correspondingly the second terminal receives the service from the first terminal on the first sidelink resource.

To avoid a case in which the second terminal cannot correctly receive the service because of a conflict between the first sidelink resource used by the first terminal to send the service to the second terminal and a resource corresponding to service transmission of the second terminal, in an embodiment of this application, the first sidelink resource does not overlap the resource corresponding to service transmission of the second terminal.

For example, the first sidelink resource meets one or more of the following conditions:

Condition 2-1: When the transmission status includes the information about the fourth sidelink resource, the first sidelink resource does not overlap the fourth sidelink resource.

For example, the fourth sidelink resource is a resource on which the second terminal reserves to receive a service. That the first sidelink resource does not overlap the fourth sidelink resource may mean that the first sidelink resource is not the fourth sidelink resource. This can avoid a conflict between a service sent by the first terminal on the first sidelink and a resource on which the second terminal reserves to receive a service.

For example, the fourth sidelink resource is a resource on which the second terminal reserves to send a service or a resource on which the second terminal tends to send a service. That the first sidelink resource does not overlap the fourth sidelink resource may mean that the first sidelink resource is not the fourth sidelink resource, or a time range in which the first sidelink resource is located does not overlap a time range in which the fourth sidelink resource is located. This can avoid a conflict between receiving and sending of the second terminal.

For example, the fourth sidelink resource is a resource on which the second terminal does not tend to receive a service. That the first sidelink resource does not overlap the fourth sidelink resource may mean that the first sidelink resource is not the fourth sidelink resource. When the first terminal sends the service to the second terminal, the second terminal may also sense sidelink resources, and then determine a sidelink resource that helps improve receiving quality of the second terminal and a sidelink resource (for example, the fourth sidelink resource) that affects the receiving quality of the second terminal. Therefore, the sidelink resource that affects the receiving quality of the second terminal is provided for the first terminal, so as to avoid a problem that the second terminal cannot normally receive the service because the service is sent to the second terminal on the sidelink resource on which the second terminal does not tend to receive the service.

Condition 2-2: When the transmission status includes the information used to indicate the third time period, a time range indicated by the first sidelink resource does not overlap the third time period.

For example, the third time period is a time period in which the second terminal reserves to send a service, or the third time period is a time period in which the second terminal tends to send a service, or the third time period is a time period in which a sidelink resource on which the second terminal reserves to send a service is located. A sidelink resource whose time range does not overlap the third time period is selected as the first sidelink resource, so as to avoid a conflict between receiving and sending of the second terminal.

For example, the third time period is a time period in which the second terminal does not tend to receive a service. A sidelink resource whose time range does not overlap the third time period is selected as the first sidelink resource, so as to avoid a problem that the second terminal fails to receive a service because the service is sent to the second terminal in a time period that is not reserved by the second terminal.

Condition 2-3: When the transmission status includes the information used to indicate the fourth time period, the time range in which the first sidelink resource is located overlaps the fourth time period.

That the time range in which the first sidelink resource is located overlaps the fourth time period may mean that the time range in which the first sidelink resource is located is within the fourth time period, or the time range in which the first sidelink resource is located includes the fourth time period, or the time range in which the first sidelink resource is located partially overlaps the fourth time period.

For example, the fourth time period is a time period in which the second terminal tends to receive a service, or the fourth time period is a time period in which the second terminal reserves to receive a service. A sidelink resource whose time range overlaps the fourth time period is selected, so as to help the second terminal correctly receive the service from the first terminal.

The fourth time period is a time period in which the second terminal does not tend to send a service. A sidelink resource whose time range overlaps the fourth time period is selected, so as to avoid a conflict between receiving and sending of the second terminal. Optionally, the first sidelink resource is located in a time period in which the second terminal does not tend to send a service.

Condition 2-4: When the transmission status includes the information about the fifth sidelink resource, the first sidelink resource belongs to the fifth sidelink resource.

For example, the fifth sidelink resource is a resource on which the second terminal tends to receive a service. The first sidelink resource that belongs to the fifth sidelink resource is selected to send the service to the second terminal, so as to increase a success rate of receiving the service by the second terminal.

For example, before the first terminal sends the service to the second terminal, to increase receive power of the second terminal, the second terminal senses sidelink resources, and then selects a sidelink resource a to a sidelink resource c as the fifth sidelink resource. The second terminal receives the service on any one of the sidelink resource a to the sidelink resource c, so that receiving quality of the second terminal can be improved. Then, the second terminal may send information about the sidelink resource a to the sidelink resource c to the first terminal. In this case, the first terminal may preferentially determine the first sidelink resource from the sidelink resource a to the sidelink resource c.

For example, the fifth sidelink resource is a resource on which the second terminal does not tend to send a service. The first sidelink resource that belongs to the fifth sidelink resource is selected to send the service to the second terminal, so as to avoid a case in which the second terminal fails to receive the service because of a conflict between receiving and sending of the second terminal, and increase a success rate of receiving the service by the second terminal.

In this embodiment of this application, the service sent by the first terminal to the second terminal may be assistance information, and the assistance information includes information about the sidelink resource determined by the first terminal.

In this embodiment of this application, the service sent by the first terminal to the second terminal may be data or signaling. This is not limited in this embodiment of this application. For example, the service may be capability information that is sent by the first terminal to the second terminal and that indicates whether the first terminal can simultaneously send a plurality of services, or the service may be signaling that triggers the second terminal to sense a sidelink resource or triggers the second terminal to recommend a sidelink resource to the first terminal. This is not limited in this embodiment of this application.

In an embodiment of this application. "service" in "the first sidelink resource may be used to carry the service sent to the second terminal" is a general service, that is, the second terminal may not only send a service A but also send a service B on the first sidelink resource. In addition, "service" in "the first sidelink resource may be used by the second terminal to send the service" is a specified service, that is, the first sidelink resource is used to separately transmit a specified service.

Figure 7:
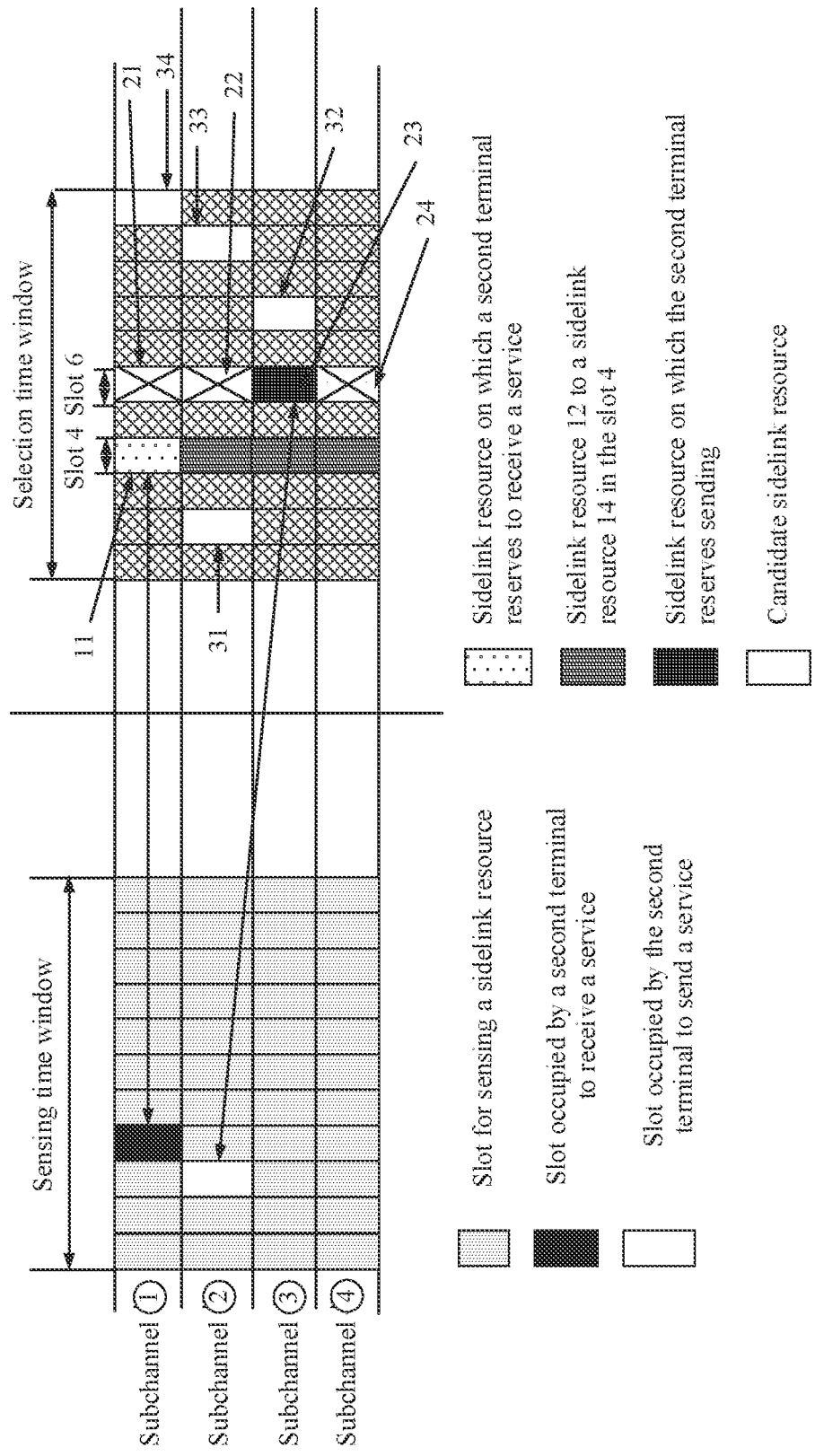
FIG. 7 is a schematic diagram in which a first terminal selects a sidelink resource to send a service to a second terminal according to an embodiment of this application.

For example, as shown in FIG. 7, the first terminal determines that transmission to the second terminal is reserved on a subchannel ①. In other words, another terminal reserves to send a service to the second terminal on a sidelink resource 11 in a slot 4. In other words, the second terminal may receive the service from the another terminal on the sidelink resource 11 in the slot 4. Therefore, to avoid a conflict between the service sent by the first terminal to the second terminal and another service that needs to be received by the second terminal, the first terminal may not consider the sidelink resource 11 when selecting the first sidelink resource.

In a possible implementation of this application, when selecting the first sidelink resource, the second terminal does not consider a sidelink resource whose time range is in the slot 4. In other words, none of the sidelink resource 11, a sidelink resource 12, a sidelink resource 13, and a sidelink resource 14 is used as the first sidelink resource.

For example, as shown in FIG. 7, the first terminal determines, on a subchannel ②, that the second terminal reserves to send a service on a sidelink resource 23. In this case, when the second terminal cannot simultaneously send a plurality of services, the first terminal may not consider a sidelink resource 21, a sidelink resource 22, the sidelink resource 23, and a sidelink resource 24 when selecting the first sidelink resource. However, when the second terminal can simultaneously send a plurality of services, the first terminal may not consider the sidelink resource 23, but may consider the sidelink resource 21, the sidelink resource 22, and the sidelink resource 24 when selecting the first sidelink resource. The sidelink resource 21, the sidelink resource 22, the sidelink resource 23, and the sidelink resource 24 indicate a same time range, for example, all are located in a slot 6.

Therefore, based on the foregoing descriptions, when the second terminal cannot simultaneously send a plurality of services, the first terminal may determine any one or more of a sidelink resource 31, a sidelink resource 32, a sidelink resource 33, and a sidelink resource 34 as the first sidelink resource.

When the second terminal can simultaneously send a plurality of services, the first terminal may determine any one or more of the sidelink resource 31, the sidelink resource 32, the sidelink resource 33, the sidelink resource 34, the sidelink resource 21, the sidelink resource 22, and the sidelink resource 24 as the first sidelink resource.

For example, as shown in FIG. 8, the first terminal determines that transmission to the second terminal is reserved on a subchannel ①, a subchannel ②, and a subchannel ④. For example, a terminal d separately reserves to send a service to the second terminal on a sidelink resource 41, a sidelink resource 42, and a sidelink resource 53. Correspondingly, the following case may exist: The second terminal receives the service on the sidelink resource 41 and the sidelink resource 42, and the second terminal receives the service on the sidelink resource 53. In this case, when selecting a sidelink resource that carries the service, the first terminal selects the sidelink resource from other resources in a slot in which the sidelink resource 41, the sidelink resource 42, or the sidelink resource 53 is located. For example, the candidate sidelink resource 43, the candidate sidelink resource 51, and the candidate sidelink resource 52 in FIG. 8 may be used as the first sidelink resource or one or more sidelink resources, so as to achieve an effect of saving receiving energy on a second terminal side.

According to the resource determining method provided in this embodiment of this application, the first sidelink resource that is used to carry the service and that is selected by the first terminal without learning of the transmission status of the second terminal may conflict with a resource corresponding to transmission of the second terminal, and the second terminal cannot correctly receive the service on the first sidelink resource in this conflict case. However, in this embodiment of this application, the first terminal obtains the transmission status of the second terminal, and then the first terminal determines the one or more sidelink resources with reference to the transmission status of the second terminal, so that the first sidelink resource that is selected by the first terminal and that is used to carry the service does not include the resource corresponding to transmission of the second terminal. This prevents the first sidelink resource that is selected by the first terminal and that is used to carry the service from conflicting with the resource corresponding to transmission of the second terminal.

Figure 9:
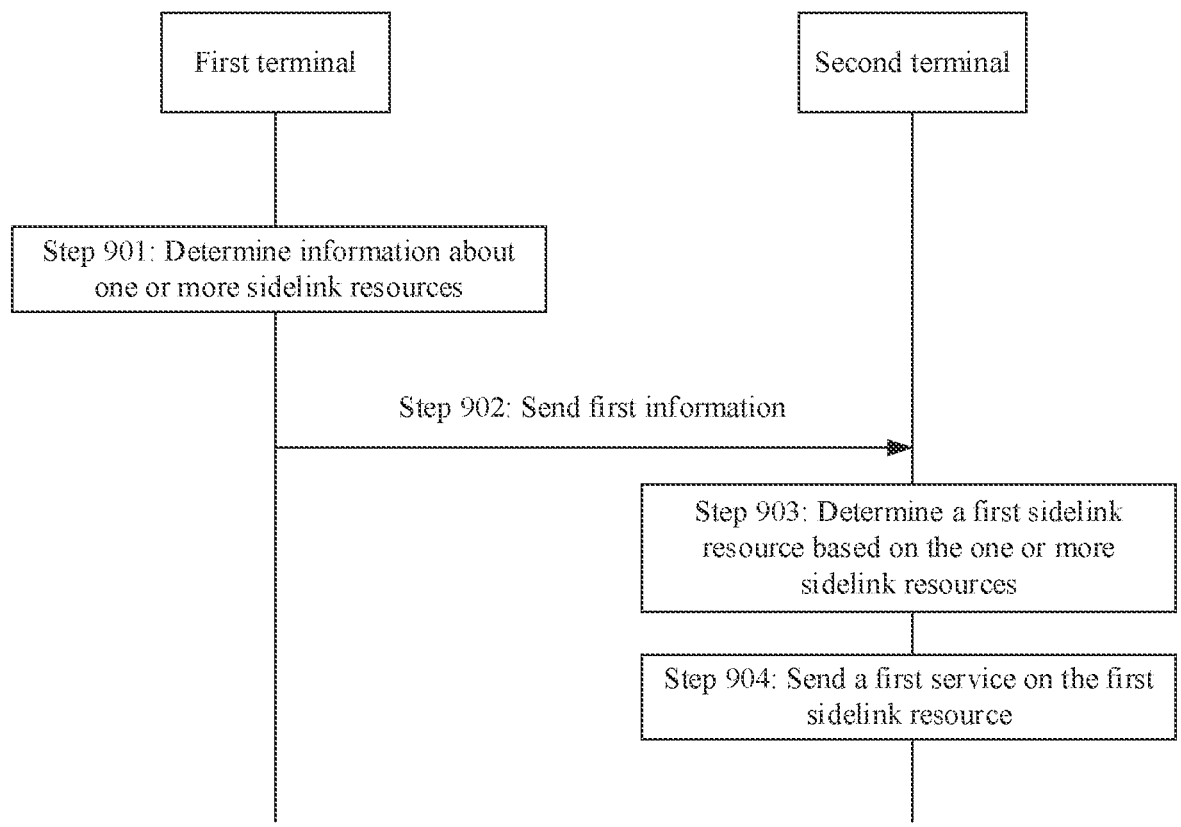
FIG. 9 is a schematic flowchart of still another resource determining method according to an embodiment of this application.

FIG. 9 shows an embodiment of another resource determining method according to an embodiment of this application. The method includes the following steps.

Step 901: A first terminal determines information about one or more sidelink resources.

In this embodiment of this application, the first terminal may actively determine the information about the one or more sidelink resources. For example, when the first terminal determines that a first service from a second terminal needs to be received, to improve receiving quality of receiving the first service by the first terminal, the first terminal selects the one or more sidelink resources that can be used by the second terminal to send the first service. Therefore, the first terminal may determine the information about the one or more sidelink resources. Alternatively, if the first terminal is a terminal that specially selects, for another terminal (for example, the second terminal), a sidelink resource used to send data, the first terminal may periodically select, for the another terminal based on a preset period, the sidelink resource used to send data.

The one or more sidelink resources described in FIG. 9 in this application are resources recommended by the first terminal to the second terminal to send data.

In this embodiment of this application, the first terminal may determine the information about the one or more sidelink resources based on trigger of another terminal. For example, the first terminal receives a trigger message from the second terminal, where the trigger message is used to indicate the first terminal to recommend a sidelink resource to the second terminal. In this case, the first terminal may determine the information about the one or more sidelink resources based on the trigger message. Certainly, the trigger message may alternatively be sent by a third terminal other than the second terminal to the first terminal. For example, if the third terminal needs to receive the first service from the second terminal, the third terminal may trigger the first terminal to recommend a sidelink resource to the second terminal.

In a possible embodiment of this application, before step 901, the method may further include: The first terminal senses sidelink resources in a resource pool. Therefore, step 901 may be implemented in the following manner: The first terminal selects the information about the one or more sidelink resources from the sensed sidelink resources. For a manner in which the first terminal selects, from the sensed sidelink resources, the one or more sidelink resources recommended to the second terminal, refer to descriptions in the conventional technology. Details are not described in this embodiment of this application. For example, the first terminal may select, as the one or more sidelink resources from the sensed sidelink resources, a sidelink resource that helps improve receiving quality.

Step 902: The first terminal sends first information to the second terminal, and correspondingly the second terminal receives the first information from the first terminal, where the first information is used to indicate the information about the one or more sidelink resources, and the one or more sidelink resources are used to determine a sidelink resource used by the second terminal to send the first service.

The information about the sidelink resource is used to identify the sidelink resource. For example, the first information includes time-frequency positions or identifiers of the one or more sidelink resources. This is not limited in this embodiment of this application.

In an embodiment of this application, before the first terminal sends the first information to the second terminal, the first terminal may select a sidelink resource A that carries the first information. The sidelink resource A may be selected by the first terminal from the sidelink resources sensed by the first terminal, or the sidelink resource A may be a sidelink resource indicated by the second terminal to the first terminal. This can help increase a success rate of receiving the first information by the second terminal.

Because the second terminal is not necessarily in a receiving state in a time range in which the sidelink resource A determined by the first terminal is located, if the first terminal sends the first information on the sidelink resource A, the second terminal cannot receive the first information from the first terminal, or the sidelink resource A may be a resource used by the second terminal to receive another message. In this case, if the sidelink resource A overlaps the resource used by the second terminal to receive another message, the second terminal cannot successfully receive the first information. Based on this, in an embodiment of this application, to enable the second terminal to correctly receive the first information, the sidelink resource A that carries the first information meets the following conditions: The time range in which the sidelink resource A is located is within a time range in which the second terminal can receive a service, the sidelink resource A is a resource on which the second terminal tends to receive a service, and the time range in which the sidelink resource A is located does not overlap a time range in which the second terminal reserves to or tends to send a service. For a manner in which the first terminal selects the sidelink resource A, refer to the manner in which the first terminal selects the first sidelink resource in the embodiment shown in FIG. 6. Details are not described herein again in this embodiment of this application.

Step 903: The second terminal determines a first sidelink resource based on the one or more sidelink resources, where the first sidelink resource does not overlap a resource corresponding to service transmission of the second terminal.

That the first sidelink resource does not overlap a resource corresponding to service transmission of the second terminal means that the first sidelink resource and a sidelink resource used by the second terminal to transmit another service are not a same sidelink resource, or a time range indicated by the first sidelink resource does not overlap a time period in which the second terminal does not tend to send a service, or a time range indicated by the first sidelink resource does not overlap a time period in which the second terminal tends to or reserves to receive a service.

In a possible implementation, step 903 in this embodiment of this application may be implemented in the following manner: The second terminal determines the first sidelink resource from the one or more sidelink resources.

In another possible implementation, step 903 in this embodiment of this application may be implemented in the following manner: The second terminal determines the first sidelink resource from a sidelink resource set. The sidelink resource set includes one or more sidelink resources and a candidate sidelink resource. The candidate sidelink resource may be a sidelink resource sensed by the second terminal, or may be a sidelink resource that is recommended by another terminal to the second terminal and that is used to send a service. This is not limited in this embodiment of this application.

Step 904: The second terminal sends the first service on the first sidelink resource.

In this embodiment of this application, the first service may be sent by the second terminal to the first terminal, or may be sent by the second terminal to a terminal other than the first terminal. This is not limited in this embodiment of this application.

This embodiment of this application provides the resource determining method. In the method, after receiving the first information from the first terminal, the second terminal may determine the one or more sidelink resources based on the first information. The one or more sidelink resources indicated by the first information may include a sidelink resource that conflicts with transmission of the second terminal. Therefore, when the second terminal selects, based on the one or more sidelink resources, the first sidelink resource used to carry the first service, the selected first sidelink resource may conflict with transmission of the second terminal. In this case, the second terminal may not learn whether to transmit the first service or perform other transmission on a conflicted sidelink resource. However, in this embodiment of this application, the second terminal may select a resource that does not overlap a resource corresponding to other transmission of the second terminal, to send the first service. This can avoid a conflict, and ensure reliable service transmission of the second terminal.

In a possible embodiment of this application, step 903 in this embodiment of this application may be implemented in the following manner: The second terminal determines the first sidelink resource based on a transmission status of the second terminal and the one or more sidelink resources. The transmission status is used to determine a sidelink resource that does not overlap a sidelink resource used by the second terminal to transmit another service. This can avoid a conflict between the selected first sidelink resource and the sidelink resource used for the another service. Alternatively, the transmission status is used to determine a sidelink resource on which the second terminal tends to send a service. This can help improve reliability of sending the service by the second terminal.

In the foregoing solution, when the second terminal determines the first sidelink resource from the one or more sidelink resources, because the transmission status of the second terminal is considered, the first sidelink resource that carries the first service may not conflict with another service of the second terminal.

In an example, the transmission status includes one or more of the following: information used to indicate a first time period, information about a second sidelink resource, information used to indicate a second time period, and information about a third sidelink resource.

The first time period is a time period in which the second terminal reserves to send a service, or the first time period is a time period in which the second terminal reserves to receive a service, or the first time period is a time period in which the second terminal tends to receive a service, or the first time period is a time period in which the second terminal does not tend to send a service, or the first time period is a time period in which a sidelink resource on which the second terminal does not tend to send a service is located, or the first time period is a time period in which a sidelink resource on which the second terminal tends to receive a service is located.

It should be noted that "service" in "the second terminal reserves to send a service" is a service, other than the first service, that the second terminal reserves to send. Descriptions are uniformly provided herein, and details are not described subsequently again.

In this embodiment of this application, "service" in "the second terminal reserves to receive a service" and "the second terminal tends to receive a service" may be a general service, for example, any service, or may be a specified service, for example, a service A. Descriptions are uniformly provided herein, and details are not described subsequently again.

In this embodiment of this application. "service" in "the second terminal does not tend to send a service" may be any general service, that is, the second terminal does not send any service in the time period. Alternatively, "service" in "a time period in which the second terminal does not tend to send a service" and "a time period in which a sidelink resource on which the second terminal does not tend to send a service is located" may be "first service", indicating that the first terminal does not reserve to send the first service in the time period. In other words, a service other than the first service may be sent in the time period.

In this embodiment of this application, the second sidelink resource is a resource on which the second terminal reserves to receive a service, or the second sidelink resource is a resource on which the second terminal reserves to send a service, or the second sidelink resource is a resource on which the second terminal tends to receive a service, or the second sidelink resource is a resource on which the second terminal does not tend to send a service.

The second time period is a time period in which the second terminal tends to send a service or a time period in which the second terminal does not tend to receive a service. The third sidelink resource is a resource on which the second terminal tends to send a service, or the third sidelink resource is a resource on which the second terminal does not tend to receive a service.

With reference to the foregoing example of the transmission status, in a possible example, the first sidelink resource in this embodiment of this application meets one or more of the following conditions:

Condition 3-1: The time range of the first sidelink resource does not overlap the first time period.

For example, the first time period is a time period in which the second terminal reserves to send a service, or the first time period is a time period in which the second terminal tends to receive a service, or the first time period is a time period in which a sidelink resource on which the second terminal tends to receive a service is located. Because the first sidelink resource is used to send the first service, in this case, when the time range indicated by the first sidelink resource does not overlap the first time period, a conflict between receiving and sending of the second terminal can be avoided.

For example, the first time period is a time period in which the second terminal does not tend to send a service, or the first time period is a time period in which a sidelink resource on which the second terminal does not tend to send a service is located. In this case, when the time range indicated by the first sidelink resource does not overlap the first time period, the selected sidelink resource can match transmission required by the second terminal.

Condition 3-2: The first sidelink resource does not overlap the second sidelink resource.

Condition 3-3: The time range in which the first sidelink resource is located overlaps the second time period.

Condition 3-4: The first sidelink resource belongs to the third sidelink resource.

It should be noted that, when selecting the first sidelink resource from the one or more sidelink resources based on the transmission status, the second terminal usually avoids a sidelink resource that conflicts with transmission of the second terminal. However, if the sidelink resource selected by the second terminal from the one or more sidelink resources based on the transmission status conflicts with transmission of the second terminal, the second terminal may compare a priority of the service A that needs to be sent on the selected sidelink resource with a priority of a service B that needs to be transmitted by the second terminal, to further determine the sidelink resource on which the service A needs to be sent. The following provides descriptions with reference to Case 1.

A process in which the second terminal determines the first sidelink resource from the one or more sidelink resources based on the transmission status of the second terminal is described below with reference to Case 1 and Case 2.

Case 1

In a possible implementation of this application, that the second terminal determines the first sidelink resource based on a transmission status of the second terminal and the one or more sidelink resources includes:

Step A: The second terminal determines a fourth sidelink resource used to carry the first service from the one or more sidelink resources.

In an embodiment of this application, the fourth sidelink resource may be randomly selected by the second terminal from the one or more sidelink resources.

In an embodiment of this application, the fourth sidelink resource may be determined by the second terminal based on a transmission moment of the first service. For example, if the second terminal reserves to send the first service in a time period 1, a sidelink resource in the time period 1 may be determined as the fourth sidelink resource.

In an embodiment of this application, the fourth sidelink resource may be determined by the second terminal based on the transmission status of the second terminal, but a time range of the fourth sidelink resource overlaps a fourth time period. The fourth time period is a time period in which the second terminal reserves to receive a second service, or the fourth time period is a time period in which a sidelink resource on which the second terminal reserves to receive a second service is located.

Step B: When the time range of the fourth sidelink resource overlaps the fourth time period, the second terminal determines the first sidelink resource based on a priority of the first service and a first priority of the second service. The second service is a service that the second terminal reserves to receive.

In an implementation, after the second terminal determines the fourth sidelink resource from the one or more sidelink resources, the second terminal may determine, based on the transmission status, whether the time range of the fourth sidelink resource overlaps the fourth time period.

In a possible embodiment of this application, if there are a plurality of services that the second terminal reserves to receive, the second service is a service with a highest priority in the plurality of services that the second terminal reserves to receive, or a service whose priority is higher than a preset service priority.

A manner in which the second terminal determines the first sidelink resource is described in detail below with reference to a relationship between the priority of the first service and the first priority of the second service.

Example 1-1: The priority of the first service is higher than or equal to the first priority.

In a possible implementation of this application, that the second terminal determines the first sidelink resource based on a priority of the first service and a first priority of the second service includes: When the priority of the first service is higher than or equal to the first priority, the second terminal determines that the fourth sidelink resource is the first sidelink resource. This can ensure that the first service with a high priority is preferentially sent.

With reference to Example 1-1, in a possible embodiment of this application, when the time range of the fourth sidelink resource overlaps the fourth time period, the second terminal does not receive the second service within an overlapped time range.

It should be noted that the second terminal may abandon receiving the second service, or negotiate with a terminal that sends the second service to receive a third service in another time range. This is not limited in this embodiment of this application.

Example 1-2: The priority of the first service is lower than or equal to the first priority.

In a possible implementation of this application, that the second terminal determines the first sidelink resource based on a priority of the first service and a first priority of the second service includes: if the priority of the first service is lower than or equal to the first priority, determining that the fourth sidelink resource is not the first sidelink resource.

In other words, when the priority of the first service is lower than or equal to the first priority, the second terminal may exclude using the fourth sidelink resource to send the first service. Then, the second terminal selects, as the first sidelink resource from other sidelink resources that do not include the fourth sidelink resource, a sidelink resource that does not overlap the fourth time period. In this way, a conflict between receiving and sending can be avoided, the second terminal can also successfully receive the second service, and reliable transmission of the first service can be ensured.

With reference to Example 1-2, in a possible embodiment of this application, when the time range of the fourth sidelink resource overlaps the fourth time period, the second terminal receives the second service in the fourth time period.

Therefore, in Example 1-2, to ensure that the first service is normally sent, the second terminal may select a sidelink resource that does not overlap the fourth time period as the first sidelink resource to send the first service.

For detailed descriptions of Case 1, an example is used herein for description. For example, the one or more sidelink resources include a sidelink resource 1, a sidelink resource 2, a sidelink resource 3, and a sidelink resource 4, and the fourth time period is a slot 1. The second terminal selects the sidelink resource 3 from the sidelink resource 1 to the sidelink resource 4 to carry the first service. After selecting the sidelink resource 3, the second terminal finds that a time range of the sidelink resource 3 overlaps the slot 1. In this case, if the second terminal continues to select the sidelink resource 3 to send the first service, a conflict between receiving and sending may occur. To avoid the foregoing conflict, the second terminal may compare priorities of the first service and the second service, to determine whether to preferentially receive the second service or preferentially send the first service, so that a receiving time and a sending time do not overlap, and a conflict is avoided. For example, when the sidelink resource 3 overlaps the slot 1, if the priority of the first service is higher than or equal to the priority of the second service, the second terminal may preferentially send the first service on the sidelink resource 3, and does not receive the second service in a conflicted time period, so as to avoid a conflict between receiving and sending. If the priority of the first service is lower than or equal to the priority of the second service, the first terminal may determine that the sidelink resource 3 is not suitable for sending the first service, and then the second terminal may continue to select a sidelink resource from the sidelink resource 1, the sidelink resource 2, and the sidelink resource 4 to send the first service, so as to ensure that the finally selected sidelink resource does not overlap the slot 1.

Case 2

In a possible implementation of this application, that the second terminal determines the first sidelink resource based on a transmission status of the second terminal and the one or more sidelink resources includes:

Step C: The second terminal determines a resource pool, where the resource pool includes a sidelink resource other than a fourth sidelink resource in the one or more sidelink resources, and a time range of the fourth sidelink resource overlaps a fourth time period.

For example, the second terminal determines the resource pool based on the transmission status of the second terminal and the one or more sidelink resources. The resource pool does not include a sidelink resource that overlaps the fourth time period.

Step D: The second terminal determines the first sidelink resource from the resource pool, where the second service is a service that the second terminal reserves to receive.

In the foregoing solution, the second terminal first excludes, from the one or more sidelink resources based on the transmission status of the second terminal, a sidelink resource that conflicts with receiving of the second service by the second terminal, to obtain the resource pool. Then, the second terminal selects the first sidelink resource from the resource pool. This can ensure that the finally selected first sidelink resource does not conflict with the fourth time period in which the second terminal reserves to receive the second service, can ensure that the second terminal can normally receive the second service, and can also ensure that the second terminal normally sends the first service.

To describe Case 2 in detail, an example is first used for description. For example, the one or more sidelink resources include the sidelink resource 1, the sidelink resource 2, the sidelink resource 3, and the sidelink resource 4, and the first time period is the slot 1. If a time period in which the sidelink resource 1 is located overlaps the slot 1, and time periods in which the sidelink resource 2, the sidelink resource 3, and the sidelink resource 4 are located do not overlap the slot 1, to ensure that receiving and sending of the second terminal do not conflict, the second terminal determines that the foregoing resource pool includes the sidelink resource 2, the sidelink resource 3, and the sidelink resource 4. Then, the second terminal may select one sidelink resource from the sidelink resource 2, the sidelink resource 3, and the sidelink resource 4 as the first sidelink resource.

In an embodiment of this application, the method provided in this embodiment of this application further includes: The second terminal determines a manner of determining the first sidelink resource from the one or more sidelink resources. The manner includes a first manner and a second manner.

The first manner is determining the first sidelink resource based on the transmission status of the second terminal. The second manner is determining the first sidelink resource based on a service priority. It should be noted that the second manner means comparing priorities of the first service and the second service when a sidelink resource selected by the second terminal conflicts with the second service received by the second terminal.

In a possible implementation, the second terminal may autonomously determine to use the first manner or the second manner to determine the first sidelink resource from the one or more sidelink resources.

In another possible implementation, the second terminal may determine, based on a quantity of the one or more sidelink resources that is notified by the first terminal to the second terminal, to use the first manner or the second manner to determine the first sidelink resource from the one or more sidelink resources.

For example, if the quantity of the one or more sidelink resources is less than or equal to a first threshold, the second terminal determines to use the second manner. If the quantity of the one or more sidelink resources is greater than or equal to the first threshold, the second terminal determines to use the first manner.

In still another possible implementation, the second terminal may determine, based on configuration information, to use the first manner or the second manner to determine the first sidelink resource from the one or more sidelink resources.

For example, if the configuration information indicates the second terminal to use the first manner to determine the first sidelink resource from the one or more sidelink resources, the second terminal uses the first manner. If the configuration information indicates the second terminal to use the second manner to determine the first sidelink resource from the one or more sidelink resources, the second terminal uses the second manner.

In yet another possible implementation, the second terminal receives indication information from the first terminal, where the indication information indicates the second terminal to determine a manner of determining the first sidelink resource from the one or more sidelink resources. The second terminal determines, based on the indication information, to use the first manner or the second manner to determine the first sidelink resource from the one or more sidelink resources.

An example in which the fourth sidelink resource is a sidelink resource in the one or more sidelink resources is mainly used above. When the fourth sidelink resource is not a sidelink resource in the one or more sidelink resources but a candidate sidelink resource, for a manner in which the second terminal determines the first sidelink resource, refer to the foregoing descriptions. Details are not described in this embodiment of this application. A difference is that, when determining whether to use the first manner or the second manner, if a quantity of sidelink resources in the sidelink resource set is less than or equal to the first threshold, the second terminal determines to use the second manner. If the quantity of sidelink resources in the sidelink resource set is greater than or equal to the first threshold, the second terminal determines to use the first manner.

The foregoing mainly describes a process of selecting the first sidelink resource to avoid a conflict between a time range in which a sidelink resource for transmitting the first service is located and the third service that the second terminal reserves to receive. In an actual process, when the first sidelink resource that is selected by the second terminal and that is used to transmit the first service does not conflict with the service received by the second terminal, the second terminal may further avoid as much as possible a conflict between the time range in which the first sidelink resource is located and a time range in which the second terminal sends another service.

For example, the time period of the fourth sidelink resource overlaps the time period in which the second terminal reserves to receive the second service. When the time period of the fourth sidelink resource overlaps the time period in which the second terminal reserves to send the third service, the second terminal may also compare the priority of the first service with a priority of the third service, to determine whether the fourth sidelink resource can be used as the first sidelink resource for carrying the first service. For example, if the priority of the first service is higher than or equal to the priority of the third service, the second terminal uses the fourth sidelink resource as the first sidelink resource. For example, if the priority of the first service is lower than or equal to the priority of the third service, the second terminal determines that the fourth sidelink resource is not the first sidelink resource. The third service is sent in a time period in which the third service is reserved to be sent.

Figure 10:
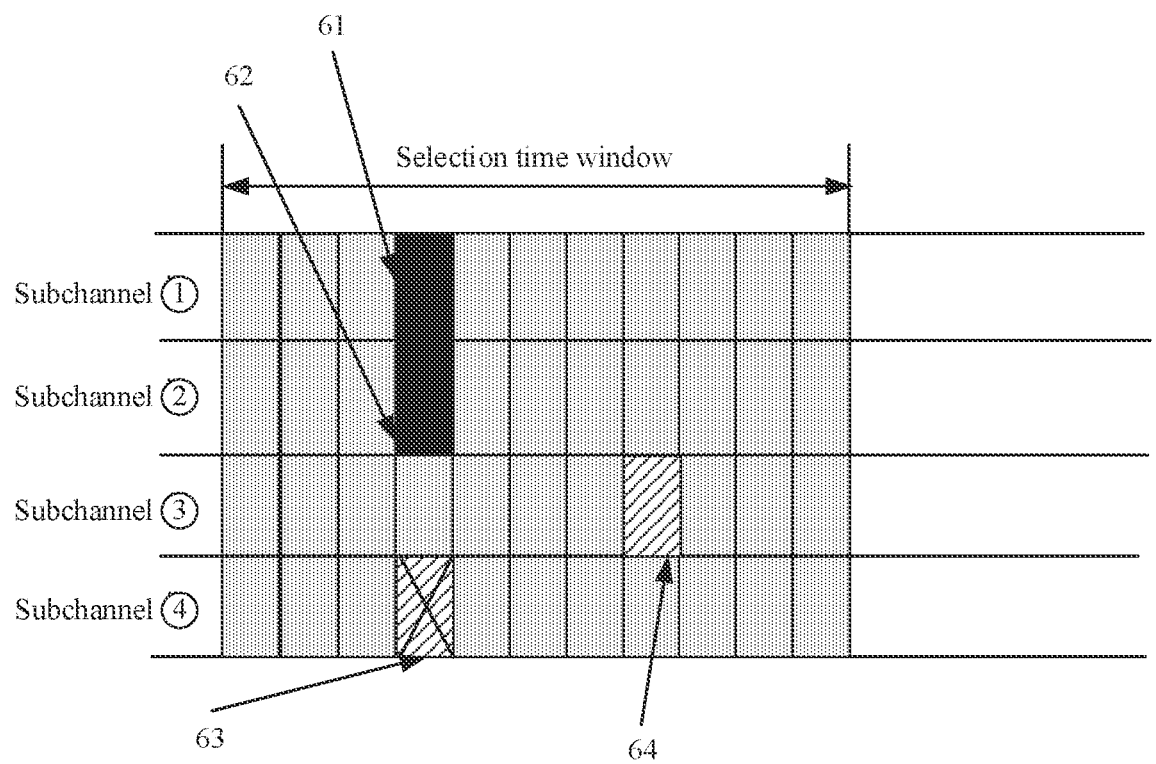
FIG. 10 is a schematic diagram in which a second terminal selects a sidelink resource to transmit a service according to an embodiment of this application.

As shown in FIG. 10, the second terminal has reserved transmission on a subchannel ① and a subchannel ②. For example, the second terminal reserves to receive a service on a sidelink resource 61 and a sidelink resource 62, and sidelink resources that are recommended by the first terminal to the second terminal to send a service include a sidelink resource 63 and a sidelink resource 64. A slot in which the sidelink resource 63 is located and a slot in which the second terminal reserves to receive a service are a same slot or overlap. In this case, to avoid a conflict between receiving and sending, the second terminal determines not to use the sidelink resource 63 as a resource for sending the first service. However, a slot in which the sidelink resource 64 is located and the slot in which the second terminal reserves to receive a service do not overlap. In this case, the second terminal may select to send the first service on the sidelink resource 64.

An example in which the first terminal is a terminal 100 and the second terminal is a terminal 200 is used below to describe a resource determining method provided in an embodiment of this application. The method includes the following steps.

Step 1101: The terminal 100 obtains a transmission status of the terminal 200. The transmission status of the terminal 200 includes but is not limited to at least one of a slot in which the terminal 200 reserves receiving, a slot in which the terminal 200 reserves sending, a sidelink resource on which the terminal 200 reserves receiving, a sidelink resource on which the terminal 200 reserves sending, a slot in which or a sidelink resource on which the terminal 200 has a receiving tendency, a slot in which or a sidelink resource on which the terminal 200 has a sending tendency, a slot in which or a sidelink resource on which the terminal 200 does not have a receiving tendency, and a slot in which or a sidelink resource on which the terminal 200 does not have a sending tendency.

In a possible implementation, a trigger message sent by the terminal 200 to the terminal 100 carries the transmission status of the terminal 200. The trigger message is used to trigger the terminal 100 to recommend (advise) one or more sidelink resources to the terminal 200. Alternatively, the trigger message is used to trigger the terminal 100 to select, for the terminal 200, one or more sidelink resources used to send a service.

In another possible implementation, the terminal 200 notifies the terminal 100 of at least one ID in configuration information. The terminal 100 obtains transmission from another terminal to the terminal 200 in a sensing time window based on the at least one ID. The at least one ID is various possible IDs of the terminal 200, and the terminal 200 may have different IDs in different service types.

For example, the terminal 100 may determine, based on the at least one ID, a sidelink resource on which or a slot in which a terminal identified by the at least one ID reserves to send a service to the terminal 200, to determine a sidelink resource on which or a slot in which the terminal 200 receives the service.

Step 1102: The terminal 100 determines, based on the transmission status of the terminal 200, a sidelink resource indicated by assistance information.

The sidelink resource indicated by the assistance information may have a to-be-selected resource pool of the sidelink resource. In one manner, the sidelink resource is excluded from the to-be-selected resource pool of the sidelink resource. In the other manner, the sidelink resource is excluded from the assistance information.

In one manner, a sidelink resource that conflicts with the transmission status of the terminal 200 is excluded from a to-be-selected resource pool of the assistance information. In other words, the sidelink resource in the to-be-selected resource pool of the assistance information determined by the terminal 100 meets one or more of the following conditions: A sidelink resource in a slot in which the terminal 200 reserves receiving is not added by the terminal 100 to the to-be-selected resource pool, a sidelink resource on which the terminal 200 reserves receiving is not added to the to-be-selected resource pool, a sidelink resource on which the terminal 200 reserves sending is not added to the to-be-selected resource pool, a sidelink resource in a slot in which the terminal 200 reserves sending is not added to the to-be-selected resource pool (applicable to a case in which the terminal 200 cannot simultaneously transmit a plurality of pieces of data), a slot in which or a sidelink resource on which the terminal 200 has a receiving tendency is not added to the to-be-selected resource pool, a slot in which or a sidelink resource on which the terminal 200 has a sending tendency is added to the to-be-selected resource pool, a slot in which or a sidelink resource on which the terminal 200 does not have a receiving tendency is added to the to-be-selected resource pool, and a slot in which or a sidelink resource on which the terminal 200 does not have a sending tendency is not added to the to-be-selected resource pool. Then, the terminal 100 determines the sidelink resource in the to-be-selected resource pool as the sidelink resource indicated by the assistance information. For example, the sidelink resource indicated by the assistance information may include all or some sidelink resources in the to-be-selected resource pool.

In another manner, a sidelink resource that conflicts with the transmission status of the terminal 200 is excluded from the assistance information, that is, the sidelink resource in the assistance information meets one or more of the following: Information about a sidelink resource in a slot in which the terminal 200 reserves receiving is not added to the assistance information, information about a sidelink resource on which the terminal 200 reserves receiving is not added to the assistance information, information about a sidelink resource on which the terminal 200 reserves sending is not added to the assistance information, information about a sidelink resource in a slot in which the terminal 200 reserves sending is not added to the assistance information (applicable to a case in which the terminal 200 cannot simultaneously transmit a plurality of pieces of data), information about a sidelink resource in a slot in which the terminal 200 has a receiving tendency is not added to the assistance information, information about a sidelink resource on which the terminal 200 has a receiving tendency is not added to the assistance information, information about a sidelink resource in a slot in which the terminal 200 has a sending tendency or a sidelink resource on which the terminal 200 has a sending tendency is added to the assistance information, information about a sidelink resource in a slot in which the terminal 200 does not have a receiving tendency or information about a sidelink resource on which the terminal 200 does not have a receiving tendency is added to the assistance information, and information about a sidelink resource in a slot in which the terminal 200 does not have a sending tendency or information about a sidelink resource on which the terminal 200 does not have a sending tendency is not added to the assistance information.

Step 1103: The terminal 100 sends the assistance information to the terminal 200, and correspondingly the terminal 200 receives the assistance information from the terminal 100.

Step 1104: The terminal 200 selects a sidelink resource based on the assistance information sent by the terminal 100.

Step 1105: The terminal 200 sends a service on the selected sidelink resource.

It should be noted that an object (that is, a receiving end) for the service sent by the terminal 200 in step 1105 may include the terminal 100, or may not include the terminal 100.

Figure 11:
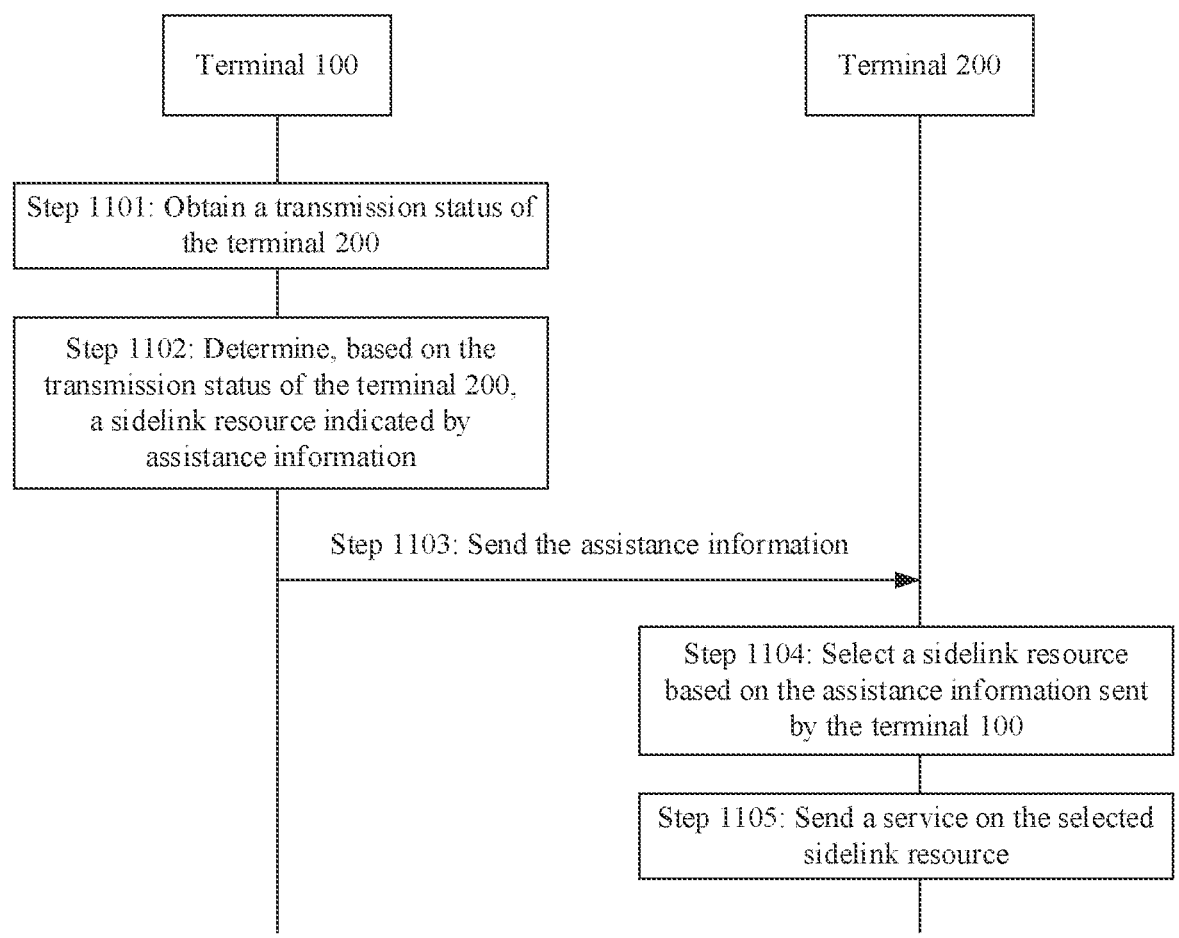
FIG. 11 is a detailed schematic flowchart of a resource determining method according to an embodiment of this application.

In the embodiment described in FIG. 11, when selecting the sidelink resource indicated by the assistance information, the terminal 100 considers the transmission status of the terminal 200, so that the sidelink resource indicated by the assistance information does not include a sidelink resource that conflicts with transmission of the terminal 200. This avoids a transmission conflict of the second terminal.

Figure 12:
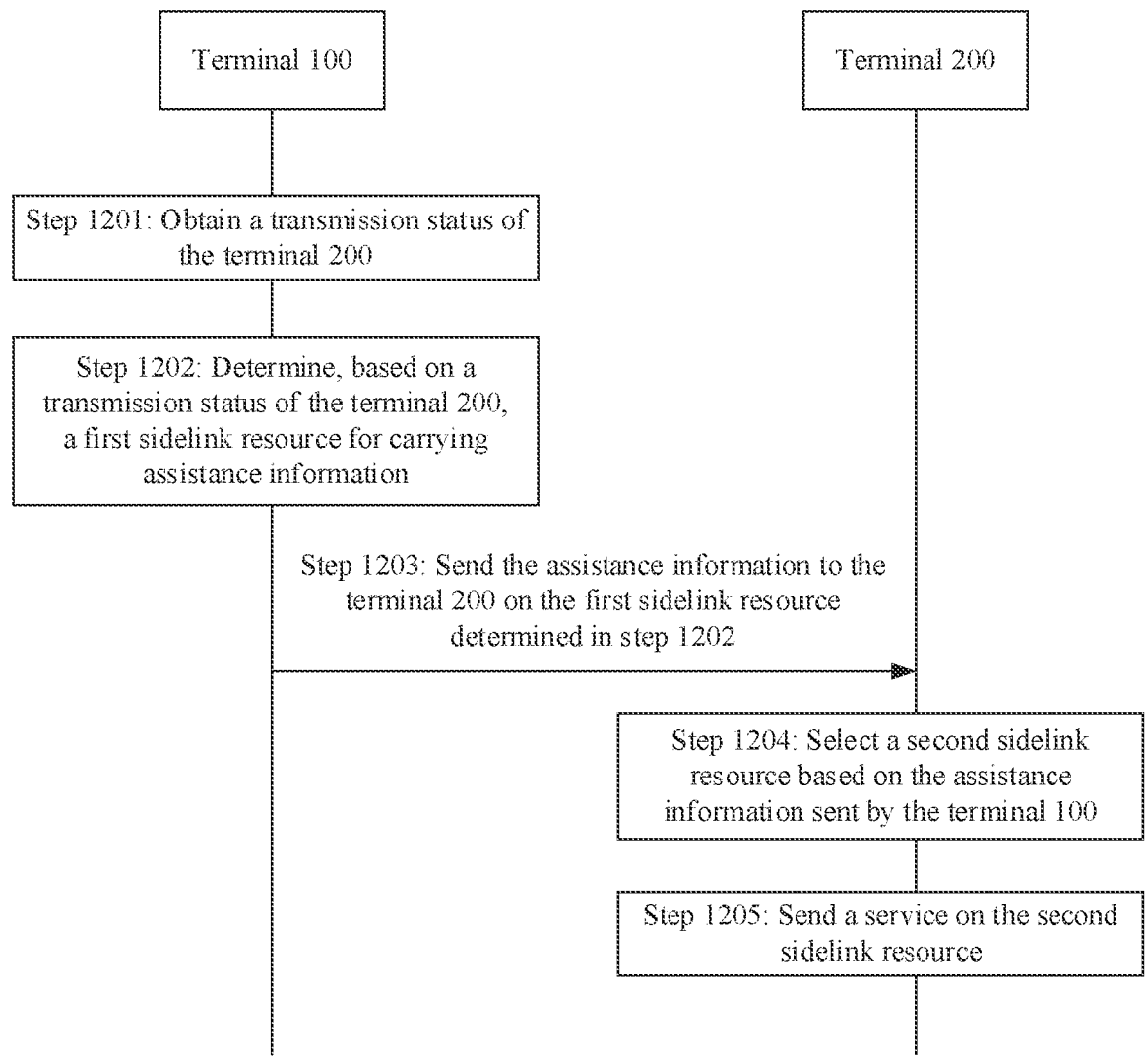
FIG. 12 is a detailed schematic flowchart of another resource determining method according to an embodiment of this application.

As shown in FIG. 12, an example in which the first terminal is a terminal 100 and the second terminal is a terminal 200 is used to describe a resource determining method provided in an embodiment of this application. The method includes the following steps.

Step 1201: The terminal 100 obtains a transmission status of the terminal 200.

For example, the transmission status of the terminal 200 includes one or more of the following: information about a sidelink resource on which the terminal 200 reserves receiving, information about a sidelink resource on which the terminal 200 reserves sending, information about a slot in which the terminal 200 reserves sending, information about a slot in which the terminal 200 has a receiving tendency, information about a slot in which the terminal 200 has a sending tendency, information about a sidelink resource on which the terminal 200 has a sending tendency, information about a slot in which the terminal 200 does not have a receiving tendency, information about a sidelink resource on which the terminal 200 does not have a receiving tendency, information about a slot in which the terminal 200 does not have a sending tendency, or information about a sidelink resource on which the terminal 200 does not have a sending tendency.

Step 1202: The terminal 100 determines, based on the transmission status of the terminal 200, a first sidelink resource that carries assistance information.

The terminal 100 is used as a transmitting end, and the first sidelink resource is determined by the terminal 100 from a to-be-selected resource pool. To avoid a conflict caused by the transmission status of the terminal 200, one manner is to exclude a sidelink resource that conflicts with transmission of the terminal 200 from the to-be-selected resource pool, and the other manner is to exclude a sidelink resource that conflicts with transmission of the terminal 200 from one or more selected sidelink resources. In another possible implementation, to enable the terminal 200 to receive a plurality of pieces of data in one slot, and reduce power consumption caused by receiving of the terminal 200 in a plurality of slots, the first sidelink resource may be selected in a slot in which the terminal 200 reserves receiving to carry the assistance information.

In a manner, a sidelink resource that conflicts with the transmission status of the terminal 200 is excluded from the to-be-selected resource pool. In this case, the to-be-selected resource pool meets one or more of the following conditions: A sidelink resource on which the terminal 200 reserves receiving is not added to the to-be-selected resource pool, a sidelink resource on which the terminal 200 reserves sending is not added to the to-be-selected resource pool, a sidelink resource in a slot in which the terminal 200 reserves sending is not added to the to-be-selected resource pool, a sidelink resource in a slot in which the terminal 200 has a receiving tendency or a sidelink resource on which the terminal 200 has a receiving tendency is added to the to-be-selected resource pool, a sidelink resource in a slot in which the terminal 200 has a sending tendency or a sidelink resource on which the terminal 200 has a sending tendency is not added to the to-be-selected resource pool, a sidelink resource in a slot in which the terminal 200 does not have a receiving tendency or a sidelink resource on which the terminal 200 does not have a receiving tendency is not added to the to-be-selected resource pool, and a sidelink resource in a slot in which the terminal 200 does not have a sending tendency or a sidelink resource on which the terminal 200 does not have a sending tendency is added to the to-be-selected resource pool.

Then, the terminal 100 may determine the first sidelink resource that carries the assistance information from the determined to-be-selected resource pool.

In another manner, a conflict caused by the transmission status of the terminal 200 is excluded from the first sidelink resource that carries the assistance information. In other words, a sidelink resource on which the terminal 200 reserves receiving is not used as the first sidelink resource, a sidelink resource on which the terminal 200 reserves sending is not used as the first sidelink resource, a sidelink resource in a slot in which the terminal 200 reserves sending is not used as the first sidelink resource, a sidelink resource in a slot in which the terminal 200 has a receiving tendency is used as the first sidelink resource or a sidelink resource on which the terminal 200 has a receiving tendency is used as the first sidelink resource, a sidelink resource in a slot in which the terminal 200 has a sending tendency is not used as the first sidelink resource or a sidelink resource on which the terminal 200 has a sending tendency is not used as the first sidelink resource, a sidelink resource in a slot in which the terminal 200 does not have a receiving tendency or a sidelink resource on which the terminal 200 does not have a receiving tendency is not used as the first sidelink resource, and a sidelink resource in a slot in which the terminal 200 does not have a sending tendency or a sidelink resource on which the terminal 200 does not have a sending tendency is used as the first sidelink resource.

In still another manner, a sidelink resource that carries the assistance information is selected in a slot in which the terminal 200 has a receiving tendency. In this case, the selected sidelink resource that can carry the assistance information meets one or more of the following cases: Another sidelink resource in a slot in which a sidelink resource on which the terminal 200 reserves receiving is located may be used as the first sidelink resource, a sidelink resource in a slot in which the terminal 200 has a receiving tendency or a sidelink resource on which the terminal 200 has a receiving tendency may be used as the first sidelink resource, and a sidelink resource in a slot in which the terminal 200 does not have a sending tendency or a sidelink resource on which the terminal 200 does not have a sending tendency may be used as the first sidelink resource.

Step 1203: The terminal 100 sends the assistance information to the terminal 200 on the first sidelink resource determined in step 1202.

Step 1204: The terminal 200 selects a second sidelink resource based on the assistance information sent by the terminal 100.

Step 1205: The terminal 200 sends a service on the second sidelink resource.

It should be noted that an object (that is, a receiving end) for the service sent by the terminal 200 in step 1205 may include the terminal 100, or may not include the terminal 100.

Figure 13:
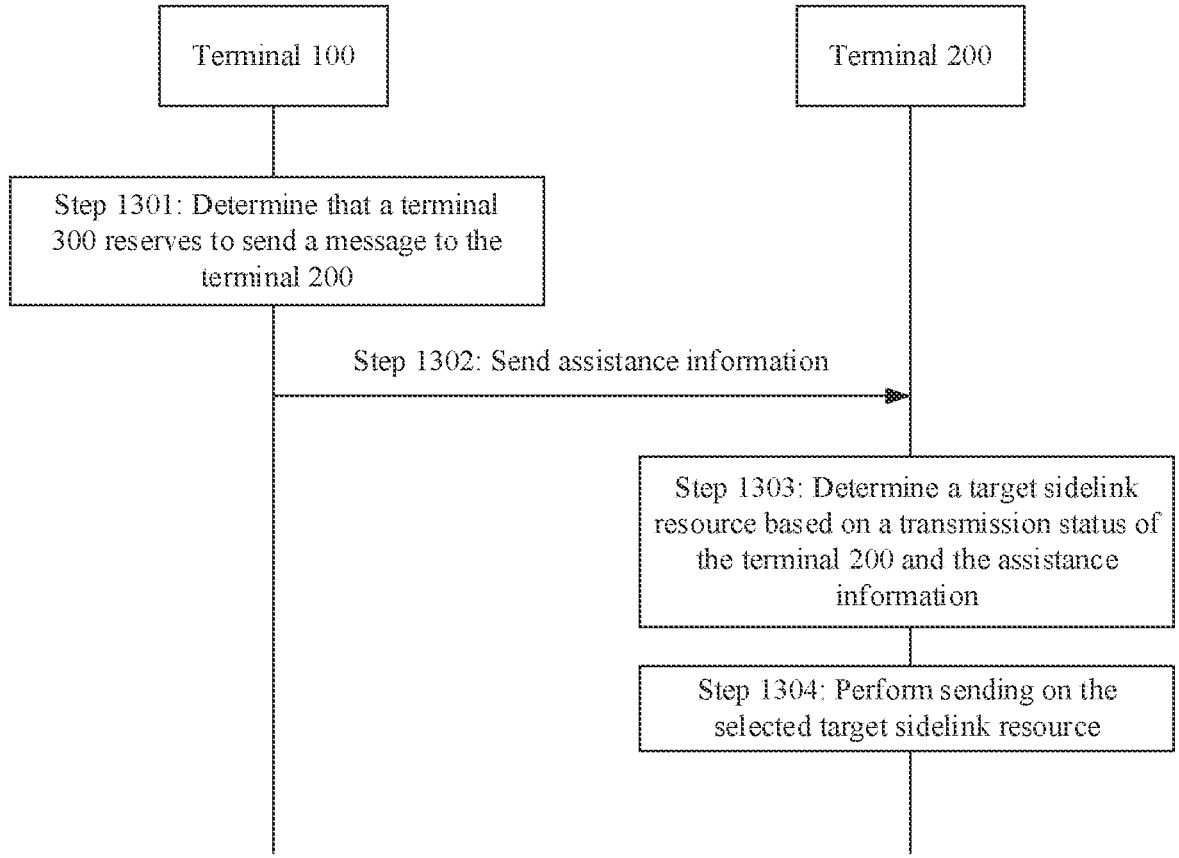
FIG. 13 is a detailed schematic flowchart of still another resource determining method according to an embodiment of this application.

As shown in FIG. 13, an example in which the first terminal is a terminal 100 and the second terminal is a terminal 200 is used to describe a resource determining method provided in an embodiment of this application. The method includes the following steps.

Step 1301: The terminal 100 determines that a terminal 300 reserves to send a message to the terminal 200. In this way, it is convenient for the terminal 100 to determine, based on the fact that the terminal 300 reserves to send the message to the terminal 200, information about a time period in which or information about a sidelink resource on which the terminal 200 receives the message.

Step 1302: The terminal 100 sends assistance information to the terminal 200, where the assistance information is used to indicate a group of sidelink resources to the terminal 200, the group of sidelink resources may be used to carry a service to be sent by the terminal 200, and the group of sidelink resources includes one or more sidelink resources.

Step 1303: The terminal 200 determines a target sidelink resource based on a transmission status of the terminal 200 and the assistance information.

In a manner 1, when selecting the target sidelink resource based on a slot in which receiving is reserved, the terminal 200 excludes, from the assistance information, a resource in the slot in which receiving is reserved. A reason is that because the group of sidelink resources indicated by the assistance information is a resource that is selected by the terminal 100 for the terminal 200 and that is used to send a service, and the slot in which the terminal 200 reserves receiving is used by the terminal 200 to receive the service, if the terminal 200 performs sending by using a resource in the slot in which receiving is reserved, a conflict between receiving and sending occurs. Certainly, if the group of sidelink resources indicated by the assistance information is a sidelink resource that is selected by the terminal 100 for the terminal 200 and that is not recommended to send a service, the second terminal does not need to perform the foregoing exclusion.

Further, when selecting the target sidelink resource based on the information about the sidelink resource on which sending is reserved, the terminal 200 excludes, from the group of sidelink resources indicated by the assistance information, the sidelink resource on which sending is reserved.

In another manner 2, the terminal 200 determines the target sidelink resource based on a priority of a service A to be sent on the target sidelink resource and a priority of a service B that has been transmitted by the terminal 200. For example, the priority of the service A is a priority x, and the terminal 200 determines that the priority of the service B that is reserved to be received/sent is a priority v, and determines, based on the priority x and the priority y, whether to exclude a resource in the group of sidelink resources, to determine the target sidelink resource.

If the priority x is lower than the priority y of the service B that is reserved to be received, the terminal 200 receives the service B in a conflicted slot. Optionally, if a sidelink resource selected by the terminal 100 for sending the service A is a sidelink resource A, the terminal 200 determines to exclude the sidelink resource A from the group of sidelink resources as the target sidelink resource for sending the service A.

If the priority x is higher than the priority y of the service B that is reserved to be received, the terminal 200 uses the sidelink resource A as the target sidelink resource to send the service A in a conflicted slot.

If the priority x is equal to the priority y of the service B that is reserved to be received, the terminal 200 determines to exclude the sidelink resource A from the group of sidelink resources as the target sidelink resource for sending the service A, or further performs screening. In an implementation, when the priority x is equal to the priority y, if the terminal 200 still has sufficient sidelink resources to be selected after determining to exclude the sidelink resource A from the group of sidelink resources as the target sidelink resource for sending the service A, the terminal 200 excludes the sidelink resource A from the group of sidelink resources.

Optionally, if the terminal 200 has a plurality of services reserved to be received, the service B is a service with a highest priority in the plurality of services reserved to be received by the terminal 200.

In a possible case, both the foregoing two manners are implemented. The foregoing manner 1 is used in some scenarios, and the foregoing manner 2 is used in other scenarios.

In an example, the terminal 200 determines, based on configuration information, indication information from the terminal 100, a quantity of sidelink resources in a group of sidelink resources recommended by the terminal 100 to the terminal 200 by using the assistance information, or the like, whether to process the sidelink resources in the assistance information in the manner 1 or the manner 2.

For example, if the terminal 200 configures a mode (mode) 2b or the terminal 100 indicates the terminal 200 to use the mode 2b, the terminal 200 determines that the manner 1 is used for processing the sidelink resource in the assistance information. The mode 2b is a scenario name.

For example, if the terminal 200 configures a mode2d or the terminal 100 indicates the terminal 200 to use the mode2d, the terminal 200 determines that the manner 2 is used for processing the sidelink resource in the assistance information. The mode 2d is a scenario name.

For example, if the quantity of sidelink resources in the group of sidelink resources indicated by the assistance information is less than a threshold, the terminal 200 performs processing in the manner 2. Otherwise, the terminal 200 performs processing in the manner 1.

Step 1304: The terminal 200 sends a service on the selected target sidelink resource. A receiving end that receives the service does not necessarily include the terminal 100.

The foregoing mainly describes the solutions in embodiments of this application from the perspective of interaction between network elements. It can be understood that, to implement the foregoing functions, the network elements such as the first terminal and the second terminal include corresponding structures and/or software modules for implementing the functions. A person skilled in the art should be easily aware that, in combination with units and algorithm steps of the examples described in embodiments disclosed in this specification, this application may be implemented by using hardware or a combination of hardware and computer software. Whether the functions are performed by hardware or computer software driving hardware depends on particular applications and design constraints of the technical solutions. A person skilled in the art may use different methods to implement the described functions for each particular application, but it should not be considered that the implementation goes beyond the scope of this application.

In embodiments of this application, the first terminal and the second terminal each may be divided into function units based on the foregoing method examples. For example, each function unit may be obtained through division based on each corresponding function, or two or more functions may be integrated into one processing unit. The integrated unit may be implemented in a form of hardware, or may be implemented in a form of a software function unit. It should be noted that, in embodiments of this application, unit division is an example, and is merely logical function division. During actual implementation, another division manner may be used.

The foregoing describes the method in embodiments of this application with reference to FIG. 4 to FIG. 13. The following describes a communications apparatus that is provided in embodiments of this application and that performs the foregoing method. A person skilled in the art may understand that the method and the apparatus may be mutually combined and referenced. The communications apparatus provided in embodiments of this application may perform the steps performed by the first terminal and the second terminal in the foregoing communication method.

Figure 14:
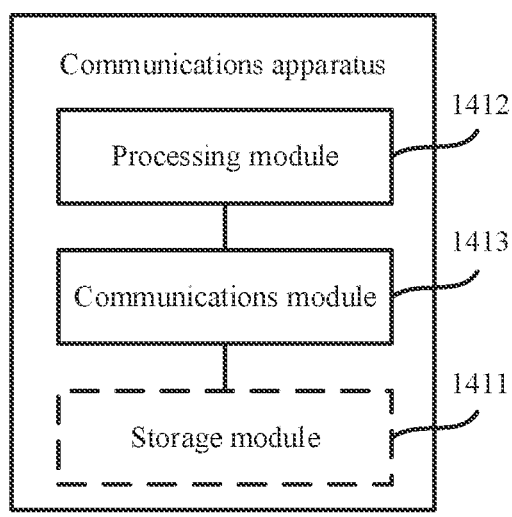
FIG. 14 is a schematic diagram of a structure of a communications apparatus according to an embodiment of this application.

When an integrated unit is used, FIG. 14 shows a communications apparatus in the foregoing embodiment. The communications apparatus may include a communications module 1413 and a processing module 1412.

In an optional implementation, the communications apparatus may further include a storage module 1411, configured to store program code and data of the communications apparatus.

In an example, the communications apparatus is the first terminal or a chip applied to the first terminal. In this case, the communications module 1413 is configured to support the communications apparatus in communicating with an external network element (for example, the second terminal). For example, the communications module 1413 is configured to perform receiving and sending operations performed by the first terminal in the foregoing method embodiment. The processing module 1412 is configured to perform a processing operation performed by the first terminal in the foregoing method embodiment.

For example, the communications module 1413 is configured to perform an obtaining action performed by the first terminal in step 401 in FIG. 4 in the foregoing embodiment. The processing module 1412 is configured to support the communications apparatus in performing a processing action performed by the first terminal in the foregoing embodiment, for example, step 402. The communications module 1413 is configured to perform a sending action performed by the first terminal in step 403 in FIG. 4 in the foregoing embodiment.

In another example, the communications apparatus is the second terminal or a chip applied to the second terminal. In this case, the communications module 1413 is configured to support the communications apparatus in communicating with an external network element (for example, the first terminal). For example, the communications module 1413 is configured to perform receiving and sending operations performed by the second terminal in the foregoing method embodiment. The processing module 1412 is configured to perform a processing operation performed by the second terminal in the foregoing method embodiment.

For example, the communications module 1413 is configured to perform a receiving action performed by the second terminal m step 403 in FIG. 4 in the foregoing embodiment. The processing module 1412 is configured to perform step 404 performed by the second terminal in the foregoing embodiment.

In still another example, the communications apparatus is the first terminal or a chip applied to the first terminal. In this case, the communications module 1413 is configured to support the communications apparatus in communicating with an external network element (for example, the second terminal). For example, the communications module 1413 is configured to perform receiving and sending operations performed by the first terminal in the foregoing method embodiment. The processing module 1412 is configured to perform a processing operation performed by the first terminal in the foregoing method embodiment.

For example, the communications module 1413 is configured to perform an obtaining action performed by the first terminal in step 601 in FIG. 6 in the foregoing embodiment. The processing module 1412 is configured to support the communications apparatus in performing a processing action performed by the first terminal in the foregoing embodiment, for example, step 602. The communications module 1413 is configured to perform a sending action performed by the first terminal in step 603 in FIG. 6 in the foregoing embodiment.

In yet another example, the communications apparatus is the second terminal or a chip applied to the second terminal. In this case, the communications module 1413 is configured to support the communications apparatus in communicating with an external network element (for example, the first terminal). For example, the communications module 1413 is configured to perform receiving and sending operations performed by the second terminal in the foregoing method embodiment. The processing module 1412 is configured to perform a processing operation performed by the second terminal in the foregoing method embodiment.

For example, the communications module 1413 is configured to perform a receiving action performed by the second terminal in step 603 in FIG. 6 in the foregoing embodiment. The processing module 1412 is configured to perform step 604 performed by the second terminal in the foregoing embodiment.

In still yet another example, the communications apparatus is the first terminal or a chip applied to the first terminal. In this case, the communications module 1413 is configured to support the communications apparatus in communicating with an external network element (for example, the second terminal). For example, the communications module 1413 is configured to perform receiving and sending operations performed by the first terminal in the foregoing method embodiment. The processing module 1412 is configured to perform a processing operation performed by the first terminal in the foregoing method embodiment.

For example, the communications module 1413 is configured to perform a sending action performed by the first terminal in step 902 in FIG. 9 in the foregoing embodiment. The processing module 1412 is configured to support the communications apparatus in performing a processing action performed by the first terminal in the foregoing embodiment, for example, step 901.

In a further example, the communications apparatus is the second terminal or a chip applied to the second terminal. In this case, the communications module 1413 is configured to support the communications apparatus in communicating with an external network element (for example, the first terminal). For example, the communications module 1413 is configured to perform receiving and sending operations performed by the second terminal in the foregoing method embodiment. The processing module 1412 is configured to perform a processing operation performed by the second terminal in the foregoing method embodiment.

For example, the communications module 1413 is configured to perform a receiving action performed by the second terminal in step 902 in FIG. 9 in the foregoing embodiment. The processing module 1412 is configured to perform step 903 performed by the second terminal in the foregoing embodiment. The communications module 1413 is further configured to perform a sending action performed by the second terminal in step 904 in FIG. 9 in the foregoing embodiment.

It should be noted that, in FIG. 14, the communications module 1413 may alternatively be replaced with a communications unit, the processing module 1412 may alternatively be replaced with a processing unit, and the storage module 1411 may alternatively be replaced with a storage unit. The processing unit is configured to control and manage actions of the communications apparatus. For example, the processing unit is configured to perform an information/data processing step performed by the communications apparatus. The communications unit is configured to support the communications apparatus in performing an information/data sending or receiving step.

In a possible implementation, the communications unit may include a receiving unit and a sending unit. The receiving unit is configured to receive a signal, and the sending unit is configured to send a signal.

The processing module 1412 may be a processor or a controller, for example, a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors or a combination of a digital signal processor and a microprocessor. The communications module may be a transceiver, a transceiver circuit, a communications interface, or the like. The storage module may be a memory.

When the processing module 1412 is the processor 31 or the processor 35, the communications module 1413 is the transceiver 33, and the storage module 1411 is the memory 32, the communications apparatus in this application may be the communications device shown in FIG. 3.

The communications module may be a communications interface of the apparatus, and is configured to receive a signal from another apparatus. For example, when the apparatus is implemented as a chip, the communications module is a communications interface used by the chip to receive a signal from or send a signal to another chip or apparatus.

Figure 15:
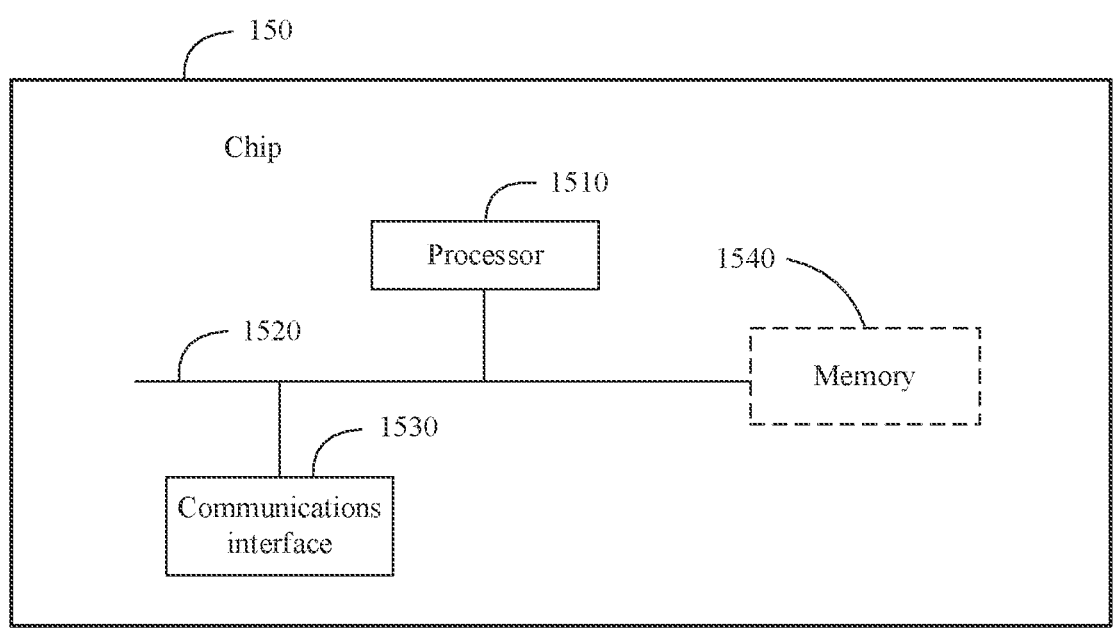
FIG. 15 is a schematic diagram of a structure of a chip according to an embodiment of this application.

FIG. 15 is a schematic diagram of a structure of a chip 150 according to an embodiment of this application. The chip 150 includes one or more (including two) processors 1510 and a communications interface 1530.

Optionally, the chip 150 further includes a memory 1540. The memory 1540 may include a read-only memory and a random access memory, and provide operation instructions and data for the processor 1510. A part of the memory 1540 may further include a nonvolatile random access memory (nonvolatile random access memory, NVRAM).

In some implementations, the memory 1540 stores the following elements: an executable module or a data structure, a subset thereof, or an extended set thereof.

In this embodiment of this application, the operation instructions stored in the memory 1540 (the operation instructions may be stored in an operating system) are invoked to perform corresponding operations.

In a possible implementation, a first terminal and a second terminal use a similar chip structure, and different apparatuses may use different chips to implement respective functions.

The processor 1510 controls a processing operation of any one of the first terminal and the second terminal, and the processor 1510 may also be referred to as a central processing unit (central processing unit, CPU).

The memory 1540 may include a read-only memory and a random access memory, and provide instructions and data for the processor 1510. A part of the memory 1540 may further include an NVRAM. For example, in an application, the processor 1510, the communications interface 1530, and the memory 1540 are coupled together through a bus system 1520. The bus system 1520 may further include a power bus, a control bus, a status signal bus, and the like in addition to a data bus. However, for clear description, various types of buses in FIG. 15 are marked as the bus system 1520.

The methods disclosed in embodiments of this application may be applied to the processor 1510, or may be implemented by the processor 1510. The processor 1510 may be an integrated circuit chip, and has a signal processing capability. In an implementation process, the steps in the foregoing methods may be implemented by using a hardware integrated logical circuit in the processor 1510, or by using instructions in a form of software. The processor 1510 may be a general-purpose processor, a digital signal processor (digital signal processor, DSP), an ASIC, a field-programmable gate array (field-programmable gate array, FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and completed by a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor 1510.

In a possible implementation, the communications interface 1530 is configured to perform the receiving and sending steps of the first terminal in embodiments shown in FIG. 4 to FIG. 13. The processor 1510 is configured to perform the processing steps of the first terminal in embodiments shown in FIG. 4 to FIG. 13.

In another possible implementation, the communications interface 1530 is configured to perform the receiving and sending steps of the second terminal in embodiments shown in FIG. 4 to FIG. 13. The processor 1510 is configured to perform the processing steps of the second terminal in embodiments shown in FIG. 4 to FIG. 13.

According to an aspect, a computer-readable storage medium is provided. The computer-readable storage medium stores instructions, and when the instructions are run, functions performed by the first terminal in FIG. 4 are implemented.

According to an aspect, a computer-readable storage medium is provided. The computer-readable storage medium stores instructions, and when the instructions are run, functions performed by the second terminal in FIG. 4 are implemented.

According to an aspect, a computer-readable storage medium is provided. The computer-readable storage medium stores instructions, and when the instructions are run, functions performed by the first terminal in FIG. 6 are implemented.

According to an aspect, a computer-readable storage medium is provided. The computer-readable storage medium stores instructions, and when the instructions are run, functions performed by the second terminal in FIG. 6 are implemented.

According to an aspect, a computer-readable storage medium is provided. The computer-readable storage medium stores instructions, and when the instructions are run, functions performed by the first terminal in FIG. 9 are implemented.

According to an aspect, a computer-readable storage medium is provided. The computer-readable storage medium stores instructions, and when the instructions are run, functions performed by the second terminal in FIG. 9 are implemented.

According to an aspect, a computer program product including instructions is provided. The computer program product includes the instructions, and when the instructions are run, functions performed by the first terminal in FIG. 4 are implemented.

According to another aspect, a computer program product including instructions is provided. The computer program product includes the instructions, and when the instructions are run, functions performed by the second terminal in FIG. 4 are implemented.

According to an aspect, a computer program product including instructions is provided. The computer program product includes the instructions, and when the instructions are run, functions performed by the first terminal in FIG. 6 are implemented.

According to another aspect, a computer program product including instructions is provided. The computer program product includes the instructions, and when the instructions are run, functions performed by the second terminal in FIG. 6 are implemented.

According to an aspect, a computer program product including instructions is provided. The computer program product includes the instructions, and when the instructions are run, functions performed by the first terminal in FIG. 9 are implemented.

According to another aspect, a computer program product including instructions is provided. The computer program product includes the instructions, and when the instructions are run, functions performed by the second terminal in FIG. 9 are implemented.

According to an aspect, a chip is provided. The chip is applied to a first terminal, and the chip includes at least one processor and a communications interface. The communications interface is coupled to the at least one processor, and the processor is configured to run instructions, to implement functions performed by the first terminal in FIG. 4.

According to an aspect, a chip is provided. The chip is applied to a second terminal, and the chip includes at least one processor and a communications interface. The communications interface is coupled to the at least one processor, and the processor is configured to run instructions, to implement functions performed by the second terminal in FIG. 4.

According to another aspect, an embodiment of this application provides a chip. The chip is applied to a first terminal, and the chip includes at least one processor and a communications interface. The communications interface is coupled to the at least one processor, and the processor is configured to run instructions, to implement functions performed by the first terminal in FIG. 6.

According to an aspect, a chip is provided. The chip is applied to a second terminal, and the chip includes at least one processor and a communications interface. The communications interface is coupled to the at least one processor, and the processor is configured to run instructions, to implement functions performed by the second terminal in FIG. 6.

According to an aspect, a chip is provided. The chip is applied to a second terminal, and the chip includes at least one processor and a communications interface. The communications interface is coupled to the at least one processor, and the processor is configured to run instructions, to implement functions performed by the second terminal in FIG. 9.

An embodiment of this application provides a communications system. The communications system includes a first terminal and a second terminal. The first terminal is configured to perform functions performed by the first terminal in FIG. 4, and the second terminal is configured to perform functions performed by the second terminal in FIG. 4.

An embodiment of this application provides a communications system. The communications system includes a first terminal and a second terminal. The first terminal is configured to perform functions performed by the first terminal in FIG. 6, and the second terminal is configured to perform functions performed by the second terminal in FIG. 6.

An embodiment of this application provides a communications system. The communications system includes a first terminal and a second terminal. The first terminal is configured to perform functions performed by the first terminal in FIG. 9, and the second terminal is configured to perform functions performed by the second terminal in FIG. 9.

With reference to the foregoing descriptions, this application further provides the following embodiments.

Embodiment 1: A resource determining method is provided. The method is applied to a first terminal, and the method includes: The first terminal obtains transmission information, where the transmission information is used to determine a transmission status of a second terminal. The first terminal determines one or more sidelink resources based on the transmission status, where the sidelink resource may be used by the second terminal to send data, or the sidelink resource may be used to carry a service sent to the second terminal. The first terminal sends first information to the second terminal, or sends the service to the second terminal on a first sidelink resource in the one or more sidelink resources, where the first information is used to indicate information about the one or more sidelink resources.

Embodiment 2: According to the method in Embodiment 1, when the transmission status includes one or more of the following, the sidelink resource may be used by the second terminal to send the data:
  information used to indicate a first time period, where the first time period is a time period in which the second terminal reserves to receive a service, or a time period in which the second terminal reserves to send a service, or a time period in which the second terminal tends to receive a service, or a time period in which the second terminal does not tend to send a service;
  information about a second sidelink resource, where the second sidelink resource is a resource on which the second terminal reserves to transmit a service, or the second sidelink resource is a resource on which the second terminal tends to receive a service, or the second sidelink resource is a resource on which the second terminal does not tend to send a service, where reserving service transmission includes reserving service receiving or reserving service sending;
  information used to indicate a second time period, where the second time period is a time period in which the second terminal tends to send a service or a time period in which the second terminal does not tend to receive a service; and
  information about a third sidelink resource, where the third sidelink resource is a resource on which the second terminal tends to send a service or a resource on which the second terminal does not tend to receive a service.

Embodiment 3: According to the method in Embodiment 2, at least one of the one or more sidelink resources meets one or more of the following conditions:
  when the transmission status includes the information used to indicate the first time period, a time range of the at least one sidelink resource does not overlap the first time period;
  when the transmission status includes the information about the second sidelink resource, the at least one sidelink resource does not overlap the second sidelink resource;
  when the transmission status includes the information used to indicate the second time period, the time range of the at least one sidelink resource overlaps the second time period; and
  when the transmission status includes the information about the third sidelink resource, the at least one sidelink resource belongs to the third sidelink resource.

Embodiment 4: According to the method in Embodiment 2 or Embodiment 3, when the second terminal cannot simultaneously send a plurality of services, the time range of the at least one sidelink resource does not overlap the first time period; or
  when the second terminal can simultaneously send a plurality of services, the time range of the at least one sidelink resource may overlap the first time period.

Embodiment 5: According to the method in Embodiment 1, when the transmission status includes one or more of the following, the sidelink resource may be used to carry the service sent to the second terminal:
  information about a fourth sidelink resource, where the fourth sidelink resource is a resource on which the second terminal reserves to receive a service, or a resource on which the second terminal reserves to send a service, or a resource on which the second terminal tends to send a service, or a resource on which the second terminal does not tend to receive a service, or a resource on which the second terminal reserves to receive a service;
  information used to indicate a third time period, where the third time period is a time period in which the second terminal reserves to send a service, or a time period in which the second terminal tends to send a service, or a time period in which the second terminal does not tend to receive a service;
  information used to indicate a fourth time period, where the fourth time period is a time period in which the second terminal tends to receive a service, or a time period in which the second terminal does not tend to send a service, or a time period in which the second terminal reserves to receive a service; and
  information about a fifth sidelink resource, where the fifth sidelink resource is a resource on which the second terminal tends to receive a service or a resource on which the second terminal does not tend to send a service.

Embodiment 6: According to the method in Embodiment 5, the first sidelink resource meets one or more of the following conditions:
when the transmission status includes the information about the fourth sidelink resource, the first sidelink resource does not overlap the fourth sidelink resource;
when the transmission status includes the information used to indicate the third time period, a time range of the first sidelink resource does not overlap the third time period;
when the transmission status includes the information used to indicate the fourth time period, the time range of the first sidelink resource overlaps the fourth time period; and
when the transmission status includes the information about the fifth sidelink resource, the first sidelink resource belongs to the fifth sidelink resource.

Embodiment 7: According to the method in any one of Embodiment 1 to Embodiment 6, that the first terminal obtains transmission information includes: The first terminal receives the transmission information from the second terminal; or the first terminal receives second information sent by another terminal, where the second information includes at least an identifier of the second terminal; and the first terminal determines the transmission information based on the second information.

Embodiment 8: According to the method in any one of Embodiment 1 to Embodiment 7, that the first terminal determines one or more sidelink resources based on the transmission status includes: The first terminal determines one or more candidate sidelink resources from sensed sidelink resources. The first terminal determines the one or more sidelink resources from the one or more candidate sidelink resources based on the transmission status. Because the first terminal determines the one or more candidate sidelink resources from the sensed sidelink resources without referring to the transmission status of the second terminal, the one or more candidate sidelink resources may have the following cases: 1. All of the candidate sidelink resources may conflict with transmission of the second terminal. 2. Some of the candidate sidelink resources may not conflict with transmission of the second terminal, and some of the candidate sidelink resources may conflict with transmission of the second terminal. 3. All of the candidate sidelink resources may not conflict with transmission of the second terminal. In Case 1, it is possible that the first terminal cannot determine at least a sidelink resource that does not conflict with transmission of the second terminal from the one or more candidate sidelink resources.

Embodiment 9: According to the method in any one of Embodiment 1 to Embodiment 7, that the first terminal determines one or more sidelink resources based on the transmission status includes: The first terminal determines one or more candidate sidelink resources from sensed sidelink resources based on the transmission status. The first terminal determines the one or more sidelink resources from the one or more candidate sidelink resources. The one or more candidate sidelink resources include at least a candidate sidelink resource that does not conflict with transmission of the second terminal Because the first terminal determines the one or more candidate sidelink resources from the sensed sidelink resources with reference to the transmission status of the second terminal, the one or more candidate sidelink resources may have the following cases: 1. Some of the candidate sidelink resources may not conflict with transmission of the second terminal, and some of the candidate sidelink resources may conflict with transmission of the second terminal. 2. All of the candidate sidelink resources may not conflict with transmission of the second terminal.

Embodiment 10: According to the method in any one of Embodiment 1 to Embodiment 9, at least one of the one or more sidelink resources does not overlap a resource corresponding to service transmission of the second terminal.

Embodiment 11: According to the method in any one of Embodiment 1 to Embodiment 10, the method provided in this embodiment of this application further includes: The first terminal receives the data from the second terminal on a sixth sidelink resource in the one or more sidelink resources.

Embodiment 12: A resource determining method is provided. The method is applied to a second terminal, and the method includes:
The second terminal receives first information from a first terminal, where the first information is used to indicate information about one or more sidelink resources, and the one or more sidelink resources are used to determine a sidelink resource used by the second terminal to send a first service.
The second terminal determines a first sidelink resource based on the one or more sidelink resources, where the first sidelink resource does not overlap at least a corresponding resource used by the second terminal to transmit a service.
The second terminal sends the first service on the first sidelink resource.

Embodiment 13: According to the method in Embodiment 12, that the second terminal determines a first sidelink resource based on the one or more sidelink resources includes:
The second terminal determines the first sidelink resource based on a transmission status of the second terminal and the one or more sidelink resources.
The transmission status includes information about the corresponding resource used by the second terminal to transmit the service, and the corresponding resource used by the second terminal to transmit the service includes information about a sidelink resource that carries the service or a time period for receiving or sending the service.

Embodiment 14: According to the method in Embodiment 13, the transmission status includes one or more of the following:
information used to indicate a first time period, information about a second sidelink resource, information used to indicate a second time period, and information about a third sidelink resource.
The first time period is a time period in which the second terminal reserves to send a service, or a time period in which the second terminal reserves to receive a service, or a time period in which the second terminal tends to receive a service, or a time period in which the second terminal does not tend to send a service.
The second sidelink resource is a resource on which the second terminal reserves to receive a service, or a resource on which the second terminal reserves to send a service, or a resource on which the second terminal tends to receive a service, or a resource on which the second terminal does not tend to send a service.
The second time period is a time period in which the second terminal tends to send a service or a time period in which the second terminal does not tend to receive a service.
The third sidelink resource is a resource on which the second terminal tends to send a service or a resource on which the second terminal does not tend to receive a service.

Embodiment 15: According to the method in Embodiment 14, a time range of the first sidelink resource does not overlap the first time period; or
the first sidelink resource does not overlap the second sidelink resource; or
a time range of the first sidelink resource overlaps the second time period, or
the first sidelink resource belongs to the third sidelink resource.

Embodiment 16: According to the method in any one of Embodiment 13 to Embodiment 15, that the second terminal determines the first sidelink resource based on a transmission status of the second terminal and the one or more sidelink resources includes:

The second terminal determines a fourth sidelink resource used to carry the first service from the one or more sidelink resources.

When determining, based on the transmission status of the second terminal, that a time range of the fourth sidelink resource overlaps a fourth time period, the second terminal determines the first sidelink resource based on a priority of the first service and a first priority of a second service, where the fourth time period is a time period in which the second terminal reserves to receive the second service.

Embodiment 17: According to the method in Embodiment 16, that the second terminal determines the first sidelink resource based on a priority of the first service and a first priority of a second service includes:

When the priority of the first service is higher than or equal to the first priority, the second terminal determines that the fourth sidelink resource is the first sidelink resource.

Embodiment 18: According to the method in Embodiment 16 or Embodiment 17, that the second terminal determines the first sidelink resource based on a priority of the first service and a first priority of a second service includes:

When the priority of the first service is lower than or equal to the first priority, the second terminal determines that the fourth sidelink resource is not the first sidelink resource.

Embodiment 19: According to the method in any one of Embodiment 13 to Embodiment 15, that the second terminal determines the first sidelink resource based on a transmission status of the second terminal and the one or more sidelink resources includes:

The second terminal determines a resource pool, where the resource pool includes a sidelink resource other than a fourth sidelink resource in the one or more sidelink resources, a time range of the fourth sidelink resource overlaps a fourth time period, and the fourth time period is a time period in which the second terminal reserves to receive a second service.

The second terminal determines the first sidelink resource from the resource pool.

Embodiment 20: According to the method in Embodiment 18 or Embodiment 19, the method provided in this embodiment of this application further includes:

When the time range of the fourth sidelink resource overlaps the fourth time period, the second terminal receives the second service in the fourth time period.

Embodiment 21: According to the method in any one of Embodiment 12 to Embodiment 20, the method provided in this embodiment of this application further includes:

The second terminal determines, based on a quantity of the one or more sidelink resources and/or configuration information, a manner of determining the first sidelink resource from the one or more sidelink resources; or
the second terminal receives indication information from the first terminal; and
the second terminal determines, based on the indication information, a manner of determining the first sidelink resource from the one or more sidelink resources.

The manner is determining the first sidelink resource based on the transmission status of the second terminal; or the manner is determining the first sidelink resource based on a service priority.

Embodiment 22: A resource determining apparatus is provided. The apparatus is a first terminal or a chip applied to the first terminal, and the apparatus includes: a communications unit and a processing unit. The communications unit is configured to obtain transmission information, where the transmission information is used to determine a transmission status of a second terminal. The processing unit is configured to determine one or more sidelink resources based on the transmission status, where the sidelink resource may be used by the second terminal to send data, or the sidelink resource may be used to carry a service sent to the second terminal. The communications unit is further configured to send first information to the second terminal, or send the service to the second terminal on a first sidelink resource in the one or more sidelink resources, where the first information is used to indicate information about the one or more sidelink resources.

Embodiment 23: According to the apparatus in Embodiment 21, when the transmission status includes one or more of the following, the sidelink resource may be used by the second terminal to send the data:
information used to indicate a first time period, where the first time period is a time period in which the second terminal reserves to receive a service, or a time period in which the second terminal reserves to send a service, or a time period in which the second terminal tends to receive a service, or a time period in which the second terminal does not tend to send a service;
information about a second sidelink resource, where the second sidelink resource is a resource on which the second terminal reserves to transmit a service, or the second sidelink resource is a resource on which the second terminal tends to receive a service, or the second sidelink resource is a resource on which the second terminal does not tend to send a service;
information used to indicate a second time period, where the second time period is a time period in which the second terminal tends to send a service or a time period in which the second terminal does not tend to receive a service; and
information about a third sidelink resource, where the third sidelink resource is a resource on which the second terminal tends to send a service or a resource on which the second terminal does not tend to receive a service.

Embodiment 24: According to the apparatus in Embodiment 23, at least one of the one or more sidelink resources meets one or more of the following conditions:
when the transmission status includes the information used to indicate the first time period, a time range of the at least one sidelink resource does not overlap the first time period;
when the transmission status includes the information about the second sidelink resource, the at least one sidelink resource does not overlap the second sidelink resource;
when the transmission status includes the information used to indicate the second time period, the time range of the at least one sidelink resource overlaps the second time period; and when the transmission status includes the information about the third sidelink resource, the at least one sidelink resource belongs to the third sidelink resource.

Embodiment 25: According to the apparatus in Embodiment 23 or Embodiment 24, when the second terminal cannot simultaneously send a plurality of services, the time range of the at least one sidelink resource does not overlap the first time period; or when the second terminal can simultaneously send a plurality of services, the time range of the at least one sidelink resource may overlap the first time period.

Embodiment 26: According to the apparatus in Embodiment 22, when the transmission status includes one or more of the following, the sidelink resource may be used to carry the service sent to the second terminal:

information about a fourth sidelink resource, where the fourth sidelink resource is a resource on which the second terminal reserves to receive a service, or a resource on which the second terminal reserves to send a service, or a resource on which the second terminal tends to send a service, or a resource on which the second terminal does not tend to receive a service, or a resource on which the second terminal reserves to receive a service;

information used to indicate a third time period, where the third time period is a time period in which the second terminal reserves to send a service, or a time period in which the second terminal tends to send a service, or a time period in which the second terminal does not tend to receive a service;

information used to indicate a fourth time period, where the fourth time period is a time period in which the second terminal tends to receive a service, or a time period in which the second terminal does not tend to send a service, or a time period in which the second terminal reserves to receive a service; and information about a fifth sidelink resource, where the fifth sidelink resource is a resource on which the second terminal tends to receive a service or a resource on which the second terminal does not tend to send a service.

Embodiment 27: According to the apparatus in Embodiment 26, the first sidelink resource meets one or more of the following conditions:

when the transmission status includes the information about the fourth sidelink resource, the first sidelink resource does not overlap the fourth sidelink resource;

when the transmission status includes the information used to indicate the third time period, a time range of the first sidelink resource does not overlap the third time period;

when the transmission status includes the information used to indicate the fourth time period, the time range of the first sidelink resource overlaps the fourth time period; and when the transmission status includes the information about the fifth sidelink resource, the first sidelink resource belongs to the fifth sidelink resource.

Embodiment 28: According to the apparatus in any one of Embodiment 22 to Embodiment 27, that the communications unit is configured to obtain transmission information includes: The communications unit is configured to receive the transmission information from the second terminal; or the communications unit is configured to receive second information sent by another terminal, where the second information includes at least an identifier of the second terminal; and the processing unit is configured to determine the transmission information based on the second information.

Embodiment 29: According to the apparatus in any one of Embodiment 22 to Embodiment 28, the processing unit is configured to determine one or more candidate sidelink resources from sensed sidelink resources. The processing unit is configured to determine the one or more sidelink resources from the one or more candidate sidelink resources based on the transmission status. Because the first terminal determines the one or more candidate sidelink resources from the sensed sidelink resources without referring to the transmission status of the second terminal, the one or more candidate sidelink resources may have the following cases: 1. All of the candidate sidelink resources may conflict with transmission of the second terminal. 2. Some of the candidate sidelink resources may not conflict with transmission of the second terminal, and some of the candidate sidelink resources may conflict with transmission of the second terminal. 3. All of the candidate sidelink resources may not conflict with transmission of the second terminal. In Case 1, it is possible that the first terminal cannot determine at least a sidelink resource that does not conflict with transmission of the second terminal from the one or more candidate sidelink resources.

Embodiment 30: According to the apparatus in any one of Embodiment 22 to Embodiment 28, that the processing unit is configured to determine one or more sidelink resources based on the transmission status includes: The processing unit is configured to determine one or more candidate sidelink resources from sensed sidelink resources based on the transmission status. The processing unit is configured to determine the one or more sidelink resources from the one or more candidate sidelink resources. The one or more candidate sidelink resources include at least a candidate sidelink resource that does not conflict with transmission of the second terminal. Because the first terminal determines the one or more candidate sidelink resources from the sensed sidelink resources with reference to the transmission status of the second terminal, the one or more candidate sidelink resources may have the following cases: 1. Some of the candidate sidelink resources may not conflict with transmission of the second terminal, and some of the candidate sidelink resources may conflict with transmission of the second terminal. 2. All of the candidate sidelink resources may not conflict with transmission of the second terminal.

Embodiment 31: According to the apparatus in any one of Embodiment 22 to Embodiment 30, at least one of the one or more sidelink resources does not overlap a resource corresponding to service transmission of the second terminal.

Embodiment 32: According to the apparatus in any one of Embodiment 22 to Embodiment 31, when the sidelink resource may be used by the second terminal to send the data, the communications unit is further configured to receive the data from the second terminal on a sixth sidelink resource in the one or more sidelink resources.

Embodiment 33: A resource determining apparatus is provided. The apparatus is applied to a second terminal, and the apparatus includes:

a communications unit, configured to receive first information from a first terminal, where the first information is used to indicate information about one or more sidelink resources, and the one or more sidelink resources are used to determine a sidelink resource used by the second terminal to send a first service; and a processing unit, configured to determine a first sidelink resource based on the one or more sidelink resources, where the first sidelink resource does not overlap at least a corresponding resource used by the second terminal to transmit a service.

The communications unit is configured to send the first service on the first sidelink resource.

Embodiment 34: According to the apparatus in Embodiment 33, the processing unit is configured to determine the first sidelink resource based on a transmission status of the second terminal and the one or more sidelink resources.

The transmission status includes information about the corresponding resource used by the second terminal to transmit the service, and the corresponding resource used by the second terminal to transmit the service includes information about a sidelink resource that carries the service or a time period for receiving or sending the service.

Embodiment 35: According to the apparatus in Embodiment 34, the transmission status includes one or more of the following:

information used to indicate a first time period, information about a second sidelink resource, information used to indicate a second time period, and information about a third sidelink resource.

The first time period is a time period in which the second terminal reserves to send a service, or a time period in which the second terminal reserves to receive a service, or a time period in which the second terminal tends to receive a service, or a time period in which the second terminal does not tend to send a service.

The second sidelink resource is a resource on which the second terminal reserves to receive a service, or a resource on which the second terminal reserves to send a service, or a resource on which the second terminal tends to receive a service, or a resource on which the second terminal does not tend to send a service.

The second time period is a time period in which the second terminal tends to send a service or a time period in which the second terminal does not tend to receive a service.

The third sidelink resource is a resource on which the second terminal tends to send a service or a resource on which the second terminal does not tend to receive a service.

Embodiment 36: According to the apparatus in Embodiment 35, a time range of the first sidelink resource does not overlap the first time period; or the first sidelink resource does not overlap the second sidelink resource; or a time range of the first sidelink resource overlaps the second time period; or the first sidelink resource belongs to the third sidelink resource.

Embodiment 37: According to the apparatus in any one of Embodiment 34 to Embodiment 36, the processing unit is configured to determine a fourth sidelink resource used to carry the first service from the one or more sidelink resources.

When determining, based on the transmission status of the second terminal, that a time range of the fourth sidelink resource overlaps a fourth time period, the processing unit is configured to determine the first sidelink resource based on a priority of the first service and a first priority of a second service, where the fourth time period is a time period in which the second terminal reserves to receive the second service.

Embodiment 38: According to the apparatus in Embodiment 37, when the priority of the first service is higher than or equal to the first priority, the processing unit is configured to determine that the fourth sidelink resource is the first sidelink resource.

Embodiment 39: According to the apparatus in Embodiment 37 or Embodiment 38, when the priority of the first service is lower than or equal to the first priority, the processing unit is configured to determine that the fourth sidelink resource is not the first sidelink resource.

Embodiment 40: According to the apparatus in any one of Embodiment 34 to Embodiment 36, the processing unit is configured to determine a resource pool, where the resource pool includes a sidelink resource other than a fourth sidelink resource in the one or more sidelink resources, a time range of the fourth sidelink resource overlaps a fourth time period, and the fourth time period is a time period in which the second terminal reserves to receive a second service; and the processing unit is configured to determine the first sidelink resource from the resource pool.

Embodiment 41: According to the apparatus in Embodiment 39 or Embodiment 40, when the time range of the fourth sidelink resource overlaps the fourth time period, the communications unit is further configured to receive the second service in the fourth time period.

Embodiment 42: According to the apparatus in any one of Embodiment 33 to Embodiment 41, the processing unit is further configured to determine, based on a quantity of the one or more sidelink resources and/or configuration information, a manner of determining the first sidelink resource from the one or more sidelink resources.

Embodiment 43: According to the apparatus in any one of Embodiment 33 to Embodiment 41, the communications unit is further configured to receive indication information from the first terminal.

The processing unit is further configured to determine, based on the indication information, a manner of determining the first sidelink resource from the one or more sidelink resources.

The manner is determining the first sidelink resource based on the transmission status of the second terminal; or the manner is determining the first sidelink resource based on a service priority.

Embodiment 44: A chip is provided. The chip includes at least one processor and a communications interface, the communications interface is coupled to the at least one processor, the at least one processor is configured to run a computer program or instructions, to implement the resource determining method according to any one of Embodiment 1 to Embodiment 11, and the communications interface is configured to communicate with a module other than the chip.

Embodiment 45: A chip is provided. The chip includes at least one processor and a communications interface, the communications interface is coupled to the at least one processor, the at least one processor is configured to run a computer program or instructions, to implement the resource determining method according to any one of Embodiment 12 to Embodiment 21, and the communications interface is configured to communicate with a module other than the chip.

Embodiment 46: A computer-readable storage medium is provided. The computer-readable storage medium stores instructions, and when the instructions are run, the resource determining method according to any one of Embodiment 1 to Embodiment 11 is implemented.

Embodiment 47: A computer-readable storage medium is provided. The computer-readable storage medium stores instructions, and when the instructions are run, the resource determining method according to any one of Embodiment 12 to Embodiment 21 is implemented.

Embodiment 48: A communications system is provided. The communications system includes a first terminal and a second terminal.

The first terminal is configured to implement the resource determining method according to any one of Embodiment 1 to Embodiment 11, and the second terminal is configured to receive first information from the first terminal, or the second terminal is configured to receive a service from the first terminal on a first sidelink resource.

Embodiment 49: A communications system is provided. The communications system includes a first terminal and a second terminal.

The first terminal is configured to send first information to the second terminal, and the second terminal is configured to implement the resource determining method according to any one of Embodiment 12 to Embodiment 21.

It should be finally noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method performed by a first terminal or a chip in the first terminal, wherein the method comprises:
    obtaining, from a second terminal, transmission information indicating a first sidelink resource, wherein the first sidelink resource is associated with a first time range indicating when the second terminal reserves to send or receive a service;
    determining a second sidelink resource according to the transmission information, wherein a second time range of the second sidelink resource does not overlap with the first time range; and
    sending first data to the second terminal on a portion of the second sidelink resource.

2. The method of claim 1, further comprising:
    receiving, from the second terminal, a trigger message indicating the first terminal to recommend the second sidelink resource to the second terminal; and
    sending, to the second terminal and based on the trigger message, a request message requesting the transmission information.

3. The method of claim 1, wherein each sidelink resource of the first sidelink resource or the second sidelink resource comprises a time resource and a frequency resource.

4. The method of claim 1, wherein different sidelink resources that are respectively located in the first sidelink resource and the second sidelink resource have a same time location and different frequency locations.

5. The method of claim 1, wherein different sidelink resources that are respectively located in the first sidelink resource and the second sidelink resource have a same frequency location and different time locations.

6. The method of claim 1, wherein different sidelink resources that are respectively located in the first sidelink resource and the second sidelink resource have different frequency locations and different time locations.

7. A first terminal apparatus, comprising:
    a memory configured to store instructions; and
    a processor coupled to the memory and configured to:
        obtain, from a second terminal, transmission information indicating a first sidelink resource, wherein the first sidelink resource is associated with a first time range indicating when the second terminal reserves to send or receive a service;
        determine a second sidelink resource according to the transmission information, wherein a second time range of the second sidelink resource does not overlap with the first time range; and
        sending first data to the second terminal on a portion of the second sidelink resource.

8. The first terminal apparatus of claim 7, wherein the processor is further configured to:
    receive, from the second terminal, a trigger message indicating the first terminal to recommend the second sidelink resource to the second terminal; and
    send, to the second terminal and based on the trigger message, a request message requesting the transmission information.

9. The first terminal apparatus of claim 7, wherein each sidelink resource of the first sidelink resource or the second sidelink resource comprises a time resource and a frequency resource.

10. The first terminal apparatus of claim 7, wherein different sidelink resources of the first sidelink resource satisfy one of the following:
    a same time location and different frequency locations;
    a same frequency location and different time locations; or
    different frequency locations and different time locations.

11. The first terminal apparatus of claim 7, wherein different sidelink resources of the second sidelink resource satisfy one of the following:
    a same time location and different frequency locations;
    a same frequency location and different time locations; or
    different frequency locations and different time locations.

12. The first terminal apparatus of claim 7, wherein different sidelink resources that are respectively located in the first sidelink resource and the second sidelink resource satisfy one of the following:
    a same time location and different frequency locations;
    a same frequency location and different time locations; or
    different frequency locations and different time locations.

13. A computer program product comprising computer-executable instructions that are stored on a non-transitory computer-readable storage medium and that, when executed by a processor, cause a first terminal or a chip in the first terminal to:
    obtain, from a second terminal, transmission information indicating a first sidelink resource, wherein the first sidelink resource is associated with a first time range indicating when the second terminal reserves to send or receive a service;
    determine a second sidelink resource according to the transmission information, wherein a second time range of the second sidelink resource does not overlap with the first time range; and
    send first data to the second terminal on a portion of the second sidelink resource.

14. The computer program product of claim 13, wherein the instructions, when executed by the processor, cause the first terminal or the chip to:
    receive, from the second terminal, a trigger message indicating the first terminal to recommend the second sidelink resource to the second terminal; and
    send, to the second terminal and based on the trigger message, a request message requesting the transmission information.

15. The computer program product of claim 13, wherein each sidelink resource of the first sidelink resource or the second sidelink resource comprises a time resource and a frequency resource.

16. The computer program product of claim 13, wherein different sidelink resources of the first sidelink resource satisfy one of the following:
- a same time location and different frequency locations;
- a same frequency location and different time locations; or
- different frequency locations and different time locations.

17. The computer program product of claim 13, wherein different sidelink resources of the second sidelink resource satisfy one of the following:
- a same time location and different frequency locations;
- a same frequency location and different time locations; or
- different frequency locations and different time locations.

18. The computer program product of claim 13, wherein different sidelink resources that are respectively located in the first sidelink resource and the second sidelink resource have a same time location and different frequency locations.

19. The computer program product of claim 13, wherein different sidelink resources that are respectively located in the first sidelink resource and the second sidelink resource have a same frequency location and different time locations.

20. The computer program product of claim 13, wherein different sidelink resources that are respectively located in the first sidelink resource and the second sidelink resource have different frequency locations and different time locations.

\* \* \* \* \*